US008933981B2

(12) United States Patent
Yamamoto et al.

(10) Patent No.: US 8,933,981 B2
(45) Date of Patent: Jan. 13, 2015

(54) MARKING CONTROL DEVICE, LASER APPLICATION DEVICE, MARKING CONTROL METHOD, AND COMPUTER-READABLE RECORDING MEDIUM HAVING MARKING CONTROL PROGRAM

(75) Inventors: Kazutaka Yamamoto, Kanagawa (JP); Tomomi Ishimi, Shizuoka (JP); Shinya Kawahara, Shizuoka (JP); Toshiaki Asai, Shizuoka (JP); Yoshihiko Hotta, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 151 days.

(21) Appl. No.: 13/502,298

(22) PCT Filed: Oct. 14, 2010

(86) PCT No.: PCT/JP2010/068535
§ 371 (c)(1),
(2), (4) Date: Apr. 16, 2012

(87) PCT Pub. No.: WO2011/049147
PCT Pub. Date: Apr. 28, 2011

(65) Prior Publication Data
US 2012/0212564 A1   Aug. 23, 2012

(30) Foreign Application Priority Data

Oct. 19, 2009 (JP) ................................. 2009-240527
Oct. 28, 2009 (JP) ................................. 2009-247295
Sep. 8, 2010 (JP) ................................. 2010-201388

(51) Int. Cl.
*B41J 2/435* (2006.01)
*B41J 2/475* (2006.01)
(Continued)

(52) U.S. Cl.
CPC ............... *B41J 2/4753* (2013.01); *G06K 1/126* (2013.01); *G06K 15/029* (2013.01); *G06K 15/1228* (2013.01)
USPC ........................................ 347/262; 347/264

(58) Field of Classification Search
USPC .................................................. 347/262, 264
See application file for complete search history.

(56) References Cited

U.S. PATENT DOCUMENTS 4,956,539 A   9/1990 Uesugi et al.
6,121,574 A   9/2000 Xu
(Continued)

FOREIGN PATENT DOCUMENTS

JP   61 239444   10/1986
JP   09 030118   2/1997
(Continued)

OTHER PUBLICATIONS

International Search Report issued on Nov. 30, 2010 in PCT/JP10/068535 filed on Oct. 14, 2010.

*Primary Examiner* — Justin Seo
*Assistant Examiner* — Kendrick Liu
(74) *Attorney, Agent, or Firm* — Oblon, Spivak, McClelland, Maier & Neustadt, L.L.P.

(57) ABSTRACT

A disclosed marking control device controls a marking device to mark a target image on a thermoreversible recording medium by applying a laser beam includes a marking position determination unit dividing the image into plural marking lines, and determining their marking positions; a marking order determination unit determining a marking order to mark the marking lines in mutually opposite directions; an adjusting unit adjusting a distance between a first ending point and a second starting point to be longer than a distance between a first starting point and a second ending point, or adjusting laser power applied to a second starting point side of the second marking line to be lower than the laser power applied to a second ending point side of the second marking line; and a marking instruction generator unit generating marking instructions including the marking positions of the marking lines and the marking order thereof.

22 Claims, 27 Drawing Sheets

(51) Int. Cl.
*G06K 1/12* (2006.01)
*G06K 15/02* (2006.01)
*G06K 15/12* (2006.01)

(56) References Cited

U.S. PATENT DOCUMENTS

| | | |
|---|---|---|
| 2003/0224256 A1 * | 12/2003 | Endo et al. .................. 430/9 |
| 2007/0225162 A1 | 9/2007 | Kawahara et al. |
| 2008/0064596 A1 * | 3/2008 | Iino et al. .................. 503/201 |
| 2008/0153698 A1 * | 6/2008 | Kawahara et al. ............ 503/201 |
| 2009/0203521 A1 | 8/2009 | Ishimi et al. |
| 2010/0039916 A1 | 2/2010 | Hasegawa et al. |

FOREIGN PATENT DOCUMENTS

| | | | | |
|---|---|---|---|---|
| JP | 11 151856 | 6/1999 | | |
| JP | 2000 136022 | 5/2000 | | |
| JP | 3161199 | 4/2001 | | |
| JP | 3557512 | 5/2004 | | |
| JP | 2004 265247 | 9/2004 | | |
| JP | 2005238746 A | * | 9/2005 | ............... B41M 5/26 |
| JP | 3998193 | 10/2007 | | |
| JP | 2008 62506 | 3/2008 | | |
| JP | 2008 213439 | 9/2008 | | |
| JP | 2009 214538 | 9/2009 | | |
| WO | 88 00109 | 1/1988 | | |

* cited by examiner

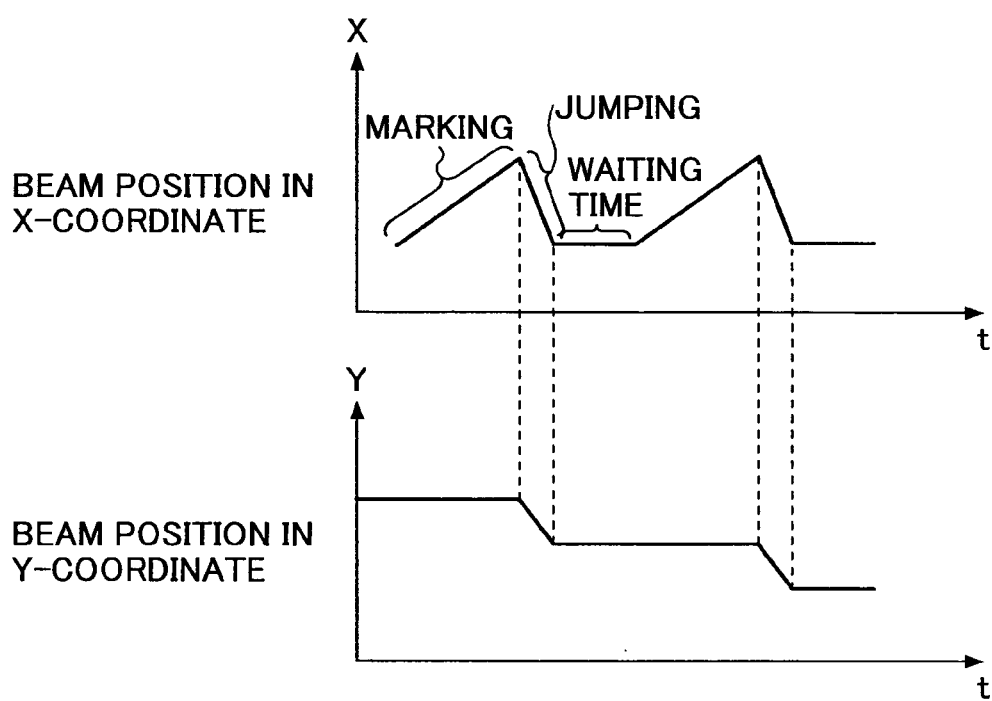

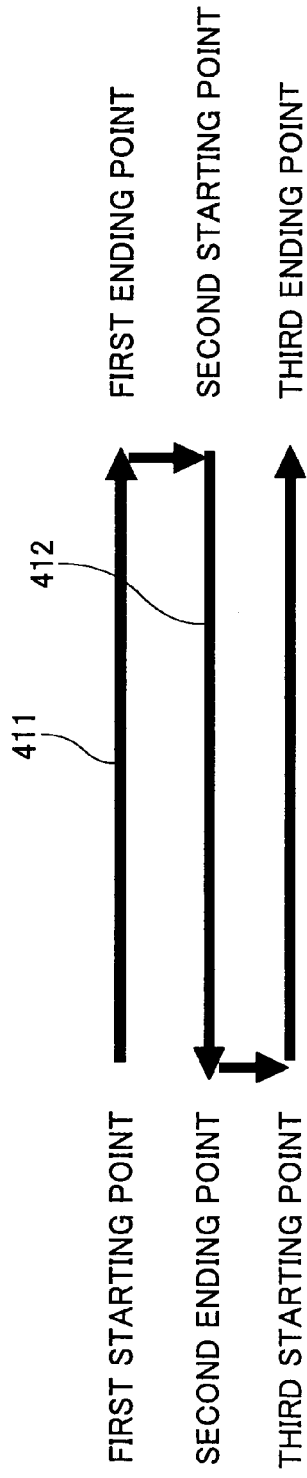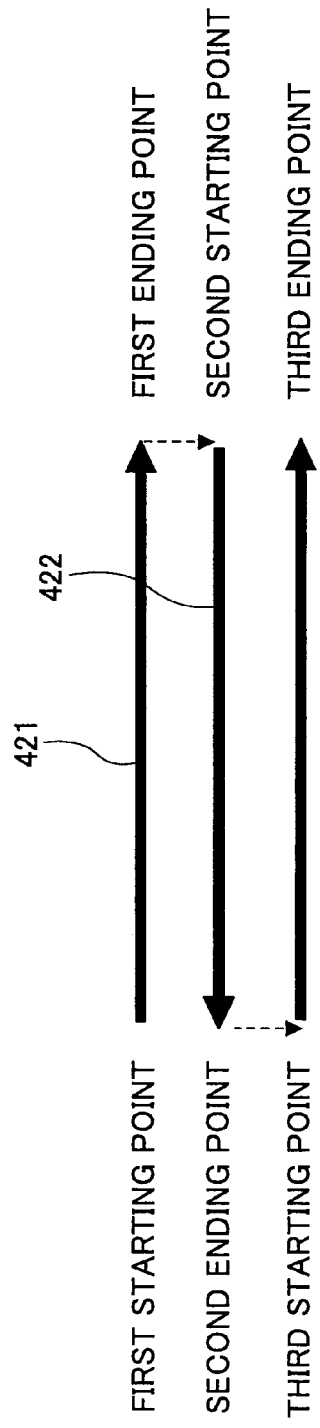

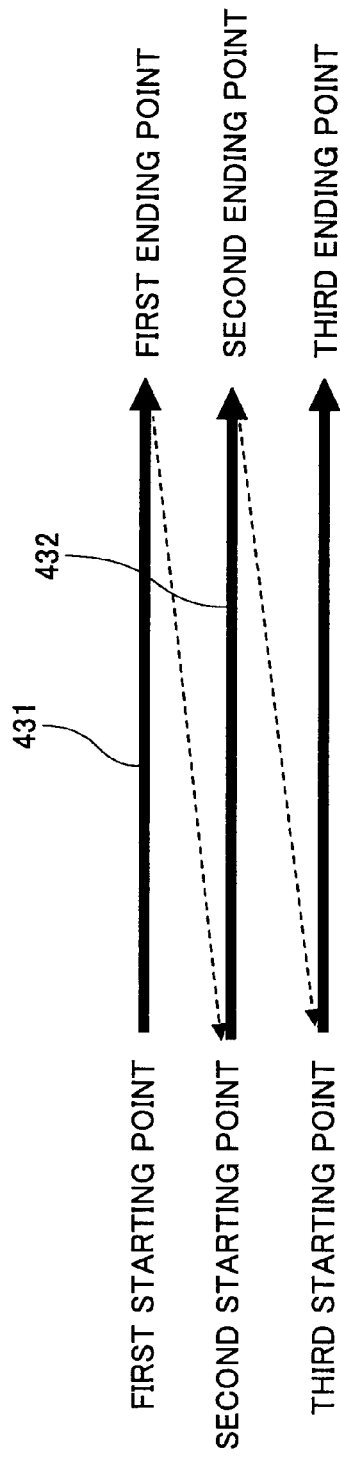
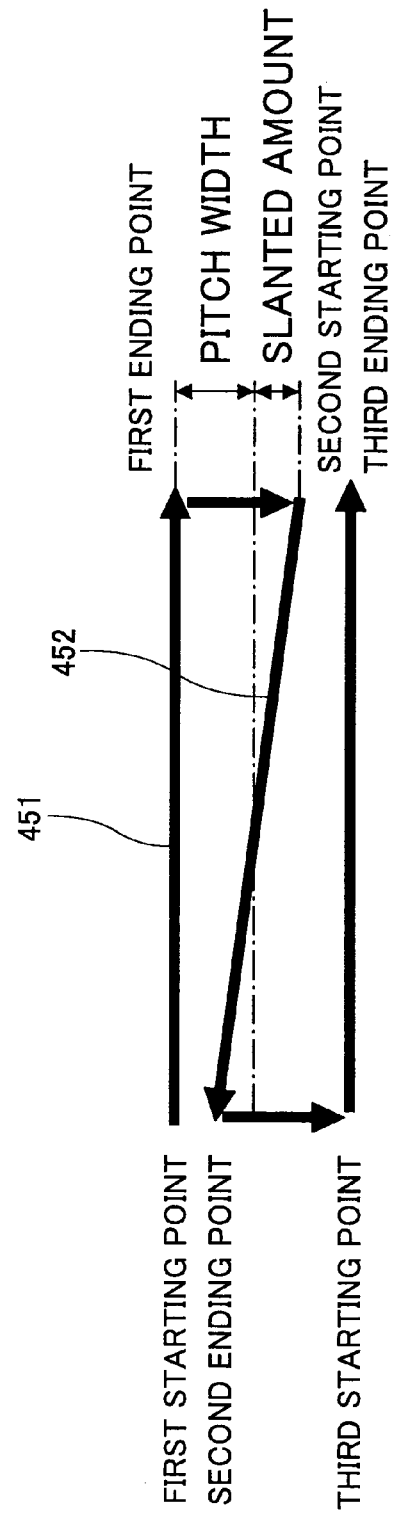

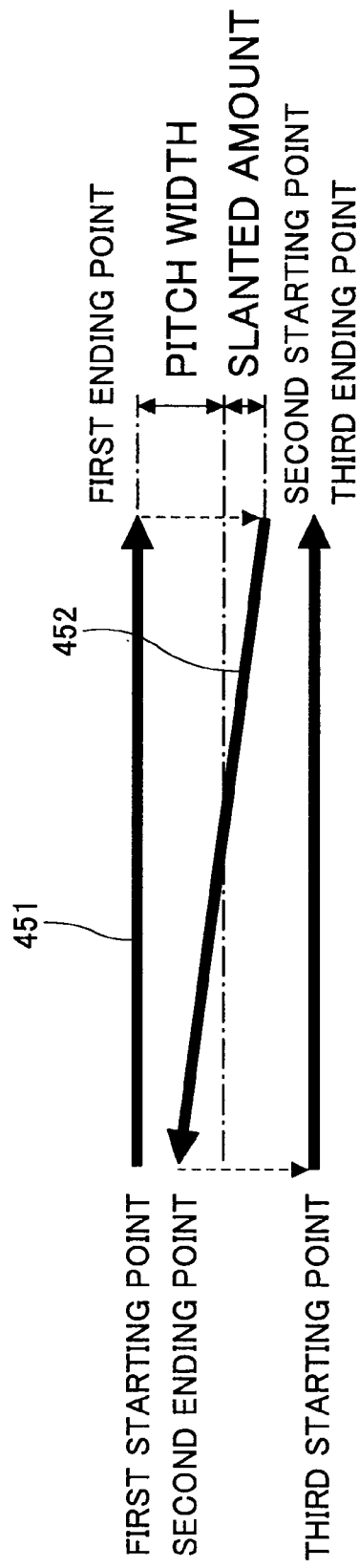

FIG.8

| BYTE | CONTENT |
|------|---------|
| 0 - 1 | X-COORDINATE |
| 2 - 3 | Y-COORDINATE |
| 4 - 5 | OUTPUT POWER COEFFICIENT |
| 6 - 7 | OUTPUT SPEED COEFFICIENT |
| 8 - 9 | CONTROL FLAG |

- Rows 0-1, 2-3: D1a
- Rows 4-5, 6-7: D1b
- Row 8-9: D1c

FIG.9

| BYTE | CONTENT |
|------|---------|
| 0 - 1 | X-OUTPUT POWER |
| 2 - 3 | Y-OUTPUT POWER |
| 4 - 5 | OUTPUT POWER SETTING |
| 6 - 7 | DATA INTERVAL |
| 8 - 9 | CONTROL FLAG |

- Row 0-1: D2a
- Row 2-3: D2b
- Row 4-5: D2c
- Row 6-7: D2d
- Row 8-9: D2e

FIG.11

| IDENTIFIER OF UNIT LINE COMPONENT | 1 | 2 | 3 | 4 | 5 | 6 | 7 | 8 | 9 | 10 |
|---|---|---|---|---|---|---|---|---|---|---|
| LASER OUTPUT POWER (IN PERMILLAGE) | 820 | 840 | 860 | 880 | 900 | 920 | 940 | 960 | 980 | 1000 |

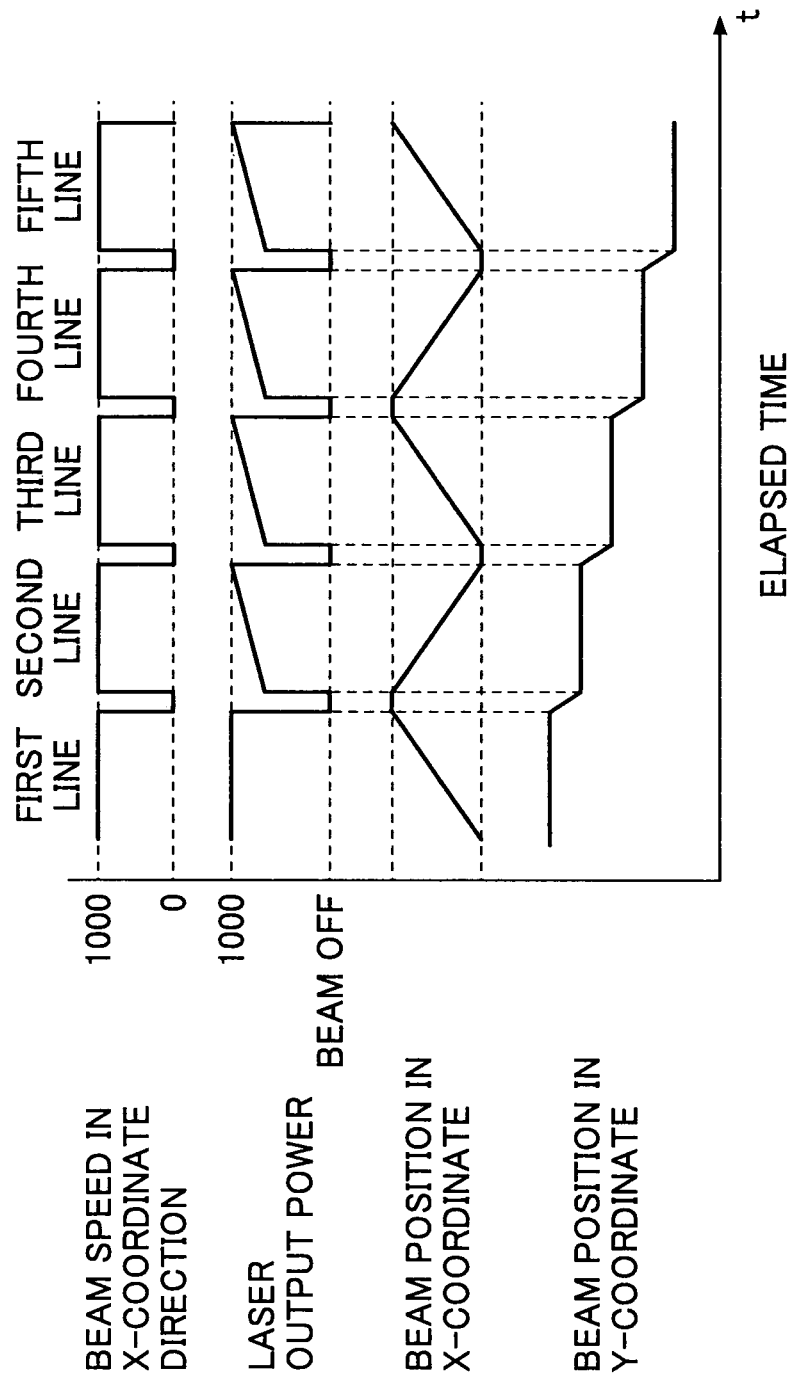

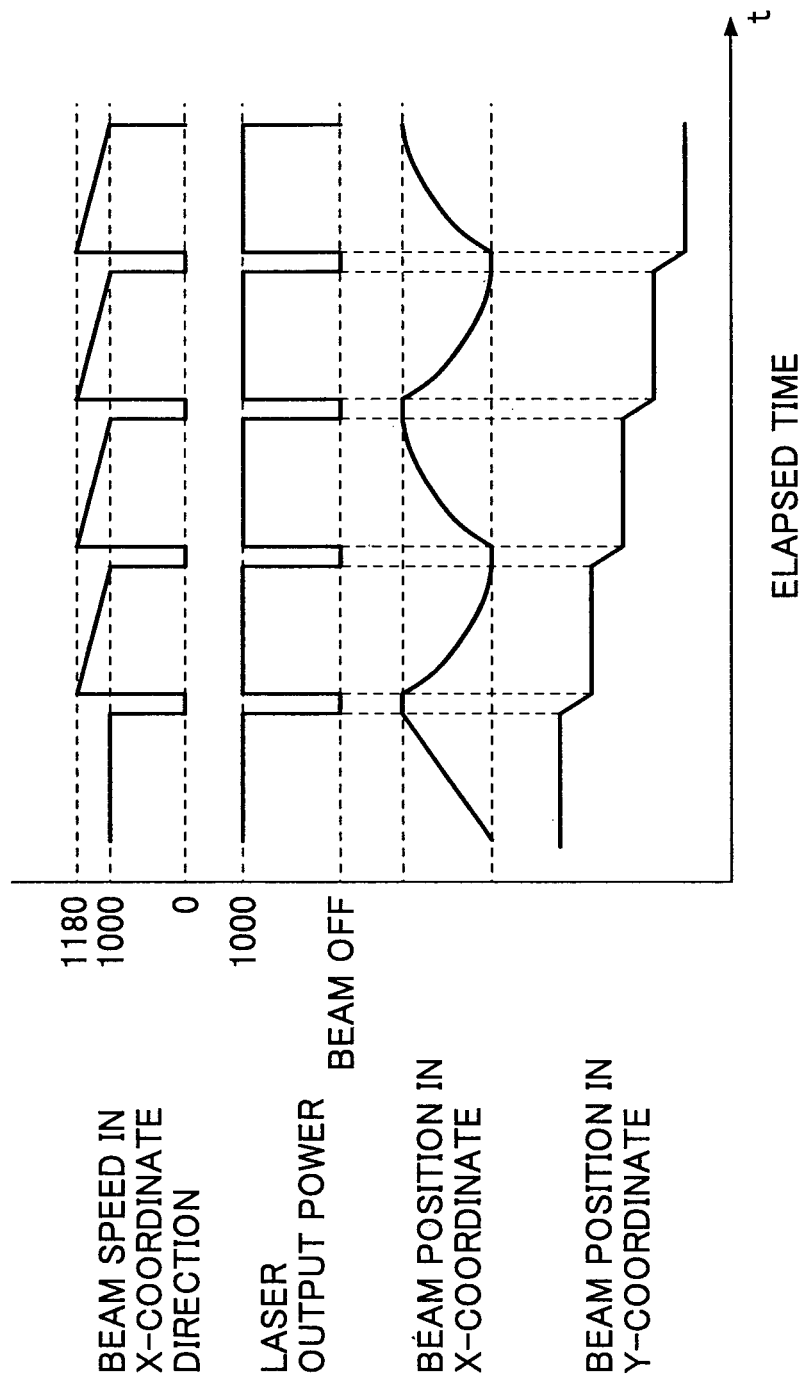

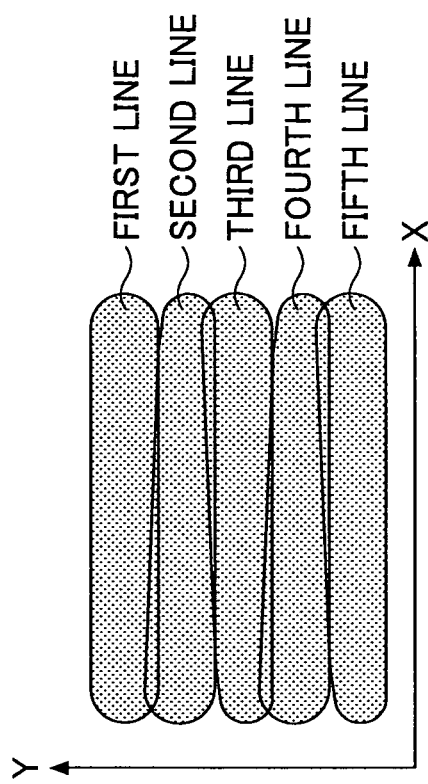
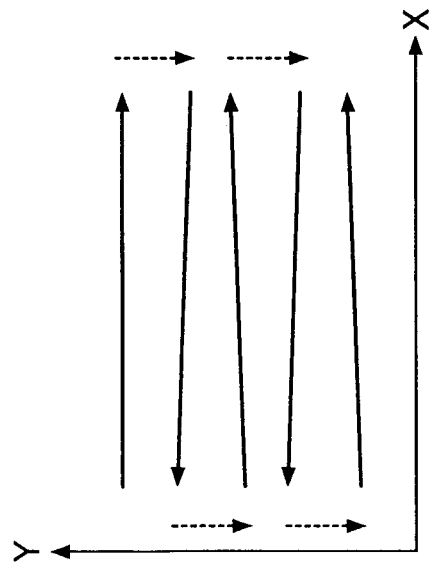

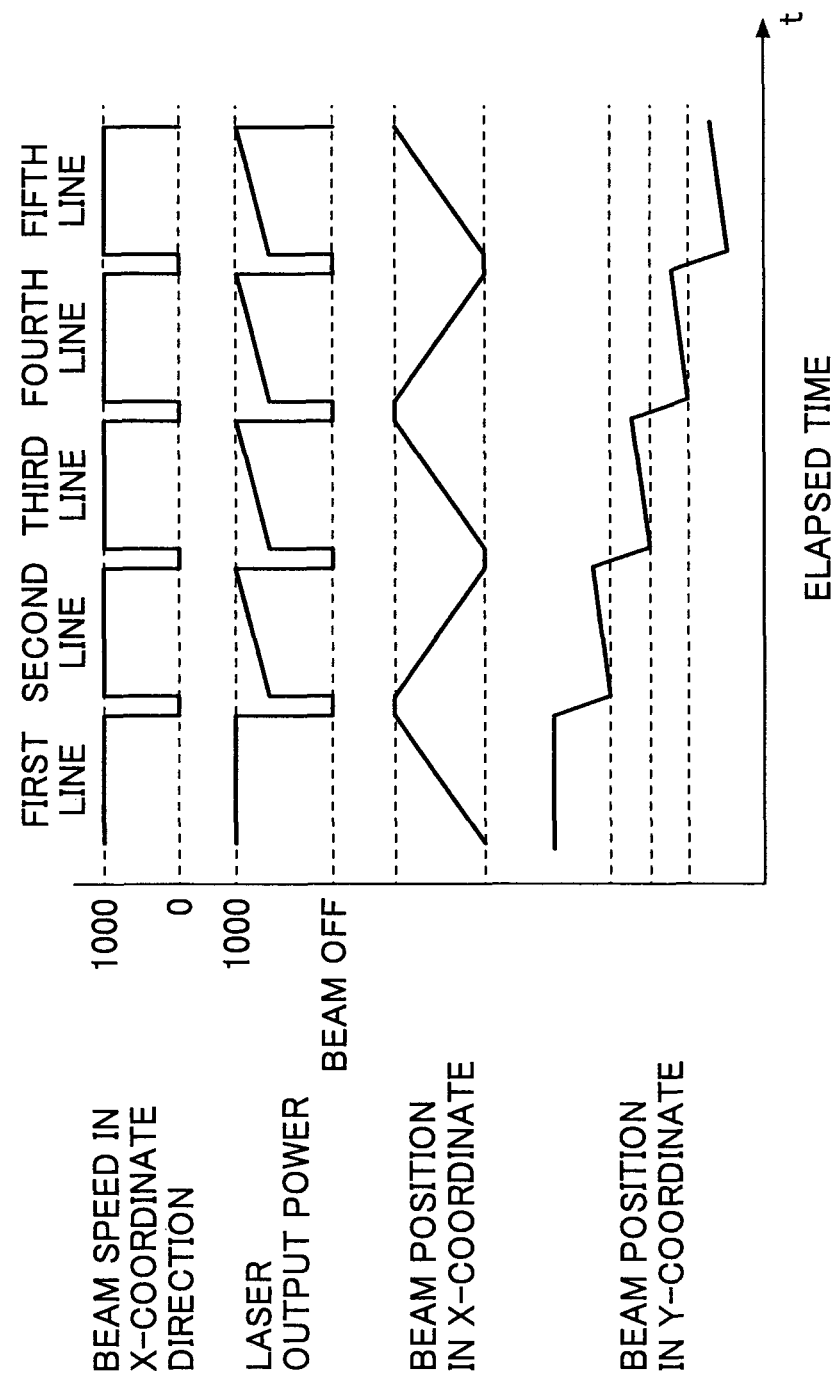

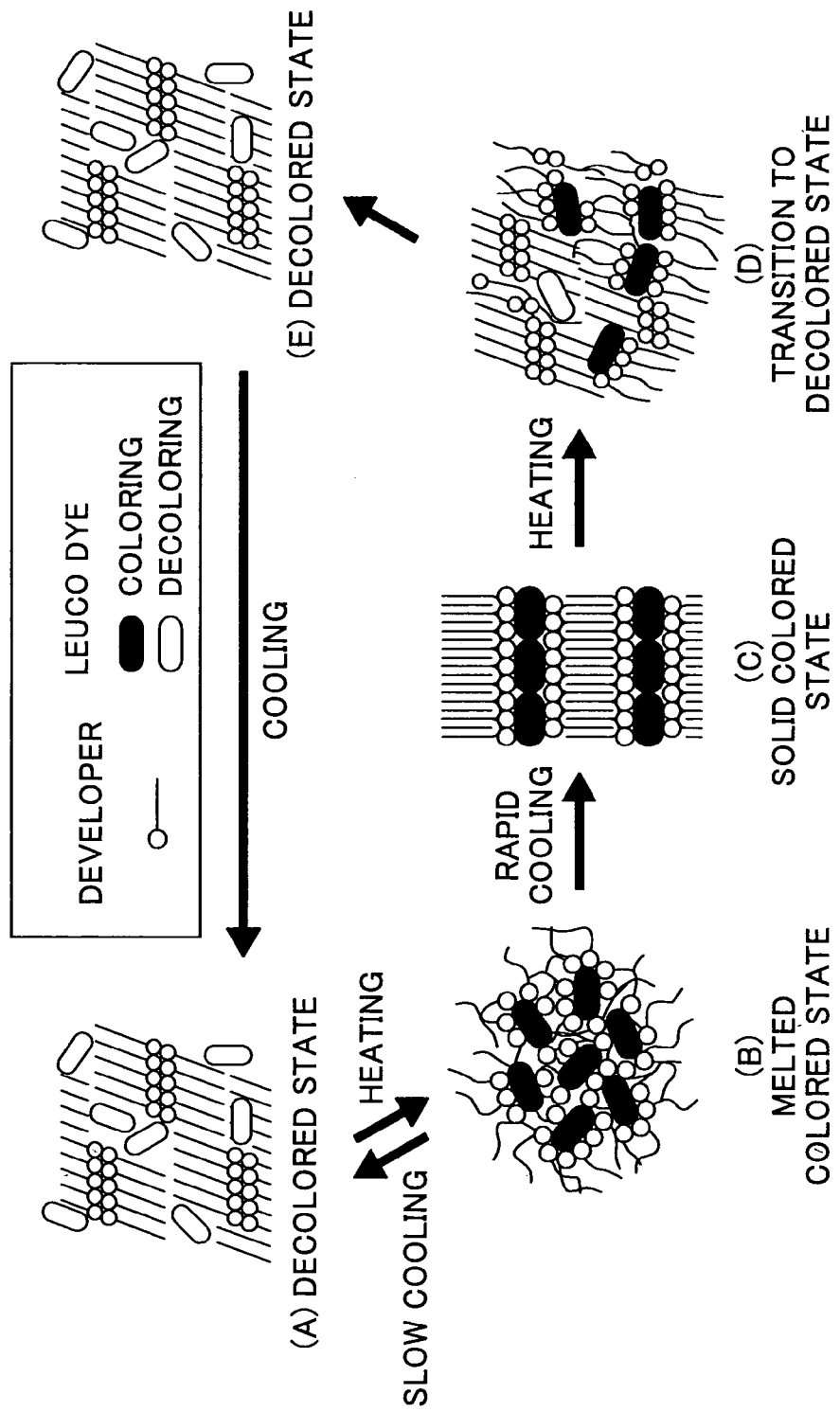

MARKING CONTROL DEVICE, LASER APPLICATION DEVICE, MARKING CONTROL METHOD, AND COMPUTER-READABLE RECORDING MEDIUM HAVING MARKING CONTROL PROGRAM

TECHNICAL FIELD

A certain aspect of the present invention relates to a marking control device, a laser application device, a marking control method, and a computer-readable recording medium embodying a marking control program.

BACKGROUND ART

Commercially available laser application devices (also called "laser markers" or "laser marking devices") are developed based on a technology where characters, numbers, and symbols are thermally recorded on a medium such as a thermosensitive paper by the application of laser beams.

A laser beam emitted from a laser light source of the laser application device is applied to media such as plastic or thermosensitive paper, such that characters, symbols, etc., are recorded on such media. Examples of the laser light source include a gas laser, a solid-state laser, a liquid laser, and a semiconductor laser (i.e., a laser diode, LD).

With metallic or plastic media, heat generated upon the application of a laser beam engraves or singes surfaces of the media, so that characters and symbols are recorded on the metallic or plastic media. On the other hand, the thermosensitive paper has a characteristic of changing its colors with heat, and the heat generated upon the application of a laser beam causes recording layers of the thermosensitive paper to generate colors. Accordingly, characters and symbols are recorded on the thermosensitive paper.

Compared to the metallic or plastic media, the thermosensitive paper is relatively easy to handle and hence is widely used as labeling media. For example, distribution destinations of articles or article names are recorded on the thermosensitive paper used as labeling media in the physical distribution field.

Recently, rewritable thermosensitive paper (hereinafter called "thermal rewritable media" or "thermoreversible recording media") have been made available, on which information can be repeatedly recorded or erased.

At present, with the thermoreversible recording media, images are recorded on or erased from the reversible recording medium by direct contact with a heat source (i.e., a contact recording/erasing process). In this case, a thermal head is generally used as the heat source in image recording, and a thermal roller, ceramic heater, and the like may be used as the heat source in image erasing.

Such a contact recording/erasing process has the following advantages. That is, when the thermoreversible recording medium is a flexible medium such as a film or paper, the flexible recording medium may be uniformly pressed against the heat source with a platen to uniformly record images on or erase the images from the flexible recording medium. In addition, since components of a conventional printer specifically used for thermosensitive paper may be diverted to become components of a new image recording apparatus or those of a new image erasing apparatus, manufacturing costs of the new image recording or image erasing apparatus may be reduced.

FIG. 1 is a diagram illustrating a coloring/decoloring principle in a thermal rewritable medium.

The thermal rewritable medium includes a recording layer that reversibly changes its color tone into a transparent status or a colored status with heat. The recording layer includes leuco dyes of organic low-molecular substances and reversible developers (hereinafter simply called "developers").

As illustrated in FIG. 1, when the recording layer in a decolored state A is heated to a melting temperature T2, the leuco dyes and the developers in the recording layer are melted and mixed so that the recording layer is colored in a melted colored state B. When the recording layer in the melted colored state B is rapidly cooled, a temperature of the recording layer is decreased to room temperature while the recording layer maintains its colored state, thereby stabilizing the colored state of the recording layer. Accordingly, the recording layer is in a solid colored state C. Whether the recording layer is capable of obtaining such a solid colored state C depends on a speed of heating or cooling the recording layer in the melted colored state B. If the recording layer is slowly cooled, the recording layer is decolored to be in the initial decolored state A. If, on the other hand, the recording layer is rapidly cooled, the recording layer acquires a relatively dense color compared to that in the solid colored state A.

Meanwhile, when the recording layer in the solid colored state C is heated again, the recording layer is decolored at a temperature T1 lower than a coloring temperature (from D to E), and if the recording layer in the solid colored state C is then cooled, the recording layer returns to the initial decolored state A.

In the recording layer in the solid colored state C changed from the melted state by rapid cooling, colored leuco dye molecules and developer molecules are mixed while they remain in contact reactive states, and the molecules in the contact reactive states often form solids. In this state, the melted mixture (colored mixture) of the leuco dyes and developers is crystallized while retaining its colored state, and hence, the color of the mixture may be stabilized due to this crystallized structure. In the decolored state, phases of the leuco dyes and the developers are separated from one another. In the phase-separation state, the molecules of one of the leuco dye compound and the developer compound are cohered or crystallized. Accordingly, the leuco dyes and the developers are separately stabilized due to their cohesion or crystallization. In many cases, more complete decoloration (color erasure) of the recording layer may be obtained due to the phase separation of the leuco dyes and the developers, and crystallization of the developer.

Note that erasing failure, where the recording layer repeatedly heated at an erasing temperature is unable to decolor, may occur if the recording layer is repeatedly heated to a temperature T3 that is equal to or higher than the melting temperature T2. The erasing failure may result from thermal decomposition of the developer, because the thermally decomposed developer is resistant to cohesion or crystallization and thus the thermally decomposed developer may not be easily separated from the leuco dye. Deterioration of the thermoreversible recording medium due to repeated heating and cooling may be controlled by decreasing the difference between the melting temperature T2 and the temperature T3 while heating the thermoreversible recording medium.

Such thermoreversible recording media are widely used in the physical distribution field, and various improvements have been made to a recording (marking) method in the recording of the thermoreversible recording media.

For example, when adjacent first and second lines are marked, the residual heat of the first line initially marked may interfere with the heating of the second line while the second line is being marked. This interference may result in decoloration of the recording in the thermoreversible recording media. Japanese Patent Application Publication No. 2008-62506 (hereinafter referred to as "Patent Document 1"), for example, discloses a technology in which such decoloration is controlled by adjusting a time or an overlapping width between a marking start point of the first line and a marking end point of the second line.

However, if the thermoreversible recording medium contains an RF-ID tag, the thermoreversible recording medium has an increased thickness and thus is less flexible. Accordingly, higher pressure may be required when the heat source is uniformly pressed against the thermoreversible recording medium (see Japanese Patent Application Publication No. 2004-265247 (hereinafter referred to as "Patent Document 2") and Japanese Patent No. 3998193 (hereinafter referred to as "Patent Document 3")).

Further, if printing and erasure are repeated in such a contact recording/erasing process, the recording medium obtains an uneven surface due to ablation. Accordingly, erasing failure or density decrease may occur due to non-uniform application of heat resulting from portions of the recording medium not contacting the heat source such as a thermal head or hot stamp (see Japanese Patent No. 3161199 (hereinafter referred to as "Patent Document 4") and Japanese Patent Application Publication No. 9-30118 (hereinafter referred to as "Patent Document 5")).

Japanese Patent Application Publication No. 2000-136022 (hereinafter referred to as "Patent Document 6") discloses a technology in which an image is uniformly recorded on and erased from an uneven surface of the thermoreversible recording medium using a laser, or an image is uniformly recorded on the thermoreversible recording medium from a distance using a laser. This technology is used for transportation containers. With this technology, contactless recording is performed on thermoreversible recording media that are attached to the transportation containers, where recording is carried out by laser beams but erasure is carried out by hot air, hot water, or an infrared heater.

Inspired by contactless reading or contactless rewriting of recording information performed on RF-ID tags from a distance, there is a desire that images also be rewritten on the thermoreversible recording media from a distance.

In such a laser recording technology, a laser recording device (generally called a "laser marker") is used. The laser marker is configured to control a laser beam such that the laser beam is applied to an appropriate position of the thermoreversible recording medium when the laser marker applies a high-power laser beam to the thermoreversible recording medium. In this laser marker, the thermoreversible recording medium absorbs a laser beam and converts the absorbed laser beam into heat, so that information is recorded or erased by the converted heat. Japanese Patent Application Publication No. 11-151856 (hereinafter referred to as "Patent Document 7") discloses a laser recording-erasing technology in which images are recorded on or erased from the thermoreversible recording media, and formed based on a combination of a leuco dye, a reversible developer, and various photothermal conversion materials by the application of infrared laser beams.

Further, Japanese Patent Application Publication No. 2008-213439 (hereinafter referred to as "Patent Document 8") discloses an image processing method (image marking control method) in which when laser beams aligned at predetermined intervals are applied in parallel to scan in the same directions, discontinuous application of the laser beams may be partially included. For example, when the laser beam scans from a first starting point to a first ending point, the laser beam is caused to scan a second starting point by jumping from the first ending point to the second starting point where the first ending point and the second starting point are separated by a predetermined interval (gap).

With above related art technologies, the thermoreversible medium may be uniformly heated so that image quality and repeated durability of image formation on the medium are improved; however, image recording or erasing time may be increased due to time required for jumping across drawing line intervals and waiting time during jumping.

Moreover, Japanese Patent No. 3557512 (hereinafter referred to as "Patent Document 9") discloses a technology in which a laser beam scans in a looped or a convoluted fashion so as to apply the laser beam to an entire cell region. In this case; however, excessive heat is applied to curved portions of the loop or convolution so that the repeated durability of image formation in the thermoreversible recording medium is lowered.

Thus, in the related art technologies, there may be few image recording technologies capable of printing with high printing quality and high repeated durability of image formation, and recording an image on a medium in a short time; or there may be few image erasing technologies capable of uniformly applying heat to the recording medium, acquiring a wide erasing width of the medium, and erasing the recorded image in a short time.

The above related art technologies may include the following drawbacks.

The laser marker generally scans plural lines in parallel to fill an area with a solid color. However, with a thermal rewritable medium, simply scanning plural lines in parallel may not achieve the solidly filled color.

As illustrated in FIG. 1, the thermal rewritable medium has the decoloring temperature between the room temperature and the coloring temperature. Thus, when the thermal rewritable medium is heated with a laser beam, peripheries of the marked lines become decoloring temperature regions of the rewritable medium due to output intensity distribution of the laser spot or thermal diffusion on the rewritable medium. Further, if a coloring property of the rewritable medium is broad with a temperature, the densities of the scanned lines may not be uniform in width directions of the scanned lines. In order to fill an area with the uniform density, a line is marked by slightly overlapping a previously marked line such that a residual heat region in the periphery of the previously marked line is cancelled (see Patent Document 1).

Note that since the residual heat of the scanned line decreases with time, it is important to control time intervals in marking lines using the residual heat. In view of discoloring due to accumulated heat, if a marking speed is high or a marked line is short, it is preferable that a time interval in marking lines be long, whereas if the marking speed is low or the marked line is long, it is preferable that a time interval in marking lines be short.

FIGS. 2A, 2B, and 2C are diagrams illustrating a marking method in which a subsequent line is marked (scanned) by partially overlapping a previous line. FIGS. 3A and 3B are diagrams illustrating a marking method in which lines are marked by reciprocating scanning.

In FIG. 2A, flat ovals indicate a profile of coloring line, solid line arrows indicate operations of marking (marking operations), and broken arrows indicate jumping operations (non-emitting operations) between marking points, so that an area is filled with a solid color by repeating the following steps 1 to 3.

Step 1. A laser marker is illuminated to scan a line from a first starting point in a plus direction of an X-axis with a predetermined laser power at a predetermined speed.

Step 2. The laser marker is turned off and moved to a second starting point (in a minus direction of a Y-axis direction).

Step 3. The laser marker waits for a predetermined waiting time.

Accordingly, the area is filled in solid as illustrated in FIG. 2B. In the marking method illustrated in FIG. 2A, since the laser marker carries out jumping operations (non-emitting operation) and waiting while repeating to mark marking lines in the plus directions of X-axis as illustrated in FIG. 2C, solidly filling an area with the marking lines may require a long time. However, if thick lines such as a barcode are marked, the above method may be necessary for solidly filling the area with the marking lines. Thus, a higher marking speed may be required for shortening the marking time.

In the example of solidly filling the area illustrated in FIGS. 2A, 2B, and 2C, the lines are repeatedly marked in the same directions to solidly fill the area, so that the laser marker (or beam) needs to jump (carry out a non-emitting operation) a distance corresponding to a length of the marked line or longer. Thus, this method is not suitable for high speed marking.

However, in ink-jet printers, it is commonly known in the art that lines are marked in two opposite directions while reciprocating a printer head in the two directions. Accordingly, the lines may be marked by a laser marker at higher scanning speeds with a reciprocating scanning method illustrated in FIG. 3A.

However, when the marking direction is reversed (i.e., opposite direction), marking is started with a side where marking of the previous line is finished. Thus, the laser marker needs to have a longer waiting time for allowing the residual heat to dissipate, which may not contribute to a reduction in an overall marking time as illustrated in Patent Document 1.

Further, an effect of the residual heat of the previously marked line is greater in the next starting point of a subsequent marking line and smaller in the next ending point of the subsequently marked line. Accordingly, color variability may be obtained when the lines are marked with a weak (low) laser power as illustrated in FIG. 3B. On the other hand, if the lines are marked with a high (strong) laser power, the area may be uniformed filled with solid lines without color variability. However, if marking and erasing are repeated, the starting point portions with high densities illustrated in FIG. 3B may be some quickly deteriorated and thus these portions of lines may no longer be erasable.

The inventors of the present invention have found the following based on various examinations.

A related art method illustrated in FIGS. 4A, 4B, and 4C is used as a laser beam scanning method for solidly filled image printing and solidly filled image erasure using a round laser beam. In FIGS. 4A to 4C, a laser marker scans thick solid lines with laser beams at uniform speeds, whereas the laser marker carries out non-emitting operations indicated by broken lines without emitting a laser beam.

A laser scanning method illustrated in FIG. 4A is capable of scanning a laser beam in a short time so that a solidly filled image printing or solidly filled image erasure may be carried out in a short time. However, excessive energy may be applied to the medium due to effects of a (low) scanning speed of a laser beam in turning portions of the lines and heat accumulated in the turning portions of the lines. These effects are obtained by marking a starting point of a second laser beam marking line 412 immediately after marking an ending point of a first laser beam marking line 411. Accordingly, density (color) variability (density lowered in the image portion and color appearing in the image erased portion) may be obtained in the solidly filled image portion or in the image erased portion on the medium.

A laser scanning method illustrated in FIG. 4B is capable of scanning a solidly filled image printing in a short time with little effect of lowering a scanning speed at turning portions of the lines. However, there is still the effect of heat accumulated in the turning portions of the lines obtained by marking the starting point of the second laser beam marking line 421 immediately after marking the ending point of the first laser beam marking line 422, such that excessive energy may be applied to the medium. Accordingly, density (color) variability (density lowered in the image portion and color appearing in the image erased portion) may be obtained in the solidly filled image portion or in the image erased portion of the medium. Further, the repeated durability of the solidly filled image may be lowered.

Moreover, laser scanning method illustrated in FIG. 4C eliminates adverse effects of the scanning speed and the heat accumulation in the turning portions of the lines, such that excessive energy may not be applied to the medium. Accordingly, the density (color) variability may not be obtained in the solidly filled image portion or in the image erased portion of the medium. Further, the repeated durability of the solidly filled image may be improved. However, with this method, time for non-emitting portions (no laser application) may be longer, thereby increasing the image printing time and image erasure time. In addition, with this method, since the effect of heat accumulation in the turning portions of the lines is lowered, the second laser beam marking line 432 is marked or erased in a cooled state after the scanning of the first laser beam marking line 431. Accordingly, the accumulated heat is not utilizable for marking or erasing of the second laser beam marking line 432. As a result, high energy is required for the marking or erasing of the subsequent laser beam marking lines. Thus, the solidly filled image printing time or image erasure time may not be reduced due to inability to increase the scanning speed.

However, as illustrated in FIG. 5B, if the laser beam marking line 451 is marked and scanned from the first starting point to the first ending point, and the second laser beam marking line 452 is subsequently marked adjacent to the first laser beam marking line 451 from the second starting point to the second ending point such that the second ending point of the second laser beam marking line 452 is located in a line slanted toward the first starting point of the first laser beam marking line 451 based on a line in parallel with the first laser beam marking line 451, density variability in the solidly filled image area (portion) or the image erased area (portion) may be suppressed. Accordingly, the repeated durability of the solidly filled image may be improved and the solidly filled image printing time or image erasure time may be lowered.

SUMMARY OF THE INVENTION

Embodiments of the present invention provide a marking control device, a laser application device, a marking control method, a marking control program, and a recording medium embodying such a marking control program that solve or reduce one or more problems caused by the limitations and disadvantages of the related art. Specifically, a marking control device, a laser application device, a marking control method, a marking control program, and a recording medium embodying such a marking control program that enable laser scanning image formation with high quality and high repeated durability, obtaining a wide image erasable energy width when erasing an image, and image recording or erasing processing in a short time.

The embodiments have attempted to provide a marking control device, a laser application device, a marking control method, a marking control program, and a recording medium embodying such a marking control program capable of reducing a marking time in marking an image while maintaining high quality of the marked image.

According to an embodiment of the present invention, there is provided a marking control device for controlling a marking device that marks a target image on a thermoreversible recording medium by applying a laser beam to the thermoreversible recording medium. The marking control device includes a marking position determination unit configured to divide the target image into a first marking line and a second marking line that are adjacent to each other, and determine a marking position of each of the adjacent first and second marking lines; a marking order determination unit configured to determine a marking order of the adjacent first and second marking lines for marking the target image such that the second marking line is marked in a direction opposite to a direction in which the first marking line is marked; an adjusting unit configured to adjust, when the first marking line is initially scanned and the second marking line is reciprocally scanned subsequent to the first marking line, a first distance between a first ending point of the first marking line and a second starting point of the second marking line to be longer than a second distance between a first starting point of the first marking line and a second ending point of the second marking line, or a laser output power of the laser beam applied to a second starting point side of the second marking line to be lower than a laser output power of the laser beam applied to a second ending point side of the second marking line; and a marking instruction generator unit configured to generate a set of marking instructions including the respective marking positions of the first and second marking lines and the marking order of the first and second marking lines.

According to another embodiment, there is provided a laser application device that includes a laser oscillator configured to generate a laser beam; a direction control mirror configured to control a direction of the generated laser beam; a direction control motor configured to drive the direction control mirror; and a marking control device configured to control an output power of the laser oscillator, and the driving of the direction control motor based on the set of the marking instructions.

According to another embodiment, there is provided a marking control method for controlling a marking device that marks a target image on a thermoreversible recording medium by applying a laser beam to the thermoreversible recording medium. The marking control method includes dividing the target image into a first marking line and a second marking line that are adjacent to each other, and determining a marking position of each of the adjacent first and second marking lines; determining a marking order of the adjacent first and second marking lines for marking the target image such that the second marking line is marked in a direction opposite to a direction in which the first marking line is marked; adjusting, when the first marking line is initially scanned and the second marking line is reciprocally scanned subsequent to the first marking line, a first distance between a first ending point of the first marking line and a second starting point of the second marking line to be longer than a second distance between a first starting point of the first marking line and a second ending point of the second marking line, or a laser output power of the laser beam applied to a second starting point side of the second marking line to be lower than a laser output power of the laser beam applied to a second ending point side of the second marking line; and generating a set of marking instructions including the respective marking positions of the first and second marking lines and the marking order of the first and second marking lines.

According to another embodiment, there is provided a computer-readable recording medium having a marking control program embodied therein including a set of instructions for controlling a marking device to mark a target image on a thermoreversible recording medium by applying a laser beam to the thermoreversible recording medium, which, when executed by a processor, causes a computer to function as a marking position determination unit configured to divide the target image into a first marking line and a second marking line that are adjacent to each other, and determine a marking position of each of the adjacent first and second marking lines; a marking order determination unit configured to determine a marking order of the adjacent first and second marking lines for drawing the target image such that the second marking line is marked in a direction opposite to a direction in which the first marking line is marked; an adjusting unit configured to adjust, when the first marking line is initially scanned and the second marking line is reciprocally scanned subsequent to the first marking line, a first distance between a first ending point of the first marking line and a second starting point of the second marking line to be longer than a second distance between a first starting point of the first marking line and a second ending point of the second marking line, or a laser output power of the laser beam applied to a second starting point side of the second marking line to be lower than a laser output power of the laser beam applied to a second ending point side of the second marking line; and a marking instruction generator unit configured to generate a set of marking instructions including the respective marking positions of the first and second marking lines and the marking order of the first and second marking lines.

BRIEF DESCRIPTION OF DRAWINGS

Other objects and further features of embodiments will be apparent from the following detailed description when read in conjunction with the accompanying drawings, in which:

FIGS. 2A, 2B, and 2C are diagrams illustrating a marking method in which a line is subsequently marked by partially overlapping a previous line;

FIG. 4A is a diagram illustrating an example of a related art laser beam scanning method for recording or erasing an image;

FIG. 4B is a diagram illustrating another example of the related art laser beam scanning method for recording or erasing an image;

FIG. 4C is a diagram illustrating still another example of the related art laser beam scanning method for recording or erasing an image;

FIG. 5A is a diagram illustrating a laser beam scanning method for recording or erasing an image according to a third embodiment;

FIG. 5B is a diagram illustrating a laser beam scanning method for recording or erasing an image according to a fourth embodiment;

FIG. 8 is a diagram illustrating an example of a marking data structure for use in the marking control device according to the first embodiment;

FIG. 9 is a diagram illustrating an example of a control data structure for use in the marking control device according to the first embodiment;

FIG. 11 is a diagram illustrating an example of data associating a unit line-identifier with a laser power for use in the marking control device according to the first embodiment;

FIGS. 12A, 12B, and 12C are diagrams each illustrating a marking method based on the marking data generated by the marking control device according to the first embodiment;

FIG. 13 is a diagram illustrating a marking method based on marking data generated by a modification of the marking control device according to the first embodiment;

FIGS. 15A, 15B, and 15C are diagrams each illustrating a marking method based on marking data generated by the marking control device according to the second embodiment;

FIG. 19B is a schematic diagram illustrating a coloring/decoloring mechanism of the thermoreversible recording medium;

DESCRIPTION OF EMBODIMENTS

Preferred embodiments of the present invention are described below with reference to the accompanying drawings.

Preferred embodiments of the marking control device, the laser application device, the marking control method, and the recording medium embodying the marking control program are described below with reference to the accompanying drawings.

Hereinafter, the term a "target image" refers to any marks including characters, numbers, symbols, and graphics that are intended to be recorded or marked on the recording medium.

The term a "line component" refers to a portion formed between two predetermined points each having predetermined coordinates. The portion forms part of the target image such as a character. The line component not only represents a portion of a linear line but also represents a portion of a curved line, and the line component has a certain thickness.

In the mark control device according to the embodiment, the target image is divided into plural lines so that the target image is completed by marking (drawing) each line. The "line" indicates one stroke of the character or graphic, which is recorded by applying a laser beam from a starting point to an ending point. The "line" may constitute a series of strokes recorded between the starting point and the ending point. The stroke may be the same as or different from "one stroke" defined by public organizations such as JIS or ISO.

The term "marking order" includes two meanings: one is the order of lines to be drawn, including which side of the line is to be drawn first; and the other is the order of plural target images to be drawn.

First Embodiment

Figure 6:
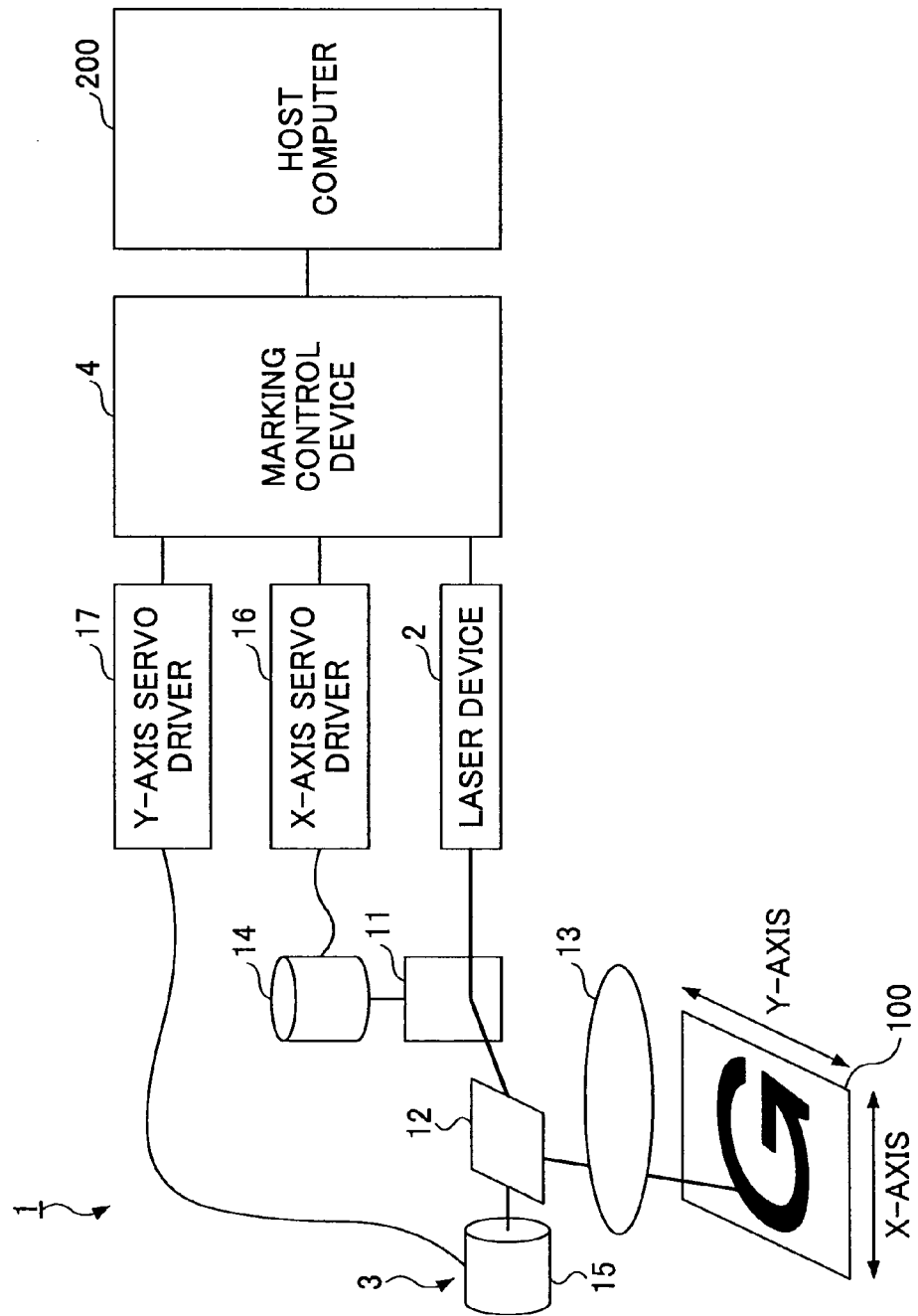
FIG. 6 is a configuration diagram illustrating a laser application device 1 according to a first embodiment.

FIG. 6 is a configuration diagram illustrating a laser application device 1 according to a first embodiment.

The laser application device 1 according to the first embodiment includes a laser device 2 configured to emit a laser beam, a scanner device 3 configured to scan the laser beam emitted from the laser device 2 onto the thermoreversible rewritable medium 100, and a marking control device 4 configured to drive control components of the laser application device 1. The laser application device 1 scans the laser beam on the rewritable medium 100 based on marking instructions received from an external host computer 200 to mark a target image on the rewritable medium 100.

The laser device 2 is configured to emit a laser beam based on an instruction received from the marking control device 4. The laser device 2 may be a semiconductor laser (i.e., a laser diode, LD) device, a YAG laser device, or a carbon dioxide gas laser device; however, the semiconductor laser (i.e., a laser diode, LD) device is preferable among these, due to its relative easiness of laser power control.

The scanner device 3 includes an X-axis galvanometer mirror 11 and a Y-axis galvanometer mirror 12 each composed of a movable mirror for deflecting the laser beam, and an fθ lens 13.

The X-axis galvanometer mirror 11 is driven by a galvanometer 14 to scan the laser beam in an X-axis direction. The Y-axis galvanometer mirror 12 is driven by a galvanometer 15 to scan the laser beam in a Y-axis direction.

The galvanometer 14 is connected to an X-axis servo driver 16, and the galvanometer 15 is connected to a Y-axis servo driver 17. The X-axis servo driver 16 and the Y-axis servo driver 17 are respective drive circuits to control angles of the X-axis galvanometer mirror 11 and the Y-axis galvanometer mirror 12 based on respective instruction values received from the marking control device 4. The X-axis servo driver 16 and the Y-axis servo driver 17 compare position signals acquired from respective angle sensors (not shown) of the X-axis galvanometer mirror 11 and the Y-axis galvanometer mirror 12 with the respective instruction values received from the marking control device 4, and the X-axis servo driver 16 and the Y-axis servo driver 17 then transmit respective drive signals to the galvanometers 14 and 15 so as to minimize the errors of the compared results.

The fθ lens 13 corrects displacement angles of the X-axis galvanometer mirror 11 and the Y-axis galvanometer mirror 12 such that the respective displacement angles are in proportion to a displacement distance of the light collecting spot while collecting the laser beams deflected by the X-axis galvanometer mirror 11 and the Y-axis galvanometer mirror 12 on the rewritable medium 100.

The scanner device 3 having the above configuration deflects the laser beam emitted from the laser device 2 with the X-axis galvanometer mirror 11 and further deflects the laser beam deflected by the X-axis galvanometer mirror 11 with the Y-axis galvanometer mirror 12, such that the laser beam deflected by the Y-axis galvanometer mirror 12 is applied to the rewritable medium 100 via the fθ lens 13. In this process, the laser beam may be scanned two-dimensionally by appropriately modifying the respective angles of the X-axis galvanometer mirror 11 and the Y-axis galvanometer mirror 12.

The marking control device 4 includes a processing device such as an ASIC (not shown) or a CPU (not shown), a ROM (not shown) storing a predetermined program for controlling operations of the marking control device 4, and a storage device such as a RAM used as a working area of the processing device. The processing device and the storage device constitute a computer. The marking control device 4 is electrically connected to the host computer 200, the laser device 2, the X-axis servo driver 16, and the Y-axis servo driver 17.

Note that the laser device 2, the X-axis galvanometer mirror 11, the Y-axis galvanometer mirror 12, the fθ lens 13, the galvanometer 14, the galvanometer 15, the X-axis servo driver 16, and the Y-axis servo driver 17 constitute a marking device of the laser application device 1.

Figure 7:
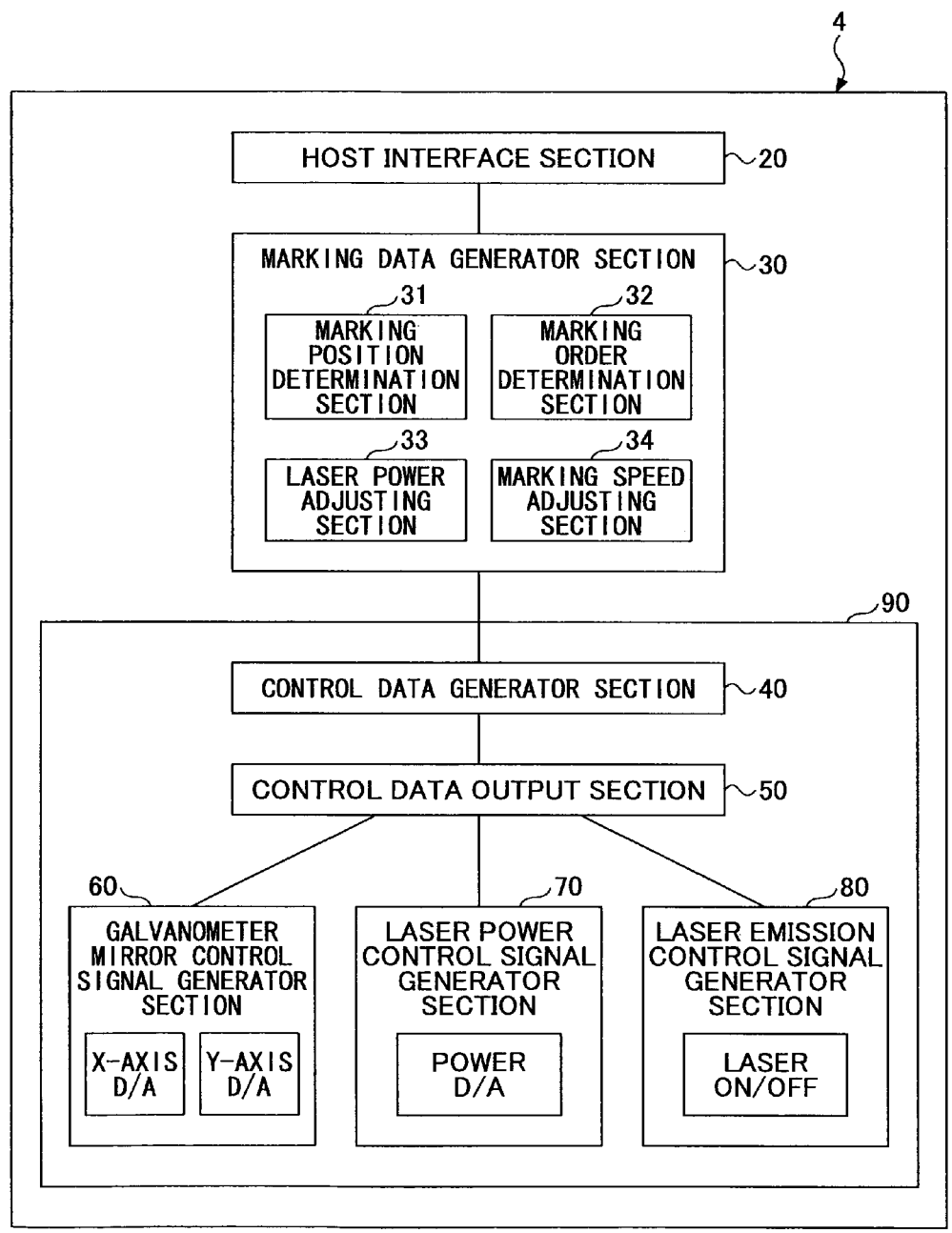
FIG. 7 is a configuration block diagram illustrating a marking control device 4 according to the first embodiment.

FIG. 7 is a configuration block diagram illustrating the marking control device 4 according to the first embodiment.

As illustrated in FIG. 7, the marking control device 4 implements respective functions of a host interface section 20, a marking data generator section 30, a control data generator section 40, a control data output section 50, a galvanometer mirror control signal generator section 60, a laser power control signal generator section 70, and a laser emission control signal generator section 80, in cooperation with the processing device and the program stored in the storage device.

Further, the marking control device 4 implements a laser emitting section 90 as a function of a marking instruction generator unit that includes the control data generator section 40, the control data output section 50, the galvanometer mirror control signal generator section 60, the laser power control signal generator section 70, and the laser emission control signal generator section 80, in cooperation with the processing device and the program stored in the storage device.

The host interface section 20 is configured to receive a marking instruction from the host computer 200. When a target image is a barcode, the marking instruction is composed of data including an identifier for identifying a type of the barcode, marking positions and sizes of line components (coordinates of each end) of the barcode. The host interface section 20 transmits, on receiving a code indicating an end of the marking instruction, the marking instruction to the marking data generator section 30.

The marking data generator section 30 includes a marking position determination section 31, a marking order determination section 32, a laser power adjusting section 33, and a marking speed adjusting section 34, and is configured to appropriately encode data representing the barcode contained in the marking instruction to generate marking data. The marking data include control flags including information on positions (coordinate data), the plural line components of the barcode on the rewritable medium 100, a marking order of the line components, laser power, marking speed, and turning on or off the laser.

The marking position determination section 31 is a marking position determination unit configured to determine the positions (coordinate data) of the plural line components of the barcode on the rewritable medium 100 based on the marking instruction. The marking order determination section 32 is a marking order determination unit configured to determine the marking order of each line component of the barcode. The laser power adjusting section 33 is a laser power adjusting unit configured to adjust laser power for drawing each line component and set the laser on/off. The marking speed adjusting section 34 is configured to adjust a marking speed (i.e., respective drive speeds of the X-axis galvanometer mirror 11 and the Y-axis galvanometer mirror 12) to mark the target image on the rewritable medium 100.

The marking control device 4 receives the marking instruction from the host computer 200, generates the marking data by defining the target image by plural line components, controls respective positions of the X-axis galvanometer mirror 11 and the Y-axis galvanometer mirror 12, and controls emission time and emission power of the laser beam emitted from the laser device 2 to draw the target image on the rewritable medium 100.

FIG. 8 is a diagram illustrating an example of a marking data structure for use in the marking control device 4 according to the first embodiment.

The marking data include plural unit marking data portions. As illustrated in FIG. 8, unit marking data D1 include a coordinate data portion D1a specifying coordinates (X-coordinate, Y-coordinate) of a laser beam transfer point, a laser power coefficient portion D1b for setting an output power of a laser beam and a laser speed coefficient portion D1b for setting an output speed of the laser beam, and a control flag portion D1c for setting the laser beam on or off before the laser beam reaches the specified coordinates.

The unit marking data D1 are 8-byte data in the first embodiment. The X-coordinate of the coordinate data portion D1a includes two-byte signed binary data and the Y-coordinate of the coordinate data portion D1a includes two-byte signed binary data. The laser power coefficient portion D1b is used for setting the output power of the laser beam in permillage based on a reference output. The control flag portion D1c includes a final coordinate flag indicating whether specified coordinates are final coordinates and a laser beam flag indicating on or off of the laser beam. The final coordinate flag may be written as data of $15^{th}$ bit, where "1" is set if there are no data subsequent to the unit marking data D1, and the unit marking data D1 are final data, whereas "0" is set if there are some data subsequent to the unit marking data D1, and the unit marking data D1 are not final data. The laser beam flag may be written as data of the $14^{th}$ bit, where "0" is set when the laser beam is turned off, whereas "1" is set when the laser beam is turned on. As described above, the control flag portion D1c includes instructions for a marking operation for marking each line component of the barcode and a jumping operation (non-emitting operation) for not connecting line components while marking the line components.

The marking data generator section 30 transmits, on generating the marking data, the generated marking data to the control data generator section 40.

The control data generator section 40 moves the X-axis galvanometer mirror 11 and the Y-axis galvanometer mirror 12 at respective predetermined speeds, turns the laser on or off at predetermined timings, and generates control data for altering the laser power at predetermined timings based on the marking data. In order to move the X-axis galvanometer mirror 11 and the Y-axis galvanometer mirror 12 at constant speeds, precise instructions may be required for moving them between coordinates of the marking data per speed timing; laser emitting timing may be delayed based on the specified positions of the X-axis galvanometer mirror 11 and Y-axis galvanometer mirror 12 in view of possible following delays of the X-axis galvanometer mirror 11 and Y-axis galvanometer mirror 12, and a response characteristic of the laser device 2. Further, the control data generator section 40 carries out offset processing to move overall marking positions of the marking data to appropriate positions on the rewritable medium 100. Note that the laser application device 1 includes standard values for a marking speed or laser emitting timing; however, these values may be altered from outside.

FIG. 9 is a diagram illustrating an example of a control data structure for use in the marking control device 4 according to the first embodiment.

The control data are values converted from the marking data in order to set the values in a later-described DA converter. The preparation of such converted values may accelerate data output speeds. The control data include plural unit control data D2. As illustrated in FIG. 9, the plural unit control data D2 include an X-output power portion D2$a$, a Y-output power portion D2$b$, an output power setting portion D2$c$, a data interval portion D2$d$, and a control flag portion D2$e$. The X-output power portion D2$a$ is used for specifying a position control value for the X-axis galvanometer mirror 11, the Y-output power portion D2$b$ is used for specifying a position control value for the Y-axis galvanometer mirror 12, the output power setting portion D2$c$ is used for specifying an output power control value for output power of the laser beam, and the data interval portion D2$d$ is used for writing an interval between the current unit control data D2 and a subsequent unit control data D2. The control flag portion D1$c$ includes a laser emitting flag, an X/Y output specifying flag, an output power specifying flag, and an end flag. The laser emitting flag may be written as data of $15^{th}$ bit, where 1 is set when the laser beam is turned on. The X/Y output specifying flag may be written as data of $14^{th}$ bit, where 1 is set when the position control values for the X-axis galvanometer mirror 11 and the Y-axis galvanometer mirror 12 are output. The output power specifying flag may be written as data of $13^{th}$ bit, where 1 is set when the output power value of the laser beam is output. The end flag may be written as data of $12^{th}$ bit, where 1 is set when the current unit control data D2 is the final unit control data D2.

The control data generator section 40 transmits, on generating the control data, the generated control data to the control data output section 50.

The control data output section 50 waits, on receiving a first unit control data of the control data, until a marking start instruction is input. Although the control data output section 50 may be configured to start marking simultaneously upon receiving the unit control data, the control data output section 50 basically starts marking after receiving the marking start instruction signal from outside because the rewritable medium 100 is moved by a separate device such as a conveyor controller.

When the control data output section 50 starts marking, the control data output section 50 sets, immediately after reading the unit control data, respective data intervals in a CPU timer in the marking control device 4 for generating timing for outputting the subsequent control data. Accordingly, output timing may be stabilized even if post-processing includes timing differences. Next, the laser emitting flag value of the unit control data is output to the process, if the X/Y output specifying flag is on, respective values of the X-output power portion D2$a$ and the Y-output power portion D2$b$ of the unit control data are output to the galvanometer mirror control signal generator section 60. If the output power specifying flag is on, the value of the output power setting portion D2$c$ is output to the laser emission control signal generator section 70. Thus, one cycle of outputting the control data is completed. Thereafter, the control data output section 50 repeats waiting for timer interruption and outputting subsequent control data. When the end flag is on, the control data output section 50 ends marking.

The galvanometer mirror control signal generator section 60 includes two channels of DA converters having 16-bit resolution. The DA converters are connected to the respective X-axis servo driver 16 and Y-axis servo driver 17. The laser power control signal generator section 70 includes one channel of a DA converter having 16-bit resolution. The DA converter is connected to the laser device 2. The laser emission control signal generator section 80 is a binary digital signal port, and is connected to the laser device 2.

As described above, the laser emitting section 90 includes the control data generator section 40, the control data output section 50, the galvanometer mirror control signal generator section 60, the laser power control signal generator section 70, and the laser emission control signal generator section 80. The laser emitting section 90 drives the X-axis galvanometer mirror 11 and the Y-axis galvanometer mirror 12 based on the marking data, and applies a laser beam to the rewritable medium 100 based on the corresponding output power of the laser beam.

Accordingly, the laser application device 1 drives the X-axis galvanometer mirror 11 and the Y-axis galvanometer mirror 12 based on the marking data, and applies a laser beam to the rewritable medium 100, thereby marking the target image on the rewritable medium.

Next, a marking data generation process carried out by the marking control device 4 according to the first embodiment is described.

Figure 10:
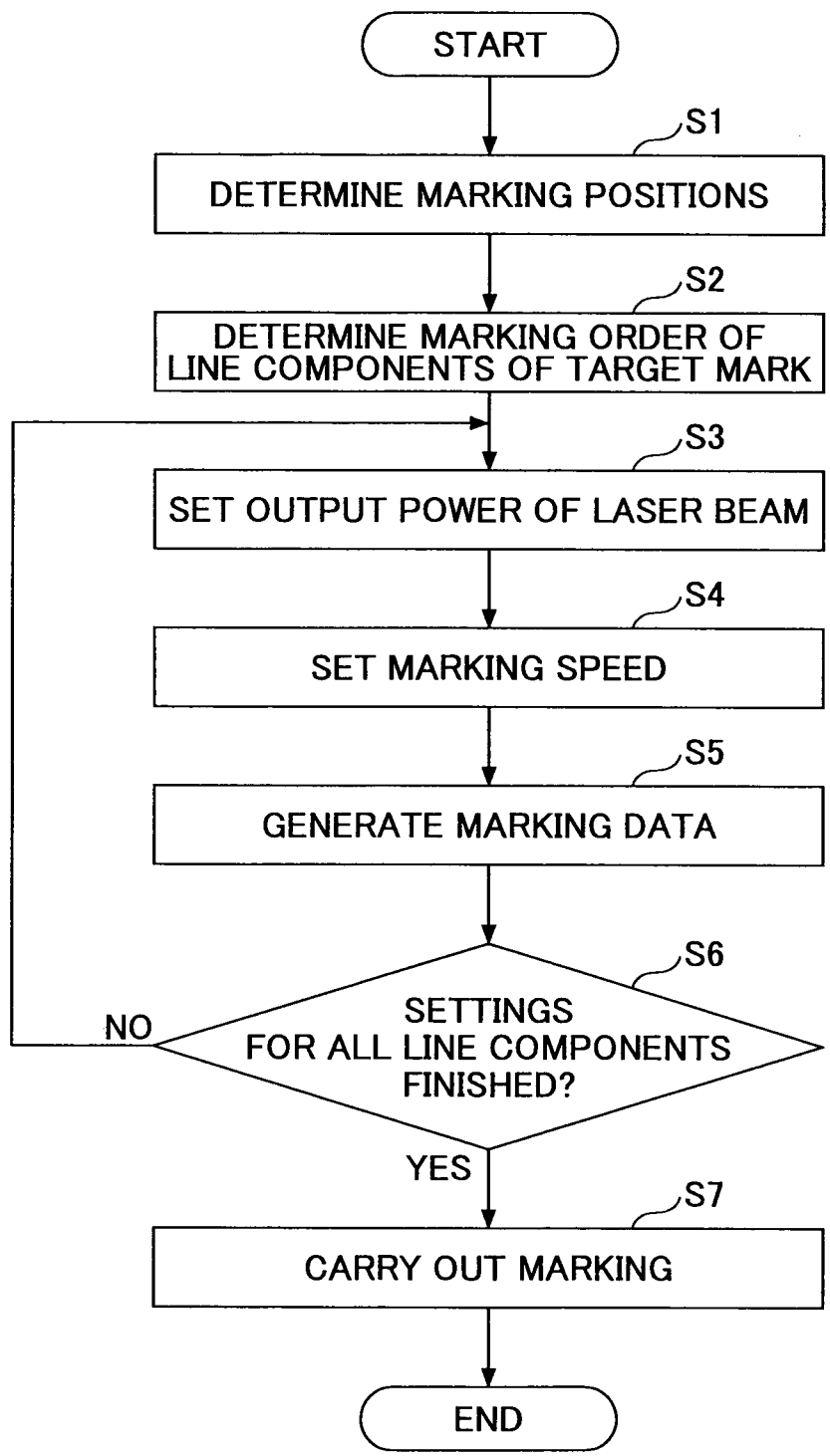
FIG. 10 is a flowchart illustrating a marking data generation process carried out by the marking control device according to the first embodiment.

FIG. 10 is a flowchart illustrating the marking data generation process carried out by the marking control device 4 according to the first embodiment.

The marking data generator section 30 determines positions (coordinate data) of the plural line components of the barcode on the rewritable medium 100 based on the marking instruction (step S1). Specifically, step S1 is carried out by the marking position determination section 31 of the marking data generator section 30.

Next, the marking order determination section 30 determines the marking order of the line components of the barcode (step S2). Specifically, step S2 is carried out by the marking order determination section 32 of the marking data generator section 30, and the marking order determination section 32 determines the marking order of the plural line components of the barcode for each line. In the marking control device 4 according to the first embodiment, the marking order of line components for each line is determined such that mutually adjacent lines are marked by reversing a marking direction of the current marking line from the marking direction of the adjacent line that has been marked immediately before the current marking line. That is, the mutually adjacent lines are marked in the mutually opposite marking directions.

Note that the "mutually adjacent lines" are not only arranged adjacent to one another but they include overlapping portions of the adjacent lines.

The marking data generator section 30 adjusts output power of the laser beam for marking the line components and sets on/off of the laser beam (step S3). Specifically, step S3 is carried out by the laser power adjusting section 33 of the marking data generator section 30, and the laser power adjusting section 33 determines (sets) the output power of the laser beam between a marking start position and a marking end position of each line component of the barcode for each line.

In step S3, the same laser output power (e.g., rated power output) is set to mark from the marking start position to the marking end position of a line component for a first line. However, from the second line onward, a line component is divided into unit line components so that the laser output power may be increased per unit line component as marking from the marking start position to the marking end position of the unit line components. For example, from the second line onward, if one line component is divided into 10 unit line components, the laser output power may be set such that the laser output power is increased in a stepwise fashion by 820, 840, 860, 880, 900, 920, 940, 960, 980, and 1000 in permillage for corresponding unit line components. That is, the laser output power is set such that the laser output power at the marking start position is the maximum output power (rated power output) of the laser device 2 of 840/1000, and is increased in a stepwise fashion up to the maximum output power of 1000/1000 at the marking end position.

As illustrated in FIG. 11, the settings of the above laser output power are set by the laser power adjusting section that refers to data in a table having an identifier of each unit line component and the laser output power associated with the corresponding unit line component. Note that in the data in FIG. 11, one line component is divided into 10 unit line components, and a serial number is given to each unit line component from the marking start position to the marking end position of the line component.

Thus, in the first embodiment, from the second line onward, the laser output power applied to the rewritable medium 100 is increased for each unit line component from the marking start position to the marking end position of the line components for each line in a stepwise fashion.

Next, the marking data generator section 30 sets the marking speed of each line component of the barcode (step S4). Specifically, step S4 is carried out by the marking speed adjusting section 34 of the marking data generator section 30, and the marking speed adjusting section 34 determines the marking speed from the marking start position to the marking end position of each line component for each line (i.e., one line component including 10 unit line components obtained in step S3). In the first embodiment, the marking speed is set at 1000 in permillage.

Next, the marking data generator section 30 generates the marking data (step S5). Thus, the marking data illustrated in FIG. 8 are generated per unit line component.

Next, the marking data generator section 30 determines whether the marking data have been generated for all the line components for all lines (step S6). That is, in step S6, whether the marking data illustrated in FIG. 8 have been generated for all the unit line components for all lines is determined.

In step S6, if the marking data generator section 30 determines that the marking data are not generated for all the line components for all lines, the marking data generator section 30 returns the current process to step S3. Thus, the processes between steps S3 and S6 are repeatedly carried out so as to the laser output power and the marking speed are set for all the line components for all lines.

In step S6, if the marking data generator section 9 determines that the marking data are generated for all the line components for all lines, the generated marking data are converted into control data illustrated in FIG. 9, thereby carrying out marking operations.

Figure 12B:
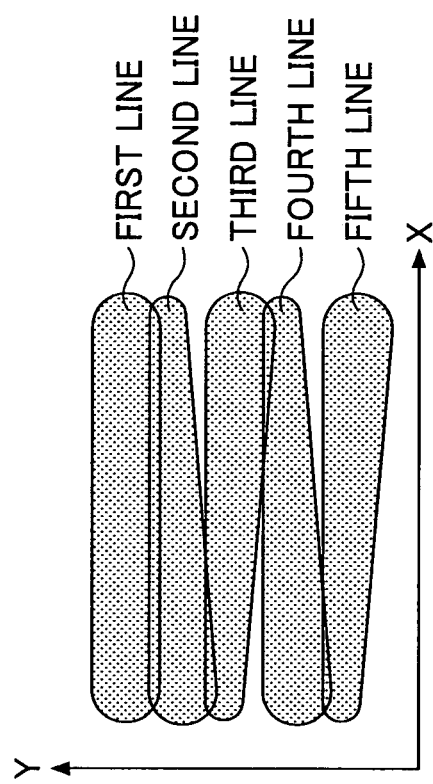
Figure 12A:
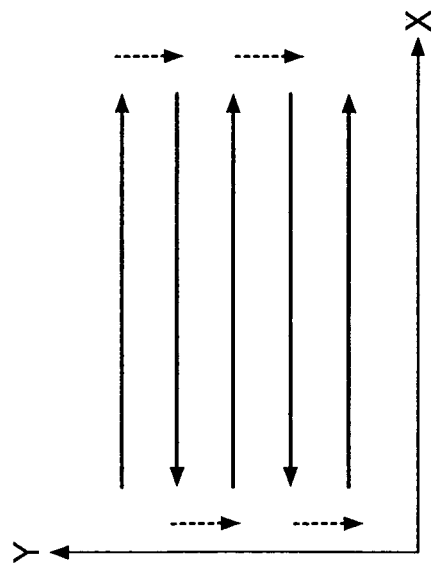

FIGS. 12A, 12B, 12C are diagrams each illustrating a marking method based on the marking data generated by the marking control device 4 according to the first embodiment.

In the marking data generated by the marking control device 4 according to the first embodiment, the marking order of line components for each line is determined such that mutually adjacent lines are marked by reversing a marking direction of the current marking line from the marking direction of the adjacent line that has been marked immediately before the current marking line. Accordingly, the mutually adjacent lines are marked in mutually opposite (reversed) marking directions based on the X-axis direction as illustrated by solid line arrows in FIG. 12A. That is, in the first embodiment, the mutually adjacent lines of the target image are marked by reversing the marking directions from one to the other of the adjacent lines.

The solid line arrows in FIG. 12A indicate positions and directions for marking the line components. The origins of the solid line arrows indicate the marking start positions, and the pointed ends of the solid line arrows indicate the marking end positions of the line components. In addition, broken line arrows in the Y-axis direction indicate jumping (non-emitting operations). Note that in the marking control device 4 according to the first embodiment, no waiting time is inserted between marking operations of the adjacent lines.

Note also that in the marking control device 4 according to the first embodiment, the laser output power is constant while marking the line component from the marking start position to the marking end position for the first line. However, from the second line onward, the laser output power is set such that the laser output power is increased for succeeding unit line components in a stepwise fashion from the marking start position to the marking end position of the line component for each line. Accordingly, the thickness of the line component is increased per unit line component in a stepwise fashion from the marking start position to the marking end position of the line component for each line as illustrated in FIG. 12B.

The above marking method is carried out by following a time chart illustrated in FIG. 12C. In FIG. 12C, a beam speed in an X-coordinate direction indicates the marking speed in the X-axis direction. The beam speed in the X-coordinate direction is set at the same speed and constant with time for all the line components from the first to fifth lines. As illustrated in FIG. 12C, the beam speed in the X-coordinate direction is 0 at intervals between the line components. The intervals in which the beam speed in the X-coordinate direction is 0 correspond to jumping (non-emitting operations) intervals indicated by the broken line arrow in FIG. 12A.

The laser output power is constant (1000/1000) from the marking start position to the marking end position of the line component for the first line. However, the laser output power may be set such that the laser output power is increased for succeeding unit line components in a stepwise fashion with time in a range of 820/1000 to 1000/1000, from the marking start position to the marking end position of each line component for the second line to the fifth line.

The X-coordinate position and Y-coordinate position determined by the above marking method are illustrated in FIG. 12C.

Referring to FIG. 12B, when marking of the line component of the first line in a positive (+) direction of the X-axis direction is completed, the line component of the second line is marked in a negative (−) direction of the X-axis direction. At this moment, residual heat obtained by the laser beam application in the marking end position (right-hand end in the X-axis direction in FIG. 12B) of the line component is higher than residual heat in the marking start position (left-hand end in the X-axis direction in FIG. 12B) of the line component of the first line.

However, in the marking control device 4 according to the first embodiment, when the line component of the second line (second line component) is marked in the negative (−) direction of the X-axis direction, the laser output power is increased for succeeding unit line components in a stepwise fashion from the marking start position (right-hand end in the X-axis direction in FIG. 12B) to the marking end position of the second line component (left-hand end in the X-axis direction in FIG. 12B). Accordingly, thermal energy in the marking start position and in the marking end position of the second line component may be congruent. Note that thermal energy in the marking start position and in the marking end position of a corresponding line component may be congruent in the intervals between the line components of the second and third lines, between the line components of the third and fourth lines, and between the line components of the fourth and fifth lines.

Figure 1:
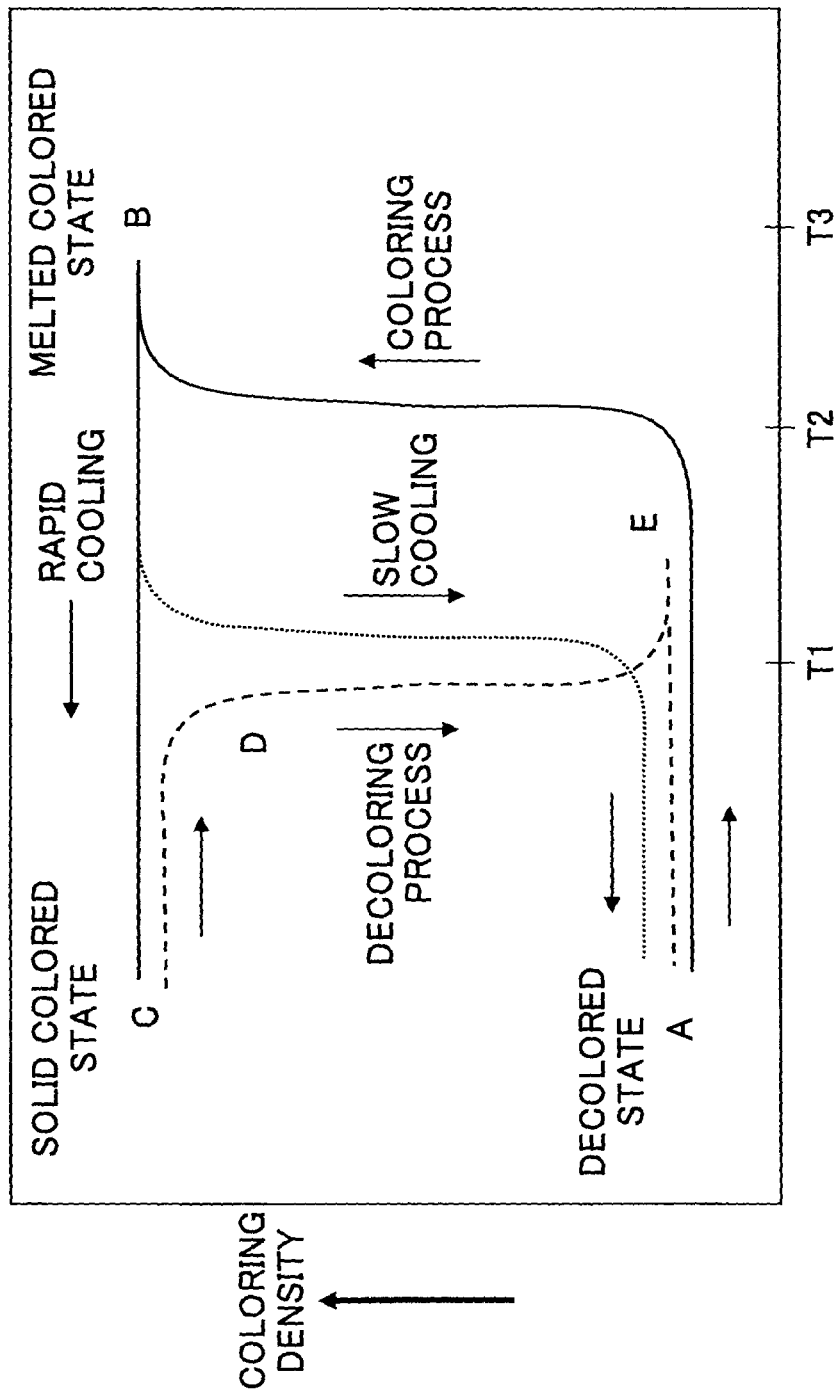
FIG. 1 is a diagram illustrating a coloring/decoloring principle in a thermal rewritable medium.
Figure 2B:
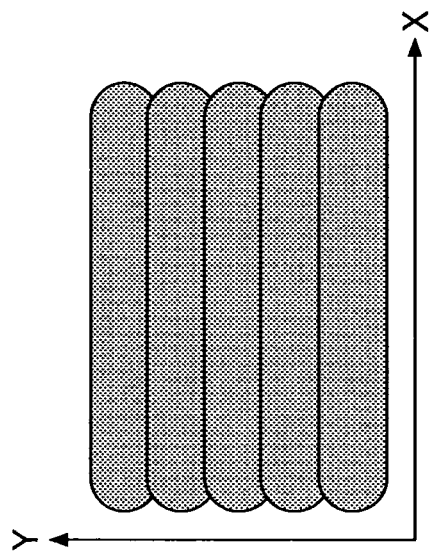
Figure 2A:
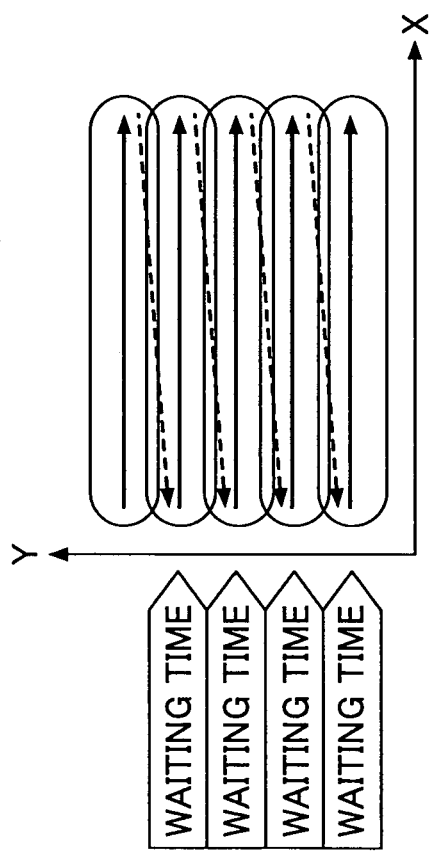
Figure 3B:
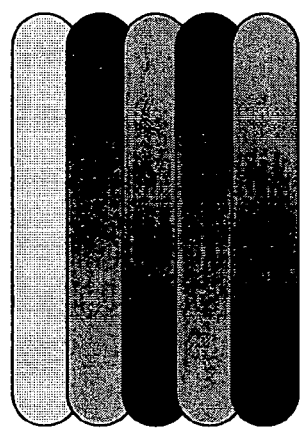
FIGS. 3A and 3B are diagrams illustrating a marking method in which lines are marked by reciprocating scanning.
Figure 3A:
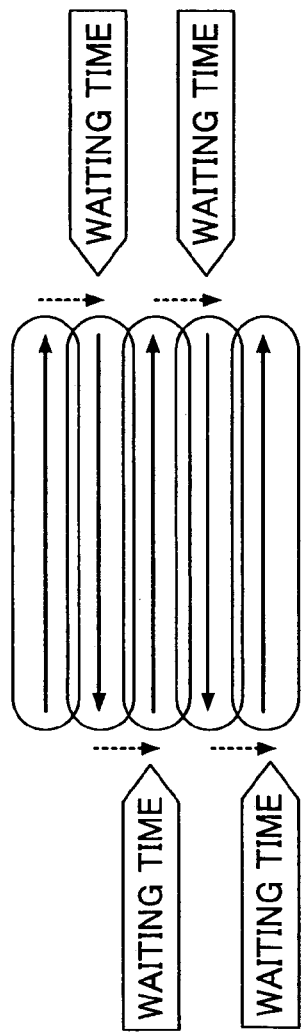

Accordingly, the above described color variability obtained in the related art technologies illustrated in FIG. 3B may be controlled, so that a target image area may be filled with solid color without color variability. Further, in the marking control device 4 according to the first embodiment, no waiting time is required between marking operations of the line components of the adjacent lines, an overall time for marking the target image may be reduced. In the related art, the color variability is controlled by increasing the laser output power compared to the ordinary laser output power. However, in the marking control device 4 according to the first embodiment, the maximum output (rated power output) of the laser device 2 may not need increasing. Accordingly, the rewritable medium 100 may not have locally accumulated excessive heat, which may decrease damage to the rewritable medium 100 and increase the life-span of the rewritable medium 100.

As described above, in the marking control device 4 according to the first embodiment, when the mutually adjacent line are marked by reversing the marking direction of the current marking line from the marking direction of the adjacent line that has been marked immediately before the current marking line, the laser output power is increased for succeeding unit line components in a stepwise fashion from the marking start position to the marking end position of the line component for each line. Accordingly, color variability may be controlled and a target image area may be filled with solid color without color variability. Moreover, the overall marking time may be reduced and the life-span of the rewritable medium 100 may be increased.

Note that as described above, the laser output power is constant from the marking start position to the marking end position in marking the line component of the first line, and the laser output power is increased in a stepwise fashion as marking from the marking start position to the marking end position of the line components from the second line onward. However, due to properties of the laser power or the rewritable medium 100, if the line component of the first line is marked without color variability by gradually increasing the laser output power from the marking start position to the marking end position of the line component, the laser output power may be set such that the laser output power is increased in a stepwise fashion from the marking start position to the marking end position of the line component of the first line.

Further, in the marking control device 4 according to the first embodiment, the ratio of the laser output power in the marking start position to that in the marking end position of line components for the lines is 820/1000 from the second line onward. Such a ratio determined based on the result indicating that the laser output power in the marking start position is preferably approximately 80% of that in the marking end position in marking the line components of the lines from the second line onward. However, the laser output power in the marking start position is not limited to the above value. The laser output power in the marking start position may be set at an appropriate value based on the rated power output of the laser device 2 or a thermal property of the rewritable medium 100.

Moreover, in the marking control device 4 according to the first embodiment, a line component is divided into 10 unit line components for each line, and the laser output power is set for succeeding unit line components. However, the same laser output power may be set for the successive unit line components of the line component.

Further, the number of unit line components is not limited to 10; however, the line component may be divided into any number of unit line components. In addition, the line component for each line may not have to be divided into plural unit line components, and the laser output power may be continuously increased from the marking start position to the marking end position of an entire line component.

Further, in the marking control device 4 according to the first embodiment, the (thermal) energy received by the rewritable medium 100 is increased by increasing the laser output power in marking from the marking start position to the marking end position of the line component for each line. Alternatively, the (thermal) energy received by the rewritable medium 100 may be increased by lowering the marking speed in marking from the marking start position to the marking end position of the line component while the laser output power is made constant from the marking start position to the marking end position of the line component for each line.

FIG. 13 is a diagram illustrating a marking method based on the marking data generated by a modification of the marking control device 4 according to the first embodiment.

In the marking method illustrated in FIG. 13, the marking speed is constant (1000/1000 in permillage, 1000 is the same marking speed illustrated in FIG. 12 C) in marking the line component for the first line; however, the marking speed is set such that the marking speed is gradually lowered in marking each line component from the marking start position to the marking end position for the second line onward. In addition, the laser output power is set such that the laser output power is constant in marking each line component from the marking start position to the marking end position for the second line onward. The above settings may be implemented by preparing a table similar to the table illustrated in FIG. 11. The table includes data of the marking speed and the laser output power associated with the marking speed. Accordingly, above settings may be implemented by allowing the marking speed adjusting section 34 of the marking data generator section 30 to refer to the table in marking each line component from the second line onward. That is, each line component is divided into 10 unit line components from the second line onward, and the marking speed may be set for succeeding unit line components. The marking speed may be gradually set at lower values for succeeding unit line components of the line component in a stepwise fashion for each line from the second line onward. For example, the marking speed adjusting section 34 of the marking data generator section 30 may refer to the table to set the marking speed such that when a standard value of the marking speed is 1000 in permillage, the marking speed is decreased to 1180, 1160, 1140, 1120, 1100, 1080, 1060, 1040, 1020, and 1000 for respective unit line components in a stepwise fashion from the marking start position to the marking end position of each line component from the second line onward. Note that in the modification of the marking control device 4 according to the first embodiment illustrated in FIG. 13, the marking speed adjusting section 34 functions as an adjusting unit.

As described above, since the thermal energy on the rewritable medium 100 may be made congruent from the marking start position to the marking end position of each line component by decreasing the making speed for corresponding unit line components in a stepwise fashion while maintaining the laser output power constant, color variability may be controlled, and the target image area may be filled with solid color without color variability. Further, in the marking control device 4 according to the first embodiment, no waiting time is required between marking operations of the line components of the adjacent lines, so that an overall time for marking the target image may be reduced. In addition, in the marking control device 4 according to the first embodiment, since the target image may be drawn without increasing the maximum power of the laser output power, the rewritable medium 100 may not locally accumulate excessive heat, thereby increasing the life-span of the rewritable medium 100.

Second Embodiment

Figure 14:
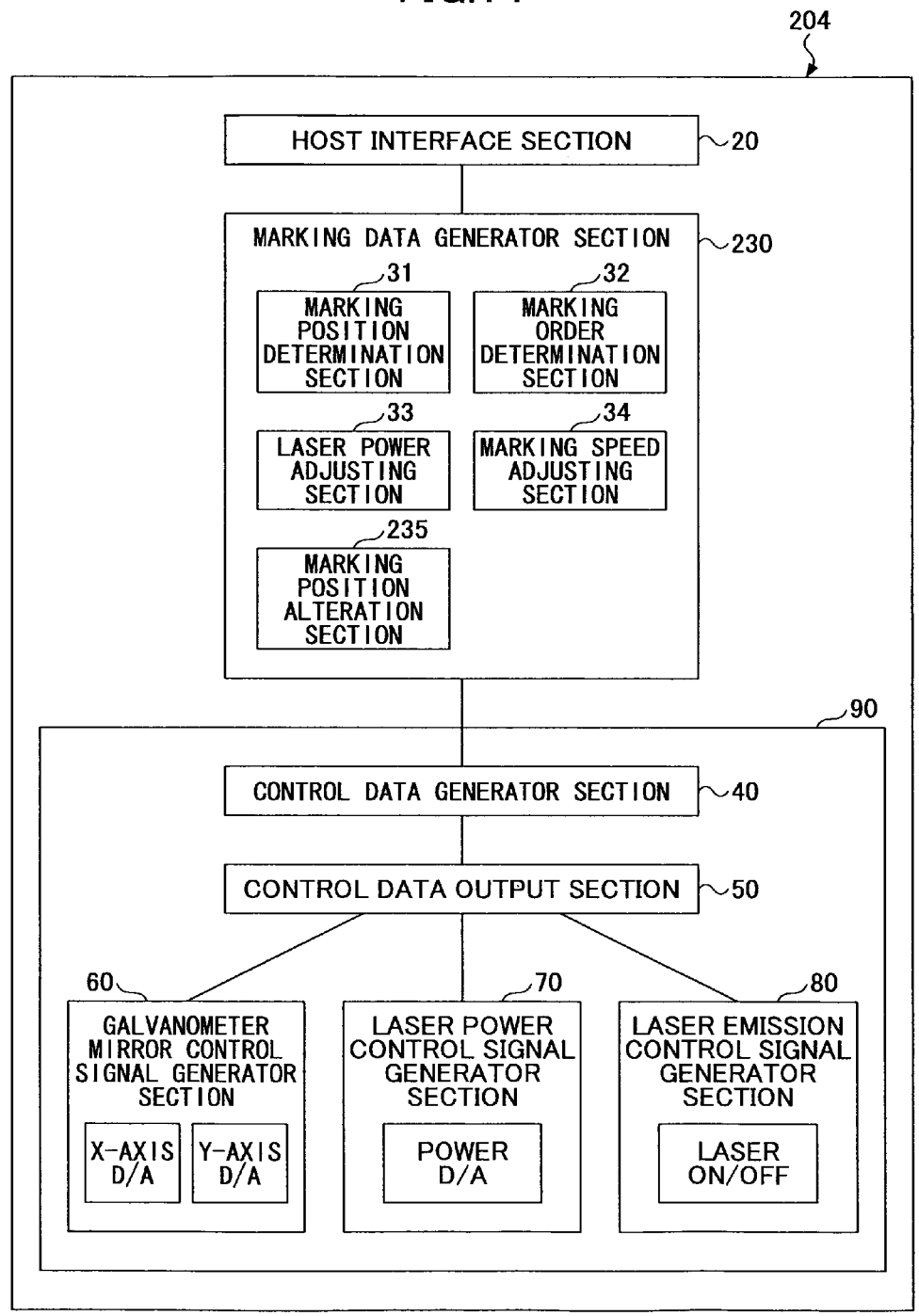
FIG. 14 is a configuration block diagram illustrating a marking control device according to a second embodiment.

FIG. 14 is a configuration block diagram illustrating a marking control device 204 according to a second embodiment.

The marking control device 204 according to the second embodiment differs from the marking control device 4 according to the first embodiment in that the marking data generator section 30 of the marking control device 204 according to the second embodiment includes a marking position alteration section 235. Since the components of the marking control device 204 according to the second embodiment other than marking the position alteration section 235 are the same as those of the marking control device 4 according to the first embodiment, their descriptions are omitted by assigning the same reference numerals to the components same as those of the marking control device 4 according to the first embodiment.

FIGS. 15A, 15B, 15C are diagrams each illustrating a marking method based on marking data generated by the marking control device 204 according to the second embodiment.

In the marking method carried out by the marking control device 204 according to the second embodiment, each line component of each line is divided into a predetermined number of unit line components (10 unit line components in this case) from the second line onward, and the laser output power is increased for succeeding unit line components from the marking start position to the marking end position of the line component in a stepwise fashion in the same manner as the marking method carried out by the marking control device 4 according to the first embodiment. Note that similar to the first embodiment, the origins of the solid line arrows indicate the marking start positions, and the pointed ends of the solid line arrows indicate the marking end positions of the line components in FIG. 15A.

As illustrated in FIG. 15A, in the marking control device 204 according to the second embodiment, line components from the second line onward are marked by moving (shifting) the marking start position of each line component in the negative (−) direction of the Y-axis direction. The marking start position of each line is altered by the marking position alteration section 235. Specifically, the marking position alteration section 235 alters a Y-coordinate value of the marking start position of each line component contained in the marking data.

The reason for altering the marking start position of the line components from the second line onward is that the residual heat in the rewritable medium 100 after the preceding line component is marked is higher in the marking start position than in the marking end position of the subsequent line component from the second line onward. Thus, an amount of heat received in overlapping portions or peripheral portions of the adjacent line components in the rewritable medium 100 may be balanced by locating the marking start position of a subsequent line component away from the marking start position of a preceding line component.

A shifting (moving) amount of each line component in the negative (−) direction of the Y-axis direction from the second line onward is preferably in a range of ⅙ to ⅔ of a width (in the Y-axis direction) of the line component.

Figure 16:
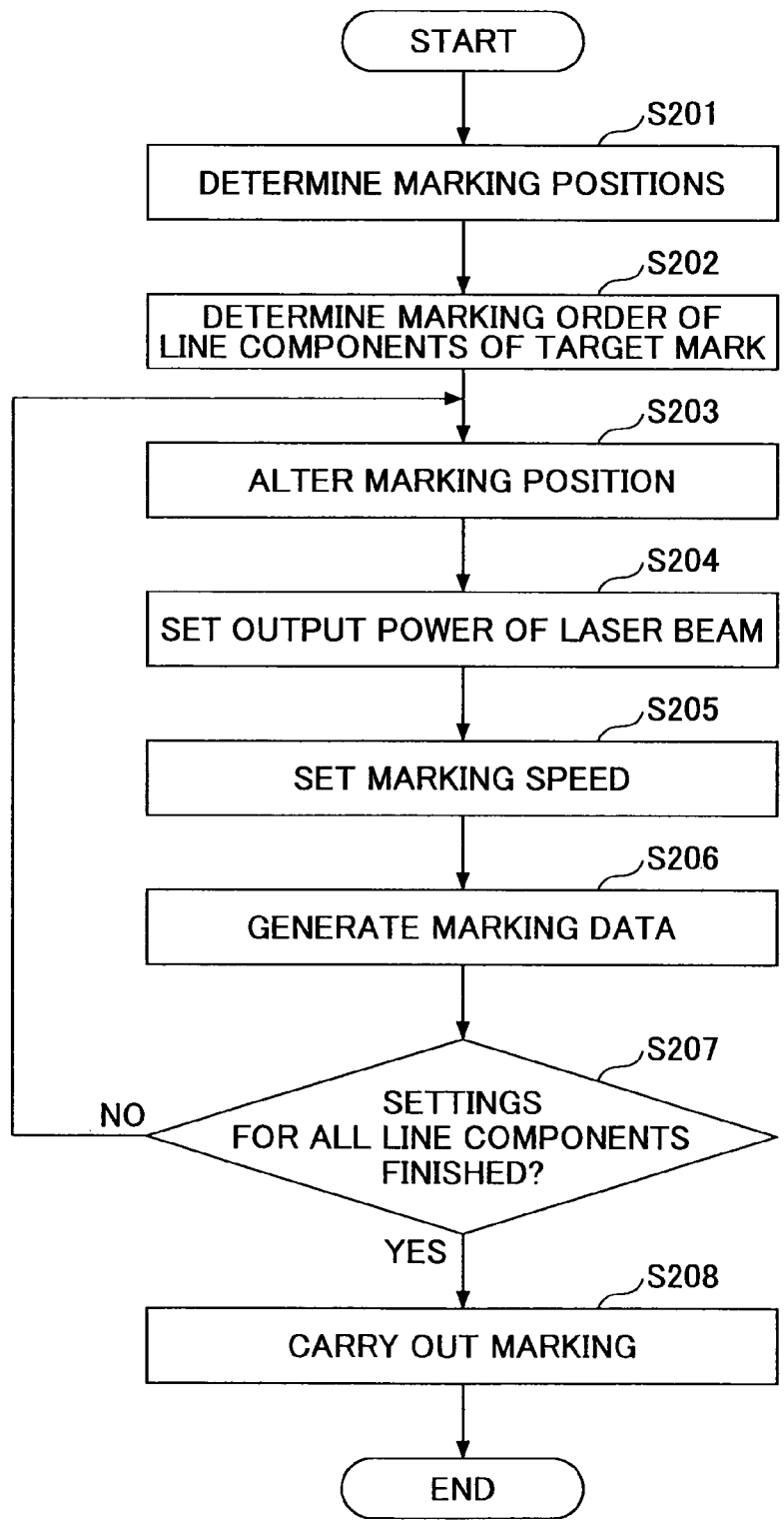
FIG. 16 is a flowchart illustrating a marking data generation process carried out by the marking control device according to the second embodiment.

FIG. 16 is a flowchart illustrating a marking data generation process carried out by the marking control device 204 according to the second embodiment.

Note that steps S201 and S202 in FIG. 16 are identical to steps S1 and S2 in FIG. 10.

When the marking order is determined in step S202, the marking data generator section 30 alters coordinates of the marking start position of each line component for the second line onward (step S203). Specifically, step S203 is carried out by the marking position alteration section 235 of the marking data generator section 30, and the marking position alteration section 235 locates the marking start position of the subsequent line component away from the marking start position of the preceding line component for each line from the second line onward as described with reference to FIG. 15.

When the marking start position of the subsequent line component, is altered in step S203, the marking data generator section 230 advances the current process to step S204. Steps S204 through S208 are basically the same as steps S3 through S7; however, the Y-coordinate values of the line components altered by the marking position alteration section 235 from the second line onward contained in the marking data generated in step S206 differ from the Y-coordinate values of the line components from the second line onward contained in the marking data of the first embodiment.

When steps S204 through S207 are repeatedly conducted, and the laser output power and the marking speed are set for all the line components for all lines, the generated marking data are converted into control data (see FIG. 9) to carry out marking operations.

As described above, in the marking control device 204 according to the second embodiment, when the mutually adjacent lines are marked by reversing the marking direction of the current marking line from the marking direction of the adjacent line that has been marked immediately before the current marking line, the laser output power is increased from the marking start position to the marking end position of the line component in a stepwise fashion for each line, and the marking start position of the subsequent line component is located away from the marking start position of the preceding line component line by line by altering coordinate values of the marking start position of the subsequent line components from the second line onward.

Accordingly, thermal energy on the rewritable medium 100 may be made congruent in the overlapping portions and peripheral portions of the mutually adjacent line components. As a result, color variability may be controlled, and the target image area may be filled with solid color without color variability. Further, in the marking control device 204 according to the second embodiment, no waiting time is required between marking operations of the line components of the adjacent lines, an overall time for marking the target image may be reduced. Moreover, the life-span of the rewritable medium 100 may be increased.

Note that as described above, from the second line onward, the marking start position of each line component is shifted in the negative (−) direction of the Y-axis direction (to be located away from the marking start position of the preceding line component). However, the marking end position of each line component may also be shifted from the second line onward in addition to the shifting of the marking start position of each line component in the negative (−) direction of the Y-axis direction from the second line onward. That is, the marking end position of each line component may also be shifted in the positive (+) direction of the Y-axis direction from the second line onward, in addition to the shifting of the marking start position of each line component in the negative (−) direction of the Y-axis direction from the second line onward. The marking start position and the marking end position of each line component may be altered by selecting appropriate values for the coordinates of the marking start position and the coordinates of the marking end position of each line component based on the laser output power of the laser device 2 or the thermal property of the rewritable medium 100.

Note that in the first and second embodiments, the target image is the barcode. However, the target image marked by the marking device controlled by the marking control device 4 or 204 according to a corresponding one of the first embodiment and the second embodiment is not limited to the barcode, but may be any marks including characters, numbers, symbols, and graphics.

Note that a computer program to be executed by the laser application device 1 according to the first embodiment or the second embodiment may be provided as installable or executable formatted files recorded on a computer-readable recording medium such as a CD-ROM, flexible disk (FD), CD-R, DVD (Digital Versatile Disk), and the like.

Alternatively, the computer program to be executed by the laser application device 1 according to the first embodiment or the second embodiment may be stored in a computer connected over the network such as the Internet, and the stored computer program may be downloaded from the computer over the network. Further, the computer program to be executed by the laser application device 1 according to the first embodiment or the second embodiment may be provided or distributed via the network such as the Internet.

Next, marking control methods according to a third embodiment and a fourth embodiment are described.

[Marking Control Method]

The marking control method according to the third embodiment or the fourth embodiment includes one of an image recording process and an image erasing process. Note that the marking control method according to the third embodiment or the fourth embodiment is not particularly limited to marking on the reversible recording medium and may be appropriately selected based on various purposes. For example, the marking control method may be utilized as a method for marking an image on a non-reversible recording medium. However, it is preferable that the marking control method according to the third embodiment or the fourth embodiment be utilized as a marking control method for recording or erasing an image on a thermoreversible recording medium.

<Image Recording Process>

In the image recording process, the thermoreversible recording medium is irradiated with a laser beam, and heated laser beam lines are colored and marked on the thermoreversible recording medium, thereby forming an image (i.e., a target image).

In the image recording process, a lower limit of the laser output power is not particularly limited, and may be appropriately selected based on various purposes. However, the lower limit of the laser output power may be preferably 1 W or higher, more preferably 3 W or higher, and particularly preferably 5 W or higher.

If the lower limit of the laser output power is lower than 1 W, image recording time may be increased. Accordingly, the laser may not have enough output power for reducing the image recording time.

Likewise, an upper limit of the laser output power is not particularly limited, and may be appropriately selected based on various purposes. However, the upper limit of the laser output power may be preferably 200 W or lower, more preferably 150 W or lower, and particularly preferably 100 W or lower. If the laser output power exceeds 200 W, the size of the laser device may be increased.

In the image recording process, a lower limit of a scanning speed of the laser beam applied to the thermoreversible recording medium is not particularly limited, and may be appropriately selected based on various purposes. However, the lower limit of the scanning speed of the laser beam may be preferably 300 mm/s or higher, more preferably 500 mm/s or higher, and particularly preferably 700 mm/s or higher.

If the scanning speed of the laser beam is lower than 300 mm/s, the image recording time may be increased.

Likewise, an upper limit of the scanning speed of the laser beam applied to the thermoreversible recording medium is not particularly limited, and may be appropriately selected based on various purposes. However, the upper limit of the scanning speed of the laser beam may be preferably 15,000 mm/s or lower, more preferably 10,000 mm/s or lower, and particularly preferably 8,000 mm/s or lower.

If the scanning speed of the laser beam exceeds 15,000 mm/s, an image may not be uniformly formed on the thermoreversible recording medium.

In the image recording process, a lower limit of a spot diameter of the laser beam applied to the thermoreversible recording medium is not particularly limited, and may be appropriately selected based on various purposes. However, the lower limit of the spot diameter of the laser beam may be preferably 0.02 mm or more, more preferably 0.1 mm or more, and particularly preferably 0.15 mm or more.

Likewise, an upper limit of the spot diameter of the laser beam applied to the thermoreversible recording medium is not particularly limited, and may be appropriately selected based on various purposes. However, the upper limit of the spot diameter of the laser beam may be preferably 3.0 mm or less, more preferably 2.5 mm or less, and particularly preferably 2.0 mm or less.

If the spot diameter of the laser beam is less than 0.02 mm, a line width of the image may be too thin, thereby decreasing viewability of the image. By contrast, if the spot diameter of the laser beam exceeds 3.0 mm, the line width of the image may be too thick, thereby causing adjacent lines to mutually overlap. Accordingly, small sized images may not be formed (recorded) on the thermoreversible recording medium.

In the image recording process, a laser light source of the laser beam applied is not particularly limited, and may be appropriately selected based on various purposes. However, the laser light source of the laser beam may preferably be at least one of YAG laser light, fiber laser light, and semiconductor laser (i.e., a laser diode, LD) light.

<Image Erasing Process>

In the image erasing process, the thermoreversible recording medium is irradiated with a laser beam, and heated laser beam lines forming the image are decolored on the thermoreversible recording medium, thereby erasing the image.

In the image erasing process, a lower limit of the laser output power is not particularly limited, and may be appropriately selected based on various purposes. However, the lower limit of the laser output power may be preferably 5 W or higher, more preferably 7 W or higher, and particularly preferably 10 W or higher.

If the lower limit of the laser output power is lower than 5 W, image erasing time may be increased. Accordingly, the laser may not have enough output power for reducing the image erasing time, thereby exhibiting insufficient erasure of the image.

Likewise, an upper limit of the laser output power is not particularly limited, and may be appropriately selected based on various purposes. However, the upper limit of the laser output power may be preferably 200 W or lower, more preferably 150 W or lower, and particularly preferably 100 W or lower. If the laser output power exceeds 200 W, the size of the laser device may be increased.

In the image erasing process, a lower limit of a scanning speed of the laser beam applied to the thermoreversible recording medium is not particularly limited, and may be appropriately selected based on various purposes. However, the lower limit of scanning speed of the laser beam may be preferably 100 mm/s or higher, more preferably 200 mm/s or higher, and particularly preferably 300 mm/s or higher.

If the scanning speed of the laser beam is lower than 100 mm/s, the image erasing time may be increased.

Likewise, an upper limit of the scanning speed of the laser beam applied to the thermoreversible recording medium is not particularly limited, and may be appropriately selected based on various purposes. However, the upper limit of the scanning speed of the laser beam may be preferably 20,000 mm/s or lower, more preferably 15,000 mm/s or lower, and particularly preferably 10,000 mm/s or lower.

If the scanning speed of the laser beam exceeds 20,000 mm/s, an image may not be uniformly erased from the thermoreversible recording medium.

In the image erasing process where the image formed on the thermoreversible recording medium is decolored by heating with the laser beam application, a lower limit of a spot diameter of the laser beam applied to the thermoreversible recording medium is not particularly limited, and may be appropriately selected based on various purposes. However, the lower limit of the spot diameter of the laser beam may be preferably 0.5 mm or more, more preferably 1.0 mm or more, and particularly preferably 2.0 mm or more. Likewise, an upper limit of the spot diameter of the laser beam applied to the thermoreversible recording medium is not particularly limited, and may be appropriately selected based on various purposes. However, the upper limit of the spot diameter of the laser beam may be preferably 14.0 mm or less, more preferably 10.0 mm or less, and particularly preferably 7.0 mm or less.

If the spot diameter of the laser beam is less than 0.5 mm, the image erasing time may be increased. By contrast, if the spot diameter of the laser beam exceeds 14.0 mm, the laser may not have enough output power for reducing the image erasing time, thereby exhibiting insufficient erasure of the image.

In the image erasing process, the laser light source of the laser beam applied is not particularly limited, and may be appropriately selected based on various purposes. However, the laser light source of the laser beam may preferably be at least one of YAG laser light, fiber laser light, and semiconductor laser (i.e., a laser diode, LD) light.

In the image recording process and the image erasing process, a wavelength of the laser beam may be preferably 700 nm or more, more preferably 720 nm or more, and particularly preferably 750 nm or more. An upper limit of the wavelength of the laser beam applied to the thermoreversible recording medium is not particularly limited, and may be appropriately selected based on various purposes. However, the upper limit of the wavelength of the laser beam may be preferably 1,500 nm or less, more preferably 1,300 nm or less, and particularly preferably 1,200 nm or less.

If the wavelength of the laser beam is shorter than 700 nm, the contrast of the image in a visible light region may be lowered while recording the image or other regions of the thermoreversible recording medium may be colored. In an ultraviolet light region having a wavelength further shorter than the 700 nm of the visible light region, the thermoreversible recording medium may be deteriorated. Moreover, a photothermal conversion material added to the thermoreversible recording medium may require high decomposition temperature for obtaining durability for repeated image processing. However, if the photothermal conversion material needs to contain an organic dye, it may be difficult to obtain a photothermal conversion material having a long absorption wavelength and having high decomposition temperature. Thus, the wavelength of the laser beam may be preferably 1,500 nm or less.

In the marking control method according to the embodiments, at least one of the image recording process and the image erasing process includes a first laser beam marking line that is marked from the first starting point to the first ending point, and a second laser beam marking line that is marked adjacent to the first laser beam marking line by applying a laser beam from a second starting point to a second ending point such that the second ending point of the second laser beam marking line is located in a line slanted toward the first starting point of the first laser beam marking line based on a line in parallel with the first laser beam marking line.

The marking control method is not particularly limited and appropriately selected based on various purposes. However, it is preferable that a third laser beam marking line be marked adjacent to the second laser beam marking line immediately after marking of the second laser beam marking line, by applying a laser beam from a third starting point to a third ending point such that the third ending point of the third laser beam marking line is located in a line slanted toward the second starting point of the second laser beam marking line based on a line in parallel with the second laser beam marking line.

With this method, the effect of the accumulated heat generated by scanning the third starting point of the third laser beam marking line immediately after the scanning of the second ending point of the second laser beam marking line may be reduced in a turning portion between the second ending point of the second laser beam marking line and the third starting point of the third laser beam marking line.

The marking method for the third laser beam marking line may not be particularly limited; however, the third laser beam marking line may preferably be marked in parallel with the first laser beam marking line.

With this method, the image may be recorded or erased without density variability in the image recording area and the solidly filled image marking area of the thermoreversible recording medium.

Note that the term "parallel" includes the meanings of both "precisely parallel" and "approximately parallel" based on the performance of the image processing.

The above marking method includes marking of the slanted line; however, the marking method may also include marking of a line partially in parallel with the adjacent line in the same direction. That is, if a solidly filled image is filled with the even number of marking lines, the last slanted marking line may make the entire image slanted. Accordingly, when the solidly filled image is filled with the even number of marking lines, it is preferable that one of the marking lines be in parallel with one of the preceding marking lines.

Further, the starting point and the ending point are, unless otherwise specified, the starting point and the ending point of the continuous marking line. However, if the continuous marking line includes the turning portion, the turning portion of the continuous marking line may include the starting point and the ending point.

The marking control method is not particularly limited, and may be appropriately selected based on various purposes. However, in the marking control method, it is preferable that a laser beam not be applied to an interval between an ending point of a first laser beam marking line and a starting point of a second laser beam marking line adjacent to the first laser beam marking line.

With this method, the laser scanning time may be short, the solidly filled image may be recorded on or erased from the thermoreversible recording medium in a short time, and heat may not be accumulated in the turning portion of the laser beam marking line.

Further, it is preferable that the starting point of the second laser beam marking line be marked in a line perpendicular to the first laser beam marking line from the end point of the first laser beam marking line.

With this method, the solidly filled image may be formed in a rectangular image cell without density variability, and the printing record may be efficiently carried out. Further, the printed record image may also be efficiently decolored or erased.

Further, the marking control method is not particularly limited; however, it is preferable that irradiation energy of the laser beam that scans the first laser beam marking line be higher than irradiation energy of the laser beam that scans the second laser beam marking line.

In this case, the first laser beam marking line is initially marked in the target image (image) area to be marked, and the second laser beam marking line may be marked by utilizing the accumulated heat generated by marking of the first laser beam marking line. Accordingly, excessive energy transmission on the thermoreversible recording medium may be suppressed by marking the first laser beam marking line with energy higher than that of the second laser beam marking line, and marking the second laser beam marking line with energy lower than that of the first laser beam marking line.

In the following, details of the third embodiment and the fourth embodiment are described with reference to FIGS. 5A and 5B.

FIG. 5A is a diagram illustrating a laser beam scanning method for recording or erasing the image according to the third embodiment. As illustrated in FIG. 5A, with the laser beam scanning method according to the third embodiment, the laser beam is scanned such that the second laser beam marking line 452 is slanted toward the first laser beam marking line 451, unlike the laser beam scanning method in FIG. 4A, where the laser beam is scanned such that the second laser beam marking line 412 is marked in parallel with the first laser beam marking line 411. That is, with the laser beam scanning method according to the third embodiment, the marking position of the second laser beam marking line 452 is adjusted such that a first distance between the ending point of the first laser beam marking line 451 and the starting point of the second laser beam marking line 452 is longer than a second distance between the starting point of the first laser beam marking line 451 and the ending point of the second laser beam marking line 452.

The configuration in which the second laser beam marking line 452 is slanted toward the first laser beam marking line 451 is illustrated in FIG. 5A, where a ratio of a slanted amount to a pitch width is 0.1 or more (i.e., slanted amount/a pitch width≥0.1).

The ratio of the slanted amount to the pitch width is not particularly limited insofar as the ratio is 0.1 or more, and may be appropriately selected based on various purposes. However, if the ratio of the slanted amount to the pitch width is small, the adverse effect due to the accumulated heat may not be sufficiently suppressed, and if the ratio of the slanted amount to the pitch width is too large, energy applied to the thermoreversible recording medium may not be sufficient. Accordingly, it is preferable that the ratio of the slanted amount to the pitch width be in a range of 0.2 to 0.8.

The pitch amount indicates a shortest distance between the central point in the longitudinal direction of the second laser beam marking line 452 and the first laser beam marking line 451.

The slanted amount indicates a shortest distance between the central point in the longitudinal direction of the second laser beam marking line 452 and a line extending in parallel with the first laser beam marking line 451 from the starting point of the second laser beam marking line 452.

With this marking control method according to the third embodiment, the laser scanning time may be short, the solidly filled image may be recorded on or erased from the thermoreversible recording medium in a short time, and heat may not be accumulated in the turning portion of the laser beam marking line. Note that the turning portion of the laser beam is obtained by scanning the second laser beam marking line 452 immediately after the scanning of the first laser beam marking line 451.

FIG. 5B is a diagram illustrating a laser beam scanning method for recording or erasing the image according to the fourth embodiment. As illustrated in FIG. 5B, with the laser beam scanning method according to the fourth embodiment, the laser beam is scanned such that the second laser beam marking line 452 is marked to be slanted toward the first laser beam marking line 451, unlike the laser beam scanning method in FIG. 4B, where the laser beam is scanned such that the second laser beam marking line 422 is marked in parallel with the first laser beam marking line 421.

With this marking control method according to the fourth embodiment, since the laser beam is not applied to a region corresponding to a turning portion between the first ending point to the second starting point, excessive application of energy on the thermoreversible recording medium obtained due to decreased marking speed in marking of the turning portion may be prevented. Thus, the marking control method according to the fourth embodiment is particularly preferable because the method provides the effect of preventing excessive energy application in addition to the effect obtained by the marking control method according to the third embodiment.

Note that the marking control method according to the fourth embodiment includes the same processes except the process where the laser beam is not applied to the region corresponding to the turning portion between the first ending point to the second starting point. Accordingly, the description of the marking control method according to the third embodiment may also be applied as that of the marking control method according to the fourth embodiment.

<Thermoreversible Recording Medium>

A thermoreversible recording medium is configured to change transparency or color based on temperature.

The thermoreversible recording medium used in the embodiments is not particularly limited. An example of the thermoreversible recording medium includes: a first thermoreversible recording layer and a second thermoreversible recording layer provided in this order, and may optionally include other layers such as a first oxygen barrier layer, a second oxygen barrier layer, an ultraviolet (UV) absorber layer, a backing layer, a protection layer, an intermediate layer, an undercoat layer, an adhesive layer, a cohesion layer, a coloring layer, an air space, and a light reflection layer. The above layers may be a single layer structure or a multilayer structure. Note that a layer provided on the photothermal conversion layer is preferably formed of a material that absorbs a small amount of a laser beam having a specific wavelength so as to reduce a loss of energy of the laser beam having the specific wavelength applied on the layer of the thermoreversible recording medium.

Figure 17A:
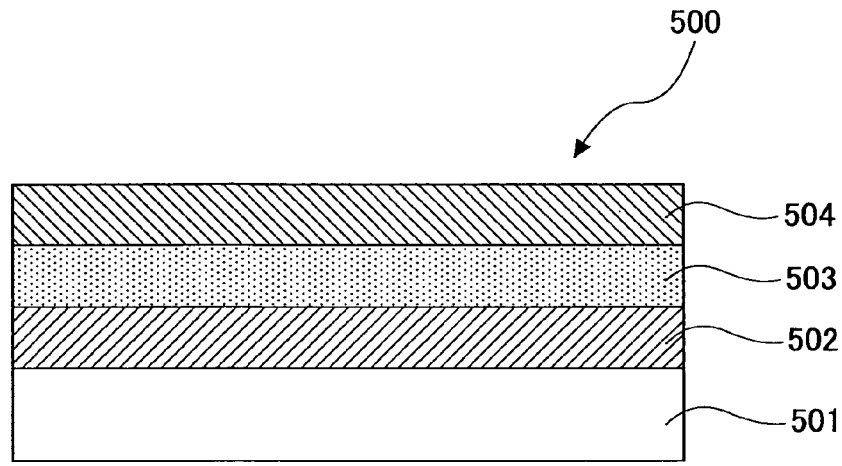
FIG. 17A is a schematic sectional diagram illustrating an example of a layer structure of a thermoreversible recording medium according to an embodiment.

As illustrated in FIG. 17A, a thermoreversible recording medium 500 may include a supporting member 501, and plural layers including a first thermoreversible recording layer 502, a photothermal conversion layer 503, and a second thermoreversible recording layer 504. The above plural layers are provided in that order on the supporting member 501.

Figure 17B:
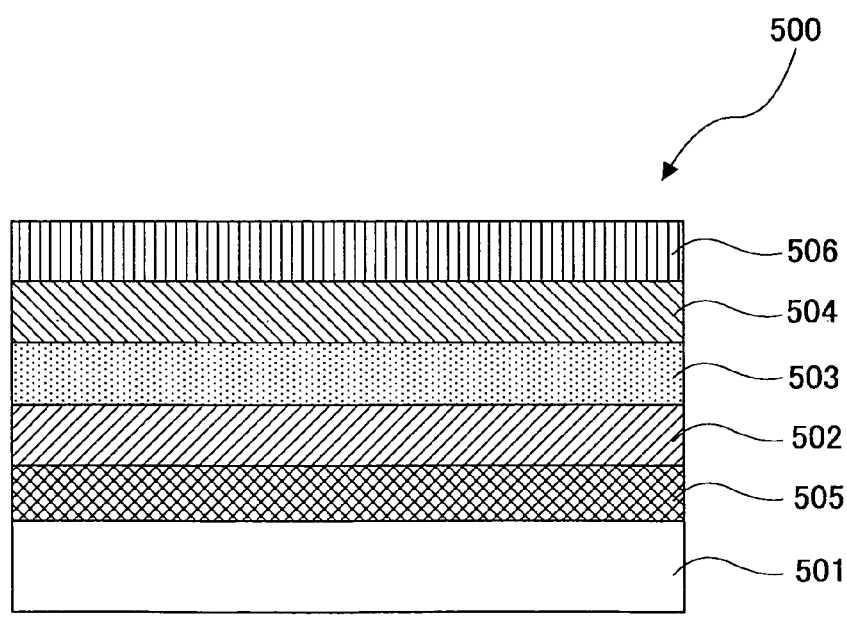
FIG. 17B is a schematic sectional diagram illustrating another example of the layer structure of a thermoreversible recording medium according to the embodiment.

Alternatively, as illustrated in FIG. 17B, the thermoreversible recording medium 500 may include the supporting member 501, and plural layers including a first oxygen barrier layer 505, the first thermoreversible recording layer 502, the photothermal conversion layer 503, the second thermoreversible recording layer 504, and a second oxygen barrier layer 506. The above plural layers are provided in that order on the supporting member 501.

Figure 17C:
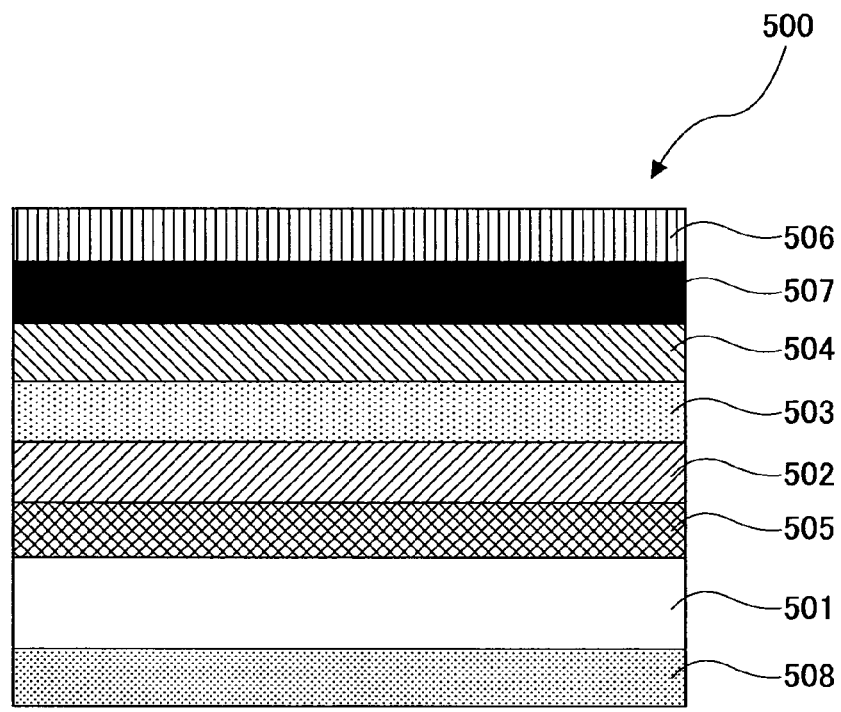
FIG. 17C is a schematic sectional diagram illustrating still another example of the laminate configuration of a thermoreversible recording medium according to the embodiment.

Further, as illustrated in FIG. 17C, the thermoreversible recording medium 500 may include the supporting member 501, and plural layers including the first oxygen barrier layer 505, the first thermoreversible recording layer 502, the photothermal conversion layer 503, the second thermoreversible recording layer 504, an ultraviolet absorber layer 507, and the second oxygen barrier layer 506. The above plural layers are provided in that order on the supporting member 501. In addition, the thermoreversible recording medium 500 may include a backing layer 508 provided on a side of the supporting member 501 where the first thermoreversible recording layer 502 and the second thermoreversible recording layer 504 are not provided.

Note that although not illustrated in FIGS. 17A, 17B, and 17C, a protection layer may be provided as an uppermost layer of the thermoreversible recording medium 500; that is, the protection layer may be provided on the second thermoreversible recording layer 504 in FIG. 17A, on the second oxygen barrier layer 506 in FIG. 17B, or on the second oxygen barrier layer 506 in FIG. 17C.

—Supporting Member—

A shape, a structure, a size and the like of the supporting member used in the embodiments are not particularly limited, and may be appropriately selected based on various purposes. However, the supporting member may have a tabular shape, a single layer structure or a multilayer structure, and an appropriate size determined based on the size of the thermoreversible recording medium.

The supporting member may be made of an inorganic material or an organic material.

Examples of the inorganic material include glass, quartz, silicon, oxide silicon, aluminum oxide, $SiO_2$, and metal.

Examples of the organic material include paper, cellulose derivatives such as cellulose triacetate, synthetic paper, and films such as polyethylene terephthalate, polycarbonate, polystyrene, and polymethyl methacrylate.

The above inorganic material and the organic material may be used alone or may be used in combination of two or more. Among these, the organic material may be preferable, where the films such as polyethylene terephthalate, polycarbonate, and polymethyl methacrylate are preferable, and the polyethylene terephthalate is particularly preferable.

It is preferable that the supporting member be surface modified by corona discharge, oxidation reaction (chromic acid), etching, tackiness-improving treatment, and antistatic treatment.

It is also preferable that the supporting member be white color by adding white pigment such as titanium oxide.

A thickness of the supporting member is not particularly limited, and may be appropriately selected based on various purposes. However, the thickness of the supporting member may be preferably in a range of 10 to 2,000 μm, and more preferably 50 to 1,000 μm.

—First Thermoreversible Recording Layer and Second Thermoreversible Recording Layer—

The first thermoreversible recording layer and the second thermoreversible recording layer (hereinafter simply called a "thermoreversible recording layer") include an electron-donating color-developing compound of leuco dye, and an electron accepting compound of a developer. The thermoreversible recording layer further includes binder resin and optionally includes other components. The thermoreversible recording layer is configured to reversibly change its color by the application of heat.

The electron-donating color-developing leuco dye reversibly changing the color with heat, and the electron accepting developer are materials capable of reversibly generating visible changes based on temperature change. Specifically, the leuco dye and the developer are capable of changing color between relatively colored or relatively decolored states based on the difference in the heating temperature and the cooling speed after heating.

—Leuco Dye—

The leuco dye is colorless or pale dye precursor. The leuco dyes are not particularly limited, and may be selected from known compounds based on various purposes. Preferable examples of the leuco dye include triphenylmethanephthalide leuco compounds, triallylmethane leuco compounds, fluoran leuco compounds, phenothiazine leuco compounds, thiofluoran leuco compounds, xanthene leuco compounds, indophthalyl leuco compounds, spiropyran leuco compounds, azaphthalide leuco compounds, chromenopyrazole leuco compounds, methine leuco compounds, rhodamineanilinolactam leuco compounds, rhodaminelactam leuco compounds, quinazoline leuco compounds, diazaxanthene leuco compounds, and bislactone leuco compounds. Among these, fluoran leuco compounds or phthalide leuco compounds are particularly preferable due to their excellent coloring/decoloring properties, excellent psychophysical color properties, and excellent storage stability. The above leuco dye compounds may be used alone or in combination of two or more. The thermoreversible recording layer may develop (form) multiple colors or full-color by laminating layers mutually developing different colors.

—Reversible Developer—

The reversible developer used in the embodiments is not particularly limited insofar as coloring and decoloring are reversibly carried with heat, and may be selected from known compounds for various purposes. Preferable examples of the reversible developer includes compounds having at least one of the following structures in molecules selected from (1) a structure having a color-developing ability to cause the leuco dye to develop color (e.g., phenolic hydroxyl group, carboxylic acid group, and phosphate group); and (2) a structure capable of controlling intermolecular cohesion (e.g., long-chain hydrocarbon group linking structure). Note that the long-chain hydrocarbon group linking structure may include linking group having divalent or more heteroatoms, or the long-chain hydrocarbon group may include at least one of the linking group and an aromatic group.

As the structure (1) having the color-developing ability to cause the leuco dye to develop color, phenol is preferable.

As the structure (2) capable of controlling intermolecular cohesion, the long-chain hydrocarbon group having 8 carbon atoms may be preferable. The number of carbon atoms of the long-chain hydrocarbon group may be more preferably 11 or more, and the upper limit of the number of the carbon atoms may be preferably 40 or less, and more preferably 30 or less.

Among the reversible developers, a phenol compound represented by the general formula (1) is preferable, and a phenol compound represented by the general formula (2) is more preferable.

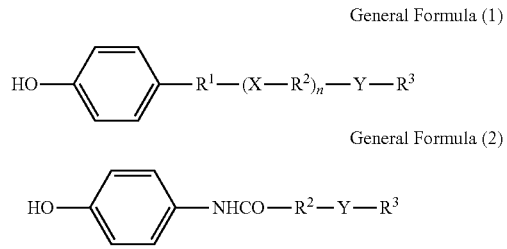

General Formula (1)

General Formula (2)

In the general formulas (1) and (2), $R^1$ represents a single bond or an aliphatic hydrocarbon group having 1 to 24 carbon atoms. $R^2$ represents an aliphatic hydrocarbon group having 2 or more carbon atoms that may include a substituent, and the aliphatic hydrocarbon group may preferably include 5 or more carbon atoms, and more preferably 10 or more carbon atoms. $R^3$ represents an aliphatic hydrocarbon group having 1 to 35 carbon atoms, and may preferably include 6 to 35 carbon atoms, and more preferably 8 to 35 carbon atoms. The above aliphatic hydrocarbon groups may be contained alone or may be contained in combination of two or more.

The sum of carbon atoms in $R^1$, $R^2$, and $R^3$ is not particularly limited, and may be appropriately selected based on various purposes. However, the sum of carbon atoms in $R^1$, $R^2$, and $R^3$ may be preferably 8 or more, and more preferably 11 or more. The upper limit of the sum of carbon atoms in $R^1$, $R^2$, and $R^3$ is preferably 40 or less, and more preferably 35 or less.

If the sum of the carbon atoms is less than 8, coloring stability or erasability may be lowered.

The aliphatic hydrocarbon groups may include straight-chains, branched-chains, or unsaturated bonds; however, it is preferable that the aliphatic hydrocarbon groups include straight-chains. Further, examples of the substituent bonded with the hydrocarbon groups include a hydroxyl group, halogen atoms, and an alkoxy group.

X and Y may be the same or different, and may represent a divalent group of N or O atoms. Specific examples of the divalent group include oxygen atoms, an amide group, a urea group, a diacylhydrazine group, an oxamide group, and an acyl urea group. Among these, the amide group and urea group are preferable.

In the general formulas (1), and (2), n represents integers from 0 to 1.

It is preferable that the electron-accepting compound (developer) be combined with a compound having in the molecules at least one of a —NHCO-group and an —OCONH-group, because an intermolecular interaction between a decoloring accelerator and the developer may be induced during the decoloring process to improve the coloring/decoloring properties.

The decoloring accelerator is not particularly specified and may be appropriately selected based on various purposes.

The thermoreversible recording layer may include binder resin, and may optionally include various additives in order to improve or control coating properties or coloring/decoloring properties of the thermoreversible recording medium. Examples of the additives include surfactants, electro-conductive agents, fillers, antioxidants, optical stabilizers, color stabilizers, and decoloring accelerators.

—Binder Resin—

The binder resin is not particularly specified insofar as the binder resin is capable of binding the thermoreversible recording layer, and may be appropriately selected based on various purposes. The binder resin may be prepared by mixing one or more resins selected from the known resins. Among the know resins, resin that is curable by the application of heat, UV rays, and electron beams is preferable in order to improve durability for repeated use, and thermosetting resin having isocyanate compounds as crosslinking agents may be particularly preferable. Examples of the thermosetting resin include resin reactive with a hydroxyl group or a carboxyl group, or resin copolymerized with monomers having a hydroxy group or a carboxyl group or with other monomers. Specific examples of the thermosetting resin include phenoxy resin, polyvinyl butyral resin, cellulose acetate propionate resin, cellulose acetate butyral resin, acrylic polyol resin, polyester polyol resin, and polyurethane polyol resin. Among these, the acrylic polyol resin, polyester polyol resin, and polyurethane polyol resin are particularly preferable.

The mixing ratio (mass ratio) of the binder resin to a color developer is preferably 0.1 to 10 in the thermoreversible recording layer when the color developer is 1. If the amount of the binder resin is too small, heat resistance of the thermoreversible recording layer may not be sufficient, whereas if the amount of the binder resin is too large, coloring density may be reduced.

The crosslinking agent is not particularly specified and may be appropriately selected based on various purposes. Preferable examples of the crosslinking agent include isocyanates, amino resins, phenol resins, amine resins, and epoxy compounds. Among these, the isocyanates may be preferable, and polyisocyanate compounds having plural isocyanate groups may be particularly preferable.

The amount of the crosslinking agent added to the binder resin is not particularly specified; however, the ratio of a functional group of the crosslinking agent to an active group of the binder resin may be preferably 0.01 to 2. If the ratio is 0.01 or less, the heat resistance may be insufficient, and if the ratio is 2 or more, coloring/decoloring properties may be adversely affected.

Further, catalyst may be added to the binder resin as a crosslinking agent accelerator used for the above reaction.

Gel fraction (i.e., degrees of cross-linkage) in crosslinked binder resin is not particularly limited, and may be preferably 30% or more, more preferably 50% or more, and particularly preferably 70% or more. If the gel fraction is less than 30%, the cross-linkage may be insufficient, thereby lowering the durability.

Whether the binder resin is crosslinked or not may be identified by immersing the film (layer) in a highly-solvating solvent. Specifically, with uncrosslinked binder resin, since the binder resin dissolves in the solvent, the resin does not visibly remain as a solute.

Other components of the thermoreversible recording layer are not particularly specified and may be appropriately selected based on various purposes. Preferable examples of the crosslinking agent include surfactants and plasticizer for facilitating recording of images.

Any known solvents, dispersing devices, coating methods, and drying-curing methods may be used may be used for forming the thermoreversible recording layer.

Note that materials of the coating liquid for the thermoreversible recording layer may simultaneously be dispersed in the solvent using the dispersing device, or individually dispersed in the solvent. Further, the materials of the coating liquid for the thermoreversible recording layer may be precipitated by rapid cooling or slow cooling.

A method for forming the thermoreversible recording medium is not particularly specified, and may be appropriately selected based on various purposes. However, the following three methods may be preferable.

(1) The above resin, the leuco dyes, and the reversible developer are dissolved or dispersed in the solvent to prepare the coating liquid for the thermoreversible recording layer, and the coated supporting member is then crosslinked simultaneously with or after drying the solvent of the coating liquid to form a coating sheet.

(2) The above resin is dissolved in the solvent, the leuco dyes, and the reversible developer are then dispersed in the resin-dissolved solvent to prepare the coating liquid for the thermoreversible recording layer, the coating liquid is applied on the supporting member, and the coated supporting member is then crosslinked simultaneously with or after drying the solvent of the coating liquid to form a coating sheet.

(3) The above resin, the leuco dyes, and the reversible developer are mutually mixed by hot-melting treatment without the solvent, the hot-melted mixture is formed in a sheet, the sheet is cooled, and the cooled sheet is then crosslinked. Note that the thermoreversible recording layer may be prepared without using the supporting member as a sheet-like thermoreversible recording medium.

The solvent used in the above methods (1) and (2) may vary with types of the resin, the leuco dye, and the developer and are not particularly specified; however, preferable examples of the solvent include tetrahydrofuran, methyl ethyl ketone, methyl isobutyl ketone, chloroform, carbon tetrachloride, ethanol, toluene, and benzene.

Note that the reversible developer is dispersed as particles in the thermoreversible recording layer.

The coating liquid for the thermoreversible recording layer may include various pigments, antifoaming agents, dispersants, slipping agents, preservatives, crosslinking agents, and plasticizer.

The coating method of the thermoreversible recording medium is not particularly specified, and may be appropriately selected based on various purposes. Preferable examples of the coating method include known coating such as blade coating, wire bar coating, spray coating, air knife coating, bead coating, curtain coating, gravure coating, kiss coating, reverse roll coating, dip coating, and die coating.

A drying condition for the coating liquid for the thermoreversible recording medium is not particularly specified, and may be appropriately selected based on various purposes. Preferable examples of the drying condition include the temperature range of room temperature to 140° C., and drying duration of 10 s to 10 min.

A thickness of the thermoreversible recording layer is not particularly specified, and may be appropriately selected based on various purposes. However, the thickness of the thermoreversible recording layer may be preferably in a range of 1 to 20 μm, and more preferably 3 to 15 μm. If the thermoreversible recording medium is too thin, coloring density is lowered, thereby obtaining low image contrast. However, if the thermoreversible recording medium is too thick, the distribution of heat is increased in the layer. This causes part of the thermoreversible recording medium not to reach the color development temperature to leave the part uncolored. Thus, desired coloring density may not be obtained.

—Photothermal Conversion Layer—

The photothermal conversion layer includes at least a photothermal conversion material capable of generating heat by efficiently absorbing the laser beam. Further, barrier layers may be formed between the thermoreversible recording layer and the photothermal conversion layer to control adverse interaction between the thermoreversible recording layer and the photothermal conversion layer, and the barrier layers may be preferably formed of a material having excellent thermal conductivity. A layer sandwiched between the thermoreversible recording layer and the photothermal conversion layer is not particularly specified, and may be appropriately selected based on various purposes.

Materials for the photothermal conversion layer may be either an inorganic material or organic material.

Examples of the inorganic material include carbon black, metal such as Ge, Bi, In, Te, Se, and Cr, a semimetal or an alloy including the semimetal, which are formed into a layer by a vacuum deposition method or bonding particles of the material with resin.

Examples of the organic material include various dyes appropriately selected based on absorbing optical wavelengths. However, when a semiconductor laser (i.e., a laser diode, LD) is used as a light source, near-infrared dyes having an absorption peak within a wavelength range of 700 to 1,500 nm may be used. Specific examples of the near-infrared dyes include cyanine dyes, quinone dyes, quinoline derivatives of Indian naphthol, phenylenediamine nickel complex, and phthalocyanine compounds. The photothermal conversion material having excellent heat resistance may be preferably selected for repeatedly carrying out image processing, and the phthalocyanine compounds may be preferably selected as the photothermal conversion material having excellent heat resistance.

The above near-infrared dyes may be used alone or may be used in combination of two or more.

The photothermal conversion material is usually combined with resin to form the photothermal conversion layer. The resin used for the photothermal conversion layer is not particularly specified, and may be appropriately selected from known photothermal conversion layers insofar as the selected photothermal conversion layer can hold the inorganic or organic materials. Preferable examples of the photothermal conversion layer include thermoplastic resin and thermosetting resin, which are similar to resins used as the binder resin for the thermoreversible recording layer. Among these, the resin that is curable by the application of heat, UV rays, and electron beams is preferable in order to improve durability for repeated use, and the resin that is thermally crosslinked by using the isocyanate compounds as cross-linking agents may be particularly preferable. The binder resin includes a hydroxyl value in a range of preferably 50 to 400 mgKOH/g.

A thickness of the photothermal conversion layer is not particularly specified, and may be appropriately selected based on various purposes. However, the thickness of the photothermal conversion layer may be preferably in a range of 0.1 to 20 μm.

—First Oxygen Barrier Layer and Second Oxygen Barrier Layer—

The first oxygen barrier layer and the second oxygen barrier layer (hereinafter also called as an "oxygen barrier layer") may preferably be provided above or beneath the first or the second thermoreversible recording layer for preventing photodegradation of the leuco dyes contained in the first and second thermoreversible recording layers. That is, it is preferable that the first oxygen barrier layer be provided between the supporting member and the first theroreversible recording layer, and the second oxygen barrier layer be provided on the second thermoreversible recording layer.

Materials of the first oxygen barrier layer and the second oxygen barrier layer are not particularly specified, and may be appropriately selected based on various purposes; however, preferable examples of the materials include resin or polymer film having high transparency in visible regions and low oxygen transmission. The materials of the oxygen barrier layer may be selected based on application, oxygen transmission, transparency, coatability, and adhesiveness.

Specific examples of the oxygen barrier layers include alkyl polyacrylate ester resin, alkyl methacrylate ester resin, polymethacrylonitrile resin, polyalkyl vynil ester resin, polyalkyl vynil ether resin, polyvinyl fluoride resin, polystyrene resin, vinyl acetate copolymer resin, acetylcellulose resin, polyvinyl alcohol resin, polyvinylidene chloride resin, polyvinylidene chloride copolymer resin, acetonitrile copolymer resin, vinylidene chloride copolymer resin, poly(chlorotrifluoroethylene) resin, ethylene-vinylalcohol copolymer resin, polyacrylonitrile resin, polyacrylonitrile copolymer resin, polyethylene terephthalate resin, and nylon-6 and polyacetal resin, or a silica deposition film, an alumina deposition film, silica/alumina deposition film obtained by depositing inorganic oxides on polymer films such as polyethylene terephthalate or nylon. Among these, the inorganic oxide deposition films are preferable.

The oxygen transmission of the oxygen barrier layers is not particularly specified; however, 20 ml/m$^2$/day/MPa or less may be preferable, 5 ml/m$^2$/day/MPa or less may be more preferable, and 1 ml/m$^2$/day/MPa or less may be particularly preferable. If the oxygen transmission of the oxygen barrier layers exceeds 20 ml/m$^2$/day/MPa, the optical deterioration of the leuco dyes in the first and second thermoreversible recording layers may not be controlled.

The oxygen transmission of the oxygen barrier layers may be measured based on a measurement method in accordance with JIS K7126.

Note that the oxygen barrier layers may be arranged at a lower side of the thermoreversible recording layer or a rear side of the supporting member to sandwich the thermoreversible recording layer. With this configuration, the oxygen transmission into the thermoreversible recording layer may be prevented, thereby reducing the optical deterioration of the leuco dyes.

Methods of forming the first oxygen barrier layer and the second oxygen barrier layer are not particularly specified, and may be appropriately selected based on various purposes; however, preferable examples of the methods include a melt-extrusion method, a coating method, and a laminating method.

The thickness of the first or second oxygen barrier layer varies with the oxygen transmission to the resin or polymer film; however, the thickness of the oxygen barrier layer may be preferably 0.1 to 100 μm. If the thickness of the oxygen barrier layer is less than 0.1 μm, the oxygen barrier layer may not sufficiently prevent the oxygen transmission, whereas if the thickness of the oxygen barrier layer is greater than 100 μm, the transparency of the oxygen barrier layer may be reduced.

The adhesive layer may be provided between the oxygen barrier layer and the layer below the oxygen barrier layer. A method of forming the adhesive layer is not particularly specified, and may be one of the coating method and the laminating method. A thickness of the adhesive layer is not particularly specified, and may be preferably in a range of 0.1 to 5 μm. The adhesive layer may be cured by a crosslinking agent. The same crosslinking agent used for the thermoreversible recording layer may be appropriately used as the crosslinking agent for curing the adhesive layer.

—Protection Layer—

It is preferable that a protection layer be provided on the thermoreversible recording layer for protecting the thermoreversible recording layer. The protection layer is provided in any fashion based on various purposes. For example, one or more protection layers may be provided on the thermoreversible recording layer. The protection layer may be preferably provided on an outermost surface of the thermoreversible recording layer.

The protection layer may include binder resin, and optionally include fillers, lubricants, color pigments, and other components.

The binder resin of the protection layer is not particularly specified, and may be appropriately selected based on various purposes. However, preferable examples of the binder resin used for the protection layer may include thermosetting resin, ultraviolet (UV) curable resin, curable resin, and electron beam curable resin.

If the UV curable resin is used for forming the protection layer, a significantly hard film may be obtained after curing. Accordingly, the deformation of the obtained thermoreversible recording medium due to physical surface contact or heat by the laser beam may be suppressed, and the thermoreversible recording medium having excellent repeated durability may be obtained.

If the curable resin is used for forming the protection layer, the thermoreversible recording medium may still obtain a hard surface and repeated durability, though the hardness of the surface formed of the curable resin is less hard than that formed of the UV curable resin.

The material of the UV curable resin is not particularly specified, and may be appropriately selected from the known UV curable resins based on the purposes. Examples of the UV curable resins include urethane acrylate oligomer, epoxy acylate oligomer, polyester acrylate oligomer, polyether acrylate oligomer, vinyl oligomer, and saturated polyester acrylate oligomer; monofunctional or polyfunctional acrylate monomer, methacrylate monomer, vinyl ester monomer, ethylene derivative monomer, and allyl compound monomer. Among these, polyfunctional (tetrafunctional) monomer or oligomer is particularly preferable. The hardness, degree of contraction, plasticity and film strengthens of the resin film may be appropriately controlled by combining two or more of the above monomers and oligomers.

Further, a photopolymerization initiator or photopolymerization accelerator may need to be added for curing the monomers or oligomers by applying UV rays.

The amount of the photopolymerization initiator or photopolymerization accelerator is not particularly specified; however, it may be preferably in a range of 0.1 to 20 mass %, and more preferably 1 to 10 mass % based on the overall amount of the resin component of the protection layer.

Any known UV application device may be used for applying the UV rays to the UV curable resin for curing; however, the UV application device may preferably include a light source, lamp fittings, a power source, a cooling device, and a transferring device.

Examples of the light source include a mercury lamp, a metal halide lamp, a potassium lamp, a mercury xenon lamp, and a flash lamp. The wavelength of the light source may be appropriately selected based on the UV absorption wavelength of the photopolymerization initiator or photopolymerization accelerator added to the thermoreversible recording medium composition.

A UV ray application condition is not particularly specified, and may be appropriately selected based on various purposes. The UV ray application condition may include a lamp output power or transferring speed determined based on the irradiation energy required for crosslinking the resin.

Moreover, a releasing agent such as a silicone polymer having a polymerization group, a graphite silicone polymer, wax and zinc stearate, and a lubricant such as a silicone oil may be added for improving the transferability. The amount of the above materials for improving the transferability is not particularly specified; however, it may be preferably in a range of 0.01 to 50 mass %, and more preferably in a range of 0.1 to 40 mass % based on the overall amount of the resin component of the protection layer. The above materials for improving the transferability may be used alone or may be used in combination of two or more. Further, conductive filler may be preferably added as a countermeasure against static electricity, and acicular electro-conductive filler may be more preferably added.

A particle size of the inorganic pigment is not particularly limited, and may be preferably in a range of 0.01 to 10.0 μm, and more preferably in a range of 0.05 to 8.0 μm. The amount of the inorganic pigment to be added is not particularly specified; however, it may be preferably in a range of 0.001 to 2 mass %, and more preferably in a range of 0.005 to 1 mass % based on 1 mass % of the heat resistant resin.

Note that the protection layer may include known surfactants, leveling agents, and antistatic agents as additives.

Further, as the thermosetting resin, the resin similar to the binder resin used for the thermoreversible recording layer may be suitably used.

The thermosetting resin may be preferably crosslinked. Thus, the thermosetting resin may preferably include a group that reacts with a curing agent, such as an amino group and a carboxyl group, and more preferably include a polymer including a hydroxyl group. The polymer for improving the strength of the polymer-containing layer having the UV-absorption structure may also be added. The polymer having a hydroxyl group value of 10 mgKOH/g or more may be preferably added, the polymer having a hydroxyl group valence of a hydroxyl group value of 30 mgKOH/g or more may be more preferably added, ° and the polymer having a hydroxyl value of 40 mgKOH/g or more may be most preferably added for obtaining sufficient film strength. If the thermosetting resin has the strong film, the deterioration obtained due to the repeated recording and erasure may be suppressed.

The curing agent is not particularly specified; however, the curing agent similar to that used for the thermoreversible recording layer may be suitably used.

The solvents, coating liquid dispersing devices, coating methods, and drying methods used for coating the protection layer are not particularly specified; however, any known solvents, coating liquid dispersing devices, coating methods for coating the protection layer, and drying methods for drying the coated film used for the thermoreversible recording medium may be used. If the UV curable resin is used, the curable process needs to include coating, drying, and applying the UV rays to the UV curable resin; however, the UV ray application device, the light source and the UV ray application condition may be the same as the ones described above.

The thickness of the protection layer is not particularly specified, and may be preferably in a range of 0.1 to 20 μm, more preferably in a range of 0.5 to 10 μm, and most preferably in a range of 1.5 to 6 μm. If the thickness of the protection layer is less than 0.1 μm, the protection layer may not sufficiently function to protect the thermoreversible recording medium. As a result, the thermoreversible recording medium may quickly deteriorate due to repeated application of heat, and thus may not be repeatedly used. On the other hand, if the thickness of the protection layer exceeds 20 μm, sufficient heat may not be transmitted to the thermosensitive layer (i.e., thermoreversible recording layer) located below the protection layer. As a result, the image may not be sufficiently recorded on or erased from the thermoreversible recording medium.

—UV Absorber Layer—

The thermoreversible recording medium may preferably include a UV absorber layer at a side opposite to the side of the second thermoreversible recording layer where the supporting member is provided in order to prevent remaining coloring of the leuco dyes in the thermoreversible recording layer due to the UV rays or failure to decolor the leuco dyes in the thermoreversible recording layer due to the optical deterioration. Accordingly, the optical resistance of the thermoreversible recording medium with this configuration may be improved. It is preferable that a thickness of the UV absorber layer be appropriately selected such that the UV absorber layer absorbs the UV rays of 390 nm or less.

The UV absorber layer at least includes a binder resin and a UV absorber agent, and may optionally include fillers, lubricants, coloring pigments, and other components.

The binder resin is not particularly specified, and may be appropriately selected based on various purposes. However, the above described binder resin used for the thermoreversible recording layer, thermoplastic resin, and thermosetting resin may be preferable. Examples of the components for the resin include polyethylene, polypropylene, polystyrene, polyvinyl alcohol, poly vinyl butyral, polyurethane, saturated polyester, unsaturated polyester, epoxy resin, phenol resin, polycarbonate, and polyamide.

The UV absorber agent may be formed of organic or inorganic compounds.

It is preferable to use a polymer having a UV absorber structure (hereinafter also called a "UV absorber polymer").

The UV absorber agent indicates a polymer having the UV absorber structure (i.e., a UV absorber group) in molecules. Examples of the UV absorber structure include a salicate structure, a cyanoacrylate structure, a benzotriazole structure, and a benzophenone structure. Among these, the benzotriazole structure, and the benzophenone structure are particularly preferable because they absorb the UV lays having the wavelength range of 340 to 400 nm that cause the optical deterioration of the leuco dyes.

It is preferable that the UV absorber polymer be crosslinked. Accordingly, the UV absorber polymer preferably includes a group capable of reacting with the curing agent such as an amino group or a carboxyl group, and more preferably includes a hydroxyl group. In order to improve the strength of the polymer containing layer having the UV absorber structure, the UV absorber polymer preferably includes the hydroxyl value of 10 mgKOH/g or more, more preferably includes the hydroxyl value of 30 mgKOH/g or more, and most preferably includes the hydroxyl value of 40 mgKOH/g or more. If the UV absorber layer has sufficient film strength, the deterioration of the thermoreversible recording medium due to the repeated recording and erasure may be suppressed.

A thickness of the UV absorber layer is not particularly specified, and may be preferably in a range of 0.1 to 30 μm, and more preferably in a range of 0.5 to 20 μm. Any known solvents, coating liquid dispersing devices, coating methods, and drying-curing methods used for the forming the thermoreversible recording layer may be used for forming the UV absorber layer.

—Intermediate Layer—

The thermoreversible recording medium is not particularly specified; however, it is preferable that the thermoreversible recording medium include an intermediate layer for improving the adhesiveness between the thermoreversible recording layer and the protection layer, preventing the deterioration of thermoreversible recording layer due to the application of the protection layer, and preventing the transition of the additives in the protection layer to the thermoreversible recording layer.

The intermediate layer is not particularly specified; however, the intermediate layer preferably includes at least a binder resin, and may optionally include fillers, lubricants, coloring pigments, and other components.

The binder resin is not particularly specified, and may be appropriately selected based on various purposes. However, the above described binder resin used for the thermoreversible recording layer, thermoplastic resin, and thermosetting resin may be preferable. Examples of the components for the resin include polyethylene, polypropylene, polystyrene, polyvinyl alcohol, poly vinyl butyral, polyurethane, saturated polyester, unsaturated polyester, epoxy resin, phenol resin, polycarbonate, and polyamide.

Further, it is preferable that the intermediate layer include the UV absorber agent. The UV absorber agent may be formed of organic or inorganic compounds.

The intermediate layer may include a UV absorber polymer and may be cured using the crosslinking agent. The crosslinking agent used for the protection layer may be suitably used for the intermediate layer.

A thickness of the intermediate layer may be preferably in a range of 0.1 to 20 μm, and more preferably in a range of 0.5 to 5 μm. Any known solvents, coating liquid dispersing devices, coating methods, and drying-curing methods used for the forming the thermoreversible recording layer may be used for forming the intermediate layer.

—Under Layer—

The thermoreversible recording medium is not particularly specified; however, it is preferable that the thermoreversible recording medium include an under layer for improving the sensitiveness of the thermoreversible recording medium by efficiently utilizing the applied heat, improving the adhesiveness between the thermoreversible recording layer and the supporting member, and preventing the transition of the materials in the thermoreversible recording layer to the supporting member.

The under layer may at least include hollow particles, may preferably include the binder resin, and may optionally include other components.

Examples of the hollow particles include hollow particles each having a single pore and porous particles each having multiple pores. The above types of the hollow particles may be used alone or may be used in combination of two or more.

Materials of the hollow particles are not particularly specified; however, the thermosetting resin may be preferably used. The above hollow particles may be suitably manufactured or commercially available hollow particles may be used. Examples of the commercially available hollow particles include Matsumoto Microsphere R-series (manufactured by Matsumoto Yushi-Seiyaku Co., Ltd), Rohpake HP-1055 and Rohpake HP-433J (manufactured by Zeon Corporation), and SX866 (manufactured by JSR).

The amount of the hollow particles to be added for the under layer is not particularly specified, and may be appropriately selected based on various purposes. However, amount of the hollow particles to be added may be preferably in a range of 10 to 80 mass %.

The same binder resin used for the thermoreversible recording layer or the UV absorber polymer having the UV absorber structure may be used for the under layer.

The under layer may at least include one of inorganic fillers selected from calcium carbonate, magnesium carbonate, titanium oxide, silicon oxide, aluminum hydroxide, kaoline, talc, or one of various organic fillers.

Note that the under layer may additionally include lubricants, surfacants, and dispersing agents.

A thickness of the under layer is not particularly specified, and may be appropriately selected based on various purposes. However, the thickness of the under layer may be preferably in a range of 0.1 to 50 μm, more preferably in a range of 2 to 30 μm, and most preferably in a range of 12 to 24 μm.

—Backing Layer—

The thermoreversible recording medium is not particularly specified; however, the thermoreversible recording medium may include a backing layer at a side opposite to the side of the supporting member where the thermoreversible recording layer is provided, in order to prevent curling and static charge, and improve the transferability.

The backing layer is not particularly specified; however, the backing layer preferably includes at least a binder resin, and may optionally include fillers, electro-conductive fillers, lubricants, coloring pigments, and other components.

The binder resin is not particularly specified, and may be appropriately selected based on various purposes. Preferred examples of the binder resin include thermosetting resin, ultraviolet (UV) curable resin, and electron beam curable resin. Among these, the ultraviolet (UV) curable resin and thermosetting resin may be particularly preferable.

The UV curable resin, the thermosetting resin, the filler, the conductive filler, and the lubricant used for the thermoreversible recording layer or the protection layer may be suitably used for the backing layer.

—Adhesive Layer and Cohesion Layer—

The thermoreversible recording medium is not particularly specified, and may be used as a thermoreversible recording label by providing an adhesive layer or a cohesion layer at a side opposite to a thermoreversible recording layer forming a surface of the supporting member of the thermoreversible medium. Materials for the adhesive layer or cohesion layer may be any materials generally used for the adhesive layer or cohesion layer.

Specific materials for the adhesive layer or cohesion layer are not particularly specified, and may be appropriately selected based on various purposes. However, preferable examples of the specific materials for the adhesive layer or cohesion layer may include urea resin, melamine resin, phenol resin, epoxy resin, vinyl acetate resin, vinyl acetate-acrylic copolymers, ethylene-vinyl acetate copolymers, acrylic resin, polyvinyl ether resin, chloridization vinyl-vinyl acetate copolymers, polystyrene resin, polyester resin, polyurethane resin, polyamide resin, chlorinated polyolefin resin, polyvinyl butyral resin, acrylic ester copolymers, methacrylate ester copolymer, natural rubber, cyanoacrylate resin, and silicone resin.

The materials for the adhesive layer or cohesion layer may be hot-melt types. The hot-melt materials for the adhesive layer or cohesion layer may utilize releasing paper or may not utilize the releasing paper. Accordingly, the thermoreversible recording label to which the adhesive layer or cohesion layer is provided may be attached on an entire surface or part of the surface of the thick substrate such as a vinyl chloride card having magnetic stripes to which the recording layer is difficult to apply. Thus, since part of the information recorded in the magnet is displayed on the medium, the convenience of the medium may be improved. The thermoreversible recording label having the adhesive layer or cohesion layer may be applied to a thick card such as an IC card or an optical card.

The thermoreversible recording medium is not particularly specified, and may include a coloring layer between the supporting member and the recording layer for improving the visibility.

The coloring layer is not particularly specified; however, the coloring layer may be formed by applying a solution containing a coloring agent and the binder resin or a dispersing liquid to a target surface and drying, or by attaching a colored sheet on the target surface.

The thermoreversible recording medium may include a color printing layer. Examples of a coloring agent for forming the color printing layer may be various dyes or pigments contained in the conventional ink used for full-color printing, and examples of the binder resin may include thermoplastic resin, thermosetting resin, UV curable resin, and electron beam curable resin. Since a thickness of the color printing layer is appropriately changed based on the printing color density, the thickness of the color printing layer may be selected based on desired printing density.

The thermoreversible recording medium may include a non-reversible recording layer. In this case, the developing color of the thermoreversible recording layer and non-reversible recording layer may either be the same or different. The thermoreversible recording medium may include the coloring layer provided on part of or an entire surface or opposite surface of the recording layer. The coloring layer may include optional patterns provided by offset printing, and gravure printing, or by an inkjet printer, a thermal transfer printer, or a sublimatic printer. Further, a double-sided overprint (OP) varnish layer having curable resin as a main component may be provided on the part or entire surface of the coloring layer. The optional patterns may include characters, patterns, design, photographs, and infrared ray detectable information. Alternatively, one of the above layers may be colored with dyes or pigments.

The thermoreversible recording medium may include a hologram for security. Further, a relief forming a portrait, a company emblem, or symbols may be formed in the thermoreversible recording medium for providing a particular design.

The thermoreversible recording medium may be formed in any desired shape or form, such as a card shape, tag shape, label shape, sheet shape, and roll shape. The card shaped thermoreversible recording medium may be applied as a prepaid card, a point card, or a credit card. The tag shaped thermoreversible recording medium that is smaller than the card shaped thermoreversible recording medium may be applied as a price tag. The tag shaped thermoreversible recording medium that is larger than the card shaped thermoreversible recording medium may be applied as a process control form, a delivery instruction form, or a ticket. Since the label shaped thermoreversible recording medium that is capable of attaching is formed into various sizes, they are applied to repeatedly used wagons, containers, and boxes for managing the process control or managing articles. The sheet shaped thermoreversible recording medium that is larger than the card shaped thermoreversible recording medium has a large area for recording images and may be used as a general-purpose document, and an instruction form of the process control form.

<Combination Example of Thermoreversible Recording Member with RF-ID>

The thermoreversible recording member used in the embodiments may provide excellent convenience by integrating the reversibly displaying recording layer and information recording portion in the same card or tag and displaying part of the recorded information recorded in the information recording portion, such that a user can recognize the information by simply looking at the card or tag without any (reading) device. Further, when the content of the information recording portion is changed, the thermoreversible recording medium may be repeatedly used by changing the display of the thermoreversible recording medium.

The information recording portion is not particularly specified, and may be appropriately selected based on various purposes. However, preferable examples of the information recording portion include a magnetic recording layer, magnetic stripes, an IC memory, an optical memory, and an RF-ID tag. If the information recording portion is used for process control or article management, an RF-ID tag is preferably used. Note that the RF-ID tag includes an IC chip, and an antenna connected to the IC chip.

The thermoreversible recording member includes the recording layer capable of reversibly displaying information and the information recording portion, and the RF-ID tag is preferably used as the information recording portion.

Figure 18:
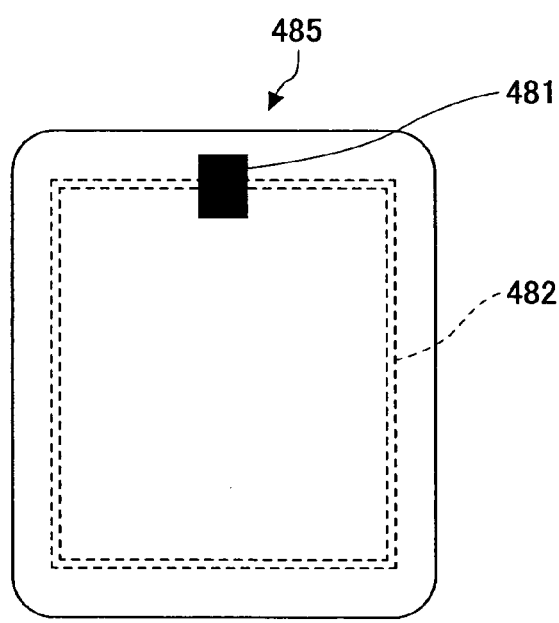
FIG. 18 is a schematic diagram illustrating an example of an RF-ID tag.

FIG. 18 is a schematic diagram illustrating an example of an RF-ID tag 485. The RF-ID tag 485 includes an IC chip 481, and an antenna 482 connected to the IC chip 481. The IC chip 481 includes four sections of a recording section, a power source adjusting section, a transmission section, and a receiving section, which share communication functions. The communication is carried out by transmission of radio waves between the RF-ID tag and a reader-writer antenna. Specifically, there are two types of communication system, a first one is an electromagnetic induction system where electromotive force is generated by resonance effect when the RF-ID antenna receives radio waves from the reader-writer antenna, and a second one is an electric radiation system where electromotive force is generated by a radiation field. In both systems, the IC chip of the RF-ID tag is activated by the external electromagnetic field, information in the IC chip is converted into signals, and the converted signals are transmitted from the RF-ID tag. The transmitted information is received by the reader-writer antenna, the received information is recognized by a data processing device, and the data are processed by software of the data processing device.

The RF-ID tag is formed in a label shape or card shape, such that the RF-ID tag may be attached to the thermoreversible recording medium. The RF-ID tag may be attached to a surface of the recording layer or the backing layer; however, the RF-ID tag may preferably be attached to the surface of the backing layer. Any known binders or adhesives may be used for adhering the RF-ID tag with the thermoreversible recording medium.

Further, the thermoreversible recording medium and the RF-ID tag may be integrated into a card or a tag by a laminating process, or the like.

<Image Recording and Erasing Mechanism>

An image recording and erasing mechanism is achieved by reversing the colors of the thermoreversible recording medium with heat. The thermoreversible recording medium includes the leuco dyes and the reversible developer (hereinafter simply called a "developer"), where the color of the thermoreversible recording medium is reversibly changed between a developed colored state and a transparent state by the application of heat.

Figure 19A:
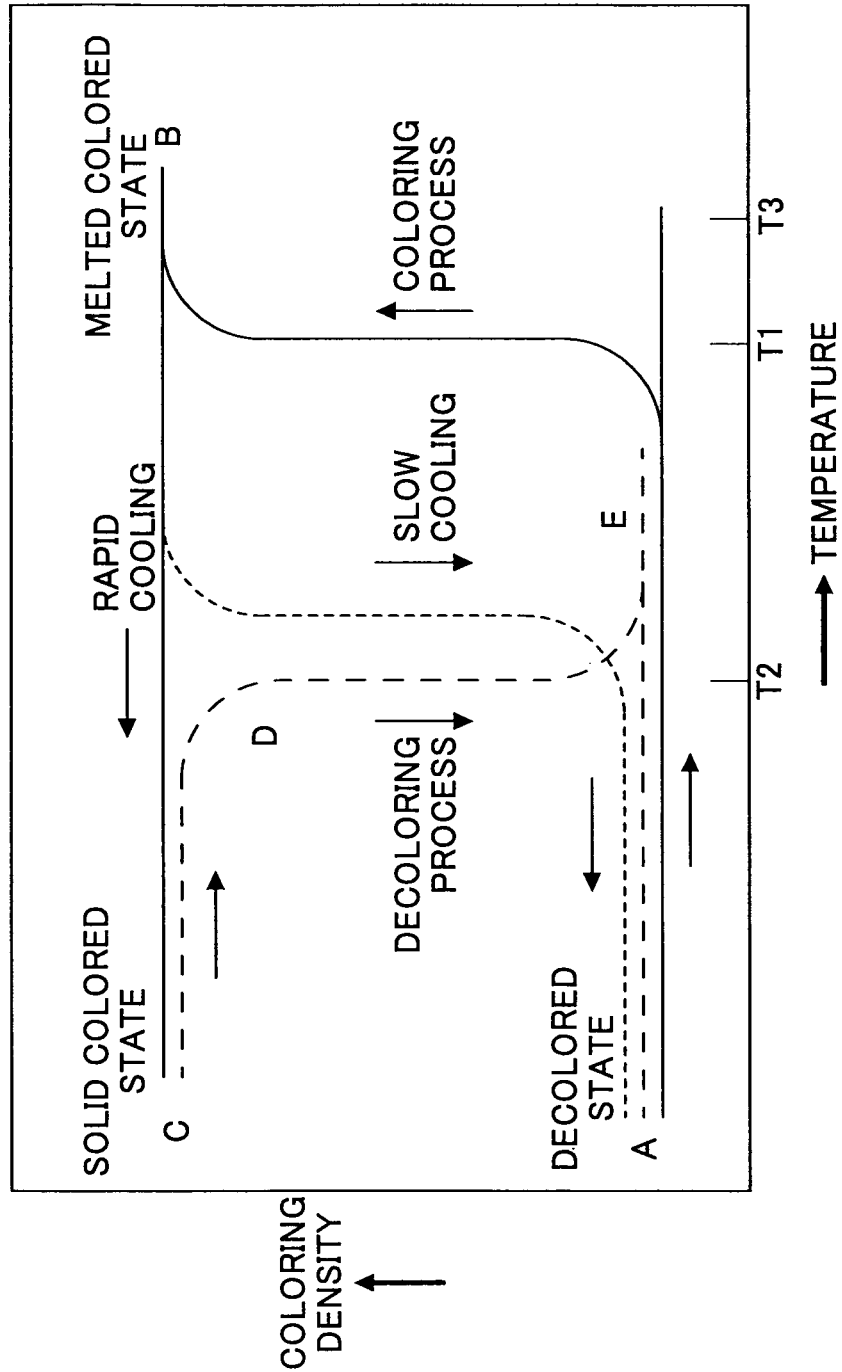
FIG. 19A is a graph illustrating coloring/decoloring properties of the thermoreversible recording medium.

FIG. 19A illustrates an example of a temperature-color density change curve in the thermoreversible recording medium having the thermoreversible recording layer(s) formed by mixing the leuco dyes and the developers in the resin. FIG. 19B illustrates a coloring/decoloring mechanism in the thermoreversible recording medium where the transparent state and developed color state are reversibly changed with the applied heat.

As illustrated in FIG. 19A, when the recording layer in a decolored state A is heated to a melting temperature T1, the leuco dye and the developer in the recording layer are melted and mixed so that the recording layer is colored in a melted colored state B. When the recording layer in the melted colored state B is rapidly cooled, a temperature of the recording layer is decreased to room temperature while the recording layer maintains its colored state, thereby stabilizing the colored state of the recording layer. Accordingly, the recording layer is in a solid colored state C. Whether the recording layer is capable of obtaining such a solid colored state depends on a speed of heating or cooling the recording layer in the melted colored state B. If the recording layer is slowly cooled, the recording layer is decolored to be in the initial decolored state A. If, on the other hand, the recording layer is rapidly cooled, the recording layer acquires a relatively dense color compared to that in the solid colored state A. Meanwhile, when the recording layer in the solid colored state C is heated again, the recording layer is decolored at a temperature T2 lower than a coloring temperature (from D to E), and if the recording layer having been in the solid colored state C is then cooled, the recording layer returns to the initial decolored state A.

In the recording layer in the solid colored state C changed from the melted state by rapid cooling, the colored leuco dye molecules and the developer molecules are mixed while they remain in a contact reactive state and the molecules in the contact reactive state often form solids. In this status, the melted mixture (colored mixture) of the leuco dye and developer is crystallized while retaining its colored state, and due to this crystallized structure, the color of the mixture may be stabilized. In contrast, a phase of the leuco dye and that of the developer are separated in the decolored state. In the phase-separation status, the molecules of one of the leuco dye compound and the developer compound are cohered or crystallized, so that the leuco dye and the developer are separately stabilized due to its cohesion or crystallization. In many cases, more complete decoloration of the recording layer may be obtained due to the phase separation of the leuco dye and the developer and crystallization of the developer.

Note that the decolored state A obtained by slow cooling from the melted state B of the recording layer or the decolored state A obtained by heating from the solid colored state C of the recording layer illustrated in FIG. 19A may result from changes in the cohered structure at temperature T2, thereby causing the phase separation and crystallization of the developer.

Further, in FIG. 19A, erasing failure, where the recording layer heating at an erasing temperature is unable to decolor, may occur if the recording layer is repeatedly heated to a temperature T3 equal to or higher than the melting temperature T1. The erasing failure may result from thermal decomposition of the developer, because the thermally decomposed developer is resistant to cohesion or crystallization and thus may not be easily separate from the leuco dye. Deterioration of the thermoreversible recording medium due to repeated heating and cooling may be controlled by decreasing the difference between the melting temperature T1 and the temperature T3 when heating the thermoreversible recording medium.

(Image Processing Apparatus)

An image processing apparatus according to the embodiment is used for carrying out the marking control method, and is configured to include at least a laser application unit to apply a laser beam, a laser beam scanning unit to scan the laser beam on a laser receiving surface, and optionally includes other members.

The wavelength of the laser beam to be applied to the thermoreversible recording medium may be selected such that the thermoreversible recording medium efficiently absorbs the applied laser beam. For example, the thermoreversible recording medium may at least include at least a photothermal conversion material capable of generating heat by efficiently absorbing the applied laser beam. The wavelength of the laser beam to be applied to the thermoreversible recording medium may need to be selected such that the photothermal conversion material more efficiently absorbs the applied laser beam than other materials.

—Laser Emitting Unit—

A wavelength of the laser beam emitted by a laser emitting unit may be preferably 700 nm or more, more preferably 720 nm or more, and particularly preferably 750 nm or more. An upper limit of the wavelength of the laser beam emitted by a laser emitting unit is not particularly limited, and may be appropriately selected based on various purposes. However, the upper limit of the wavelength of the laser beam may be preferably 1,500 nm or less, more preferably 1,300 nm or less, and particularly preferably 1,200 nm or less.

If the wavelength of the laser beam is shorter than 700 nm, the contrast of the image in a visible light region may be lowered while recording the image, or other regions of the thermoreversible recording medium may be colored. In an ultraviolet light region having a wavelength further shorter than the 700 nm of the visible light region, the thermoreversible recording medium may be damaged. Moreover, the photothermal conversion material added to the thermoreversible recording medium may require a high decomposition temperature for obtaining durability for repeated image processing. However, if the photothermal conversion material needs to contain an organic dye, it may be difficult to obtain the photothermal conversion material having a long absorption wavelength and having high decomposition temperature. Thus, the wavelength of the laser beam may be preferably 1,500 nm or less.

The laser emitting unit is not particularly specified, and may be appropriately selected based on various purposes; however, preferable examples of the laser emitting unit include a YAG (yttrium aluminium garnet) laser, a fiber laser, and a semiconductor laser (i.e., a laser diode, LD). Among these, the semiconductor laser is particularly preferable due to having a wide selection of the wavelength range, thereby increasing the optional photothermal conversion material range. Further, since the semiconductor laser has a small laser light source, the laser device having the semiconductor laser may be reduced in size and may be fabricated at low cost.

The image processing apparatus has a basic configuration similar to that of the laser marker including the laser emitting unit, and at least additionally includes an oscillator unit, a power control unit, and a program unit.

Figure 20:
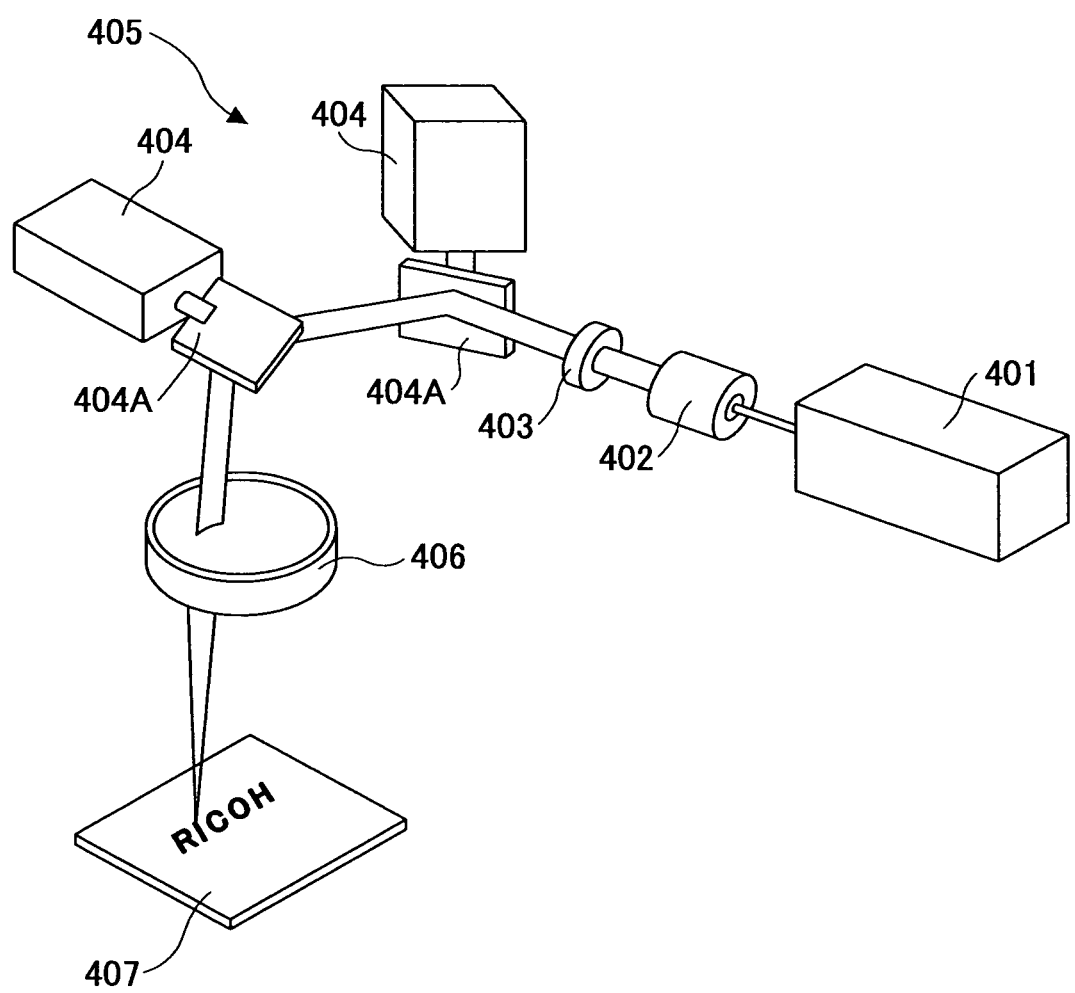
FIG. 20 is a schematic diagram illustrating an image processing apparatus according to an embodiment.

FIG. 20 illustrates an example of the image processing apparatus used in the above embodiments, where the laser emitting unit is focused on.

The oscillator unit is configured to include a laser oscillator 401, a beam expander 402, and a scanning unit 405 (laser beam scanning unit).

The laser oscillator 401 is provided for increasing optical intensity and directivity of the laser beam. Accordingly, in the laser oscillator 401, a mirror is arranged at both sides of a laser medium to pump the laser medium (energy supply) to increase excited state atoms such that an inverted distribution is formed to induce laser emission. The laser beams in an optical axis direction are amplified to increase the directivities of the laser beams, so that the laser beam is emitted from an output mirror.

The scanning unit 405 is configured to include galvanometers 404 and galvanometer mirrors 404A attached to the corresponding galvanometers 404. The laser beam output from the laser oscillator 401 is then rotationally scanned at a high speed by the X-axis directional mirror 404A and the Y-axis directional mirror 404A attached to the respective galvanometers 404 to apply the laser beam on a thermoreversible recording medium 407, thereby recording or erasing the image on the thermoreversible recording medium 407.

The power control unit is configured to include a drive power that is a light source for exciting a laser medium, drive power for the galvanometers, cooling power source for a Peltier device, and a control unit for controlling an entire image processing apparatus.

The program unit is configured to control the laser beam intensity, and input of a condition such as laser scanning speed, and also create or edit characters or images to be recorded or erased via a touch panel or a keyboard.

Note that the laser application unit that is an image recording/erasing head is provided in the image processing apparatus. Further, the image processing apparatus includes a transfer unit for transferring the thermoreversible recording medium, a control unit for the transfer unit, and a monitor unit (i.e., touch panel).

EXAMPLES

Although examples of the embodiments are described below, the embodiments are not limited to these examples.

Manufacturing Example 1

Manufacture of Thermoreversible Recording Medium

A thermoreversible recording medium capable of reversibly changing its color with applied heat was manufactured as follows.
—Supporting Member—
A white polyester film having a thickness of 125 μm (Tetoron Film U2L98W; manufactured by Teijin DuPont Films Japan Limited) was used as a supporting member.
—Forming of First Thermoreversible Recording Medium—
Five parts by mass of a reversible developer represented by the structural formula (1), 0.5 parts by mass of a first decoloring accelerator represented by the structural formula (2), 0.5 parts by mass of a second decoloring accelerator represented by the structural formula (3), 10 parts by mass of a solution containing 50 mass % acrylic polyol (hydroxyl value=200 mgKOH/g), and 80 parts by mass of methyl ethyl ketone were ground and dispersed by a ball mill until they had a mean particle size of approximately 1 μm.

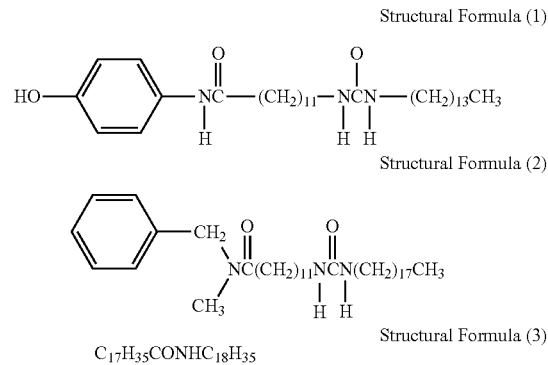

Next, one part by mass of 2-anilino-3-methyl-6-dibutylaminofluoran as the leuco dye, and 5 parts by mass of isocyanate (Coronate HL; manufactured by Nippon Polyurethane Industries, Co., Ltd.) were added to the obtained dispersion having the dispersed ground reversible developer particles, and the mixture was sufficiently stirred, thereby preparing a thermoreversible recording layer coating liquid.

The obtained thermoreversible recording layer coating liquid was coated on the supporting member with a wire bar, the coated supporting member was dried at 100° C. for 2 minutes, and the dried supporting member was then cured at 60° C. for 24 hours, thereby obtaining a first thermoreversible recording layer having a thickness of 9.6 μm.
—Forming of Photothermal Conversion Layer—
Four parts by mass of a solution containing 1 mass % phthalocyanine photothermal conversion material (IR-14, absorption wavelength peak: 824 nm; manufactured by Nippon Shokubai Co., Ltd.), 10 parts by mass of a solution containing 50 mass % aclyic polyol (a hydroxyl value=200 mgKOH/g), 20 parts by mass of methyl ethyl ketone, and 5 parts by mass of isocyanate (Coronate HL; manufactured by Nippon Polyurethane Industries, Co., Ltd.) as a crosslinker were mixed and sufficiently stirred, thereby preparing a photothermal conversion layer coating liquid. The obtained photothermal conversion layer coating liquid was coated on the first thermoreversible recording layer with a wire bar, the coated first thermoreversible recording layer was dried at 90°

C. for 1 minute, and the dried first thermoreversible recording layer was then cured at 60° C. for 24 hours, thereby obtaining a photothermal conversion layer having a thickness of 4 μm.

—Forming of Second Thermoreversible Recording Medium—

The obtained thermoreversible recording layer coating liquid (same coating liquid used for the first thermoreversible recording layer) was coated on the photothermal conversion layer with a wire bar, the coated photothermal conversion layer was dried at 100° C. for 2 minutes, and the dried photothermal conversion layer was then cured at 60° C. for 24 hours, thereby obtaining a second thermoreversible recording layer having a thickness of 2.4 vim.

—Forming of Photothermal Conversion Layer—

Ten parts by mass of a solution containing 40 mass % UV absorber polymer (UV-G300; manufactured by Nippon Shokubai Co., Ltd.), 1.5 parts by mass of isocyanate (Coronate HL; manufactured by Nippon Polyurethane Industries, Co., Ltd.), and 12 parts by mass of methyl ethyl ketone were mixed and the mixture was sufficiently stirred, thereby preparing a UV absorber layer coating liquid.

Next, the obtained UV absorber layer coating liquid was coated on the second thermoreversible recording layer of the supporting member with a wire bar, where the second thermoreversible recording layer is formed on the photothermal conversion layer, and the photothermal conversion layer is formed on the supporting member; the coated layer was dried at 90° C. for 1 minute, and the coated layer was then cured at 60° C. for 24 hours, thereby obtaining a UV absorber layer having a thickness of 2 μm.

Note that as will be described later, a second oxygen barrier layer was provided on the UV absorber layer and a first oxygen barrier layer was provided between the first thermoreversible recording layer and the supporting member.

—Forming of First Oxygen Barrier Layer and Second Oxygen Barrier Layer—

Five parts by mass of an urethane adhesive (TM-567; manufactured by Toyo-Morton, Ltd.), 0.5 parts by mass of isocyanate (CAT-RT-37; manufactured by Toyo-Morton, Ltd.), and 5 parts by mass of ethyl acetate were mixed and the mixture was sufficiently stirred, thereby preparing an oxygen barrier layer coating liquid.

Next, the oxygen barrier layer coating liquid was coated on a silica deposited PET (polyethylene terephthalate) film (Techbarrier HX, Oxygen Transmission: 0.5 ml/m²/day/MPa; manufactured by Mitsubishi Plastics, Inc.) with a wire bar, the coated film was dried at 80° C. for 1 minute, and the coated film was then cured at 50° C. for 24 hours; the cured coated film was adhered to the UV absorber layer and to the supporting member, respectively, thereby forming a first oxygen barrier layer and a second oxygen barrier layer each having a thickness of 12 μm.

—Forming of Backing Layer—

7.5 parts by mass of pentaerythritol hexaacrylate (KAYARAD DPHA; manufactured by Nippon Kayaku Co., Ltd.), 2.5 parts by mass of urethane acrylate oligomer (Art resin UN-3320HA; manufactured by Negami Chemical Industrial Co., Ltd.), 2.5 parts by mass of acicular electro-conductive titanium oxide (FT-3000: long axis=5.15 μm, short axis=0.27 μm; manufactured by Ishihara Sangyo Kaisha, Ltd.), 0.5 parts by mass of a photopolymerization initiator (Irgacure 184; manufactured by Nihon Ciba-Geigy K.K.), and 13 parts by mass of isopropyl alcohol were mixed and sufficiently stirred by a ball mill, thereby preparing a backing layer coating liquid.

Next, the obtained backing layer coating liquid was coated on a side of the supporting member where the above layers were not formed with a wire bar, the coated supporting member was heated and dried at 90° C. for 1 minute, and the coated supporting member was then crosslinked by a UV lamp having lamp power of 80 W/cm, thereby obtaining a backing layer having a thickness of 4 μm. Thus, the thermoreversible recording medium was manufactured by following a method of Manufacturing Example 1.

Manufacturing Example 2

Manufacture of Thermoreversible Recording Medium

A thermoreversible recording medium was manufactured by following a method of Manufacturing Example 2 in the same manner as the method of manufacturing example 1, except that in the preparation of the photothermal conversion material, 2 parts by mass of a solution containing 0.5 mass % cyanin photothermal conversion material (YKR-2900, absorption wavelength peak: 830 nm; manufactured by Yamamoto Chemicals Inc.) was added instead of adding 4 parts by mass of the solution containing 1 mass % phthalocyanine photothermal conversion material to the prepare photothermal conversion layer coating liquid. Note that the cyanin photothermal conversion material (YKR-2900; manufactured by Yamamoto. Chemicals Inc.) was added in an amount such that the cyanin photothermal conversion material obtains the thermosensitivity similar to that of the phthalocyanine photothermal conversion material obtained in Manufacturing Example 1.

Solidly Filled Image Printing (Image Recording)

Example 1

An image recording process was conducted by a LD marker device. In the image recording process (conducted by the LD marker device), laser beams were applied to the thermoreversible recording medium obtained in Manufacturing Example 1 by ES-6200-A (central wavelength: 808 nm) of a QPC fiber-coupled laser diode (semiconductor laser), the applied laser beams were collimated by two collimator lenses (focal length: 26 mm), the collimated laser beams were scanned by a galvanoscanner 6230H (manufactured by Cambridge Technology), and the scanned laser beams were then converged on the thermoreversible recording medium with a fθ lens (focal length: 141 mm). In Example 1, a working distance was adjusted at 141 mm (a beam diameter: 0.65 mm), a linear speed was adjusted at 2,500 mm/s, and the image recording was conducted based on a laser beam scanning method illustrated in FIG. 21A (i.e., 4 A-directional marking lines, 6 B-directional marking lines, and 3 C-directional marking lines). In Example 1, a solidly filled image was recorded such that a pitch width was set at 0.20 mm between an A-directional marking line and a C-directional marking line located adjacent to the A-directional marking line, a slanted amount of the C-directional marking line to the A-directional marking line was set at 0.09 mm, and a length of the A-directional marking line was set at 10 mm. The irradiation power of the laser beam was selected so that image density was saturated.

Example 2

Figure 21A:
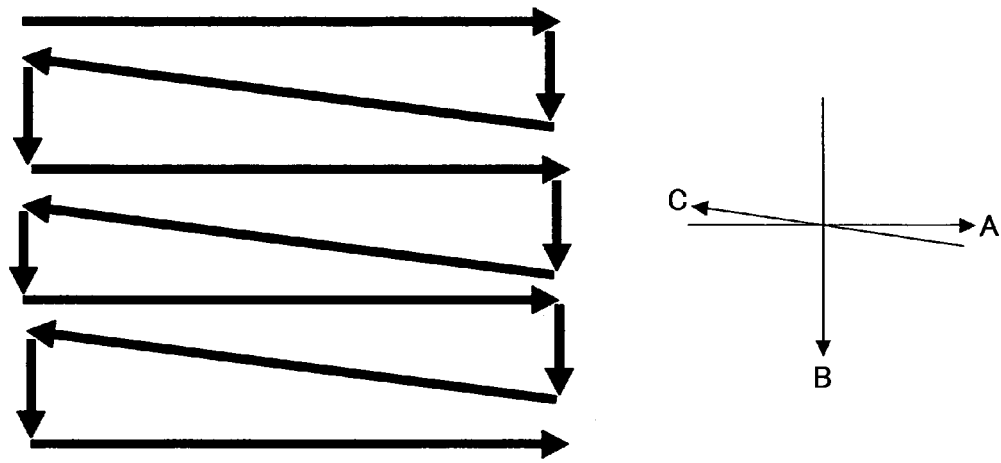
FIG. 21A is a diagram illustrating an example of a laser beam scanning method for recording or erasing an image in Examples.
Figure 21B:
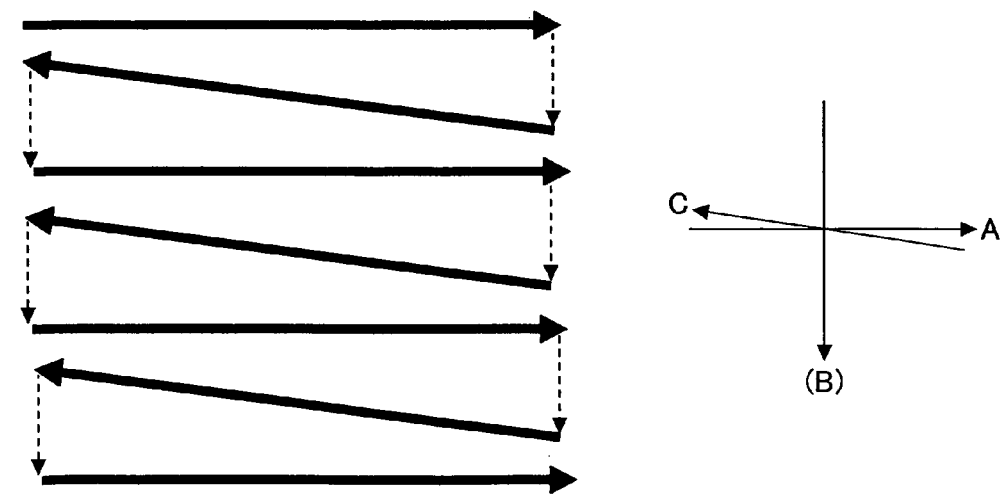
FIG. 21B is a diagram illustrating another example of the laser beam scanning method for recording or erasing an image in Examples.

In Example 2, the image recording was conducted based on a laser beam scanning method illustrated in FIG. 21B (i.e., 4 A-directional marking lines, 3 C-directional marking lines, and no B-directional marking lines) instead of the laser beam scanning method illustrated in FIG. 21A. In Example 2, a solidly filled image was recorded in the same manner as the Example 1, where a pitch width was set at 0.20 mm between an A-directional marking line and a C-directional marking line adjacent to the A-directional marking line, a slanted amount of the C-directional marking line to the A-directional marking line was set at 0.09 mm, and a length of the A-directional marking line was set at 10 mm.

Example 3

In Example 3, the image recording was conducted in the same manner as the Example 2, except that a slanted amount of the C-directional marking line to the A-directional marking line was changed from 0.09 mm (Example 2) to 0.045 mm (Example 3).

Example 4

In Example 4, the image recording was conducted in the same manner as the Example 2, except that a slanted amount of the C-directional marking line to the A-directional marking line was changed from 0.09 mm (Example 2) to 0.155 mm (Example 4).

Example 5

In Example 5, the image recording was conducted in the same manner as the Example 2, except that a slanted amount of the C-directional marking line to the A-directional marking line was changed from 0.09 mm (Example 2) to 0.02 mm (Example 5).

Example 6

In Example 6, the image recording was conducted in the same manner as the Example 2, except that a slanted amount of the C-directional marking line to the A-directional marking line was changed from 0.09 mm (Example 2) to 0.18 mm (Example 6).

Example 7

In Example 7, the image recording was conducted based on a laser beam scanning method illustrated in FIG. 21B (i.e., 4 A-directional marking lines, 3 C-directional marking lines, and no marking line was drawn in B direction), in the same manner as the Example 2, except that the irradiation power of the laser beam applied for marking the first marking line was increased by 10% of that of the laser beam applied for marking the first marking line in Example 2. In Example 7, the irradiation power of the laser beam for marking the first making line was 21.0 W and that for marking the second marking line was 19.1 W.

Example 8

In Example 8, the image recording was conducted in the same manner as the Example 2, except that the thermoreversible recording medium manufactured in Manufacturing Example 1 (used in Example 2) was changed to the thermoreversible recording medium manufactured in Manufacturing Example 2

Comparative Example 1

Figure 22A:
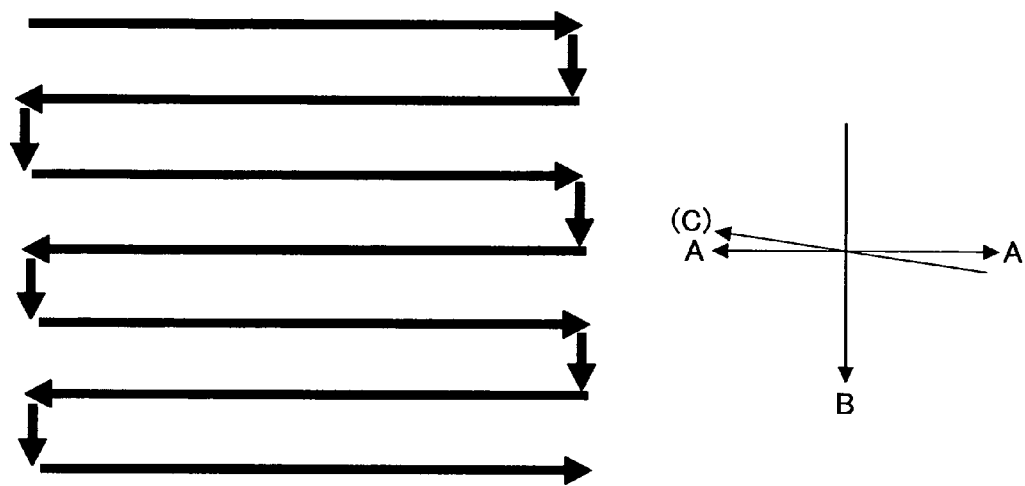
FIG. 22A is a diagram illustrating an example of a laser beam scanning method for recording or erasing an image carried out in a Comparative Example.

In Comparative Example 1, the image recording was conducted in the same manner as the Example 1 based on a laser beam scanning method illustrated in FIG. 22A (i.e., 7 A-directional marking lines, 6 B-directional marking lines, and no C-directional marking line) instead of the laser beam scanning method illustrated in FIG. 21A, where a pitch width was set at 0.20 mm between adjacent A-directional marking lines, and a length of the A-directional marking line was set at 20 mm.

Comparative Example 2

Figure 22B:
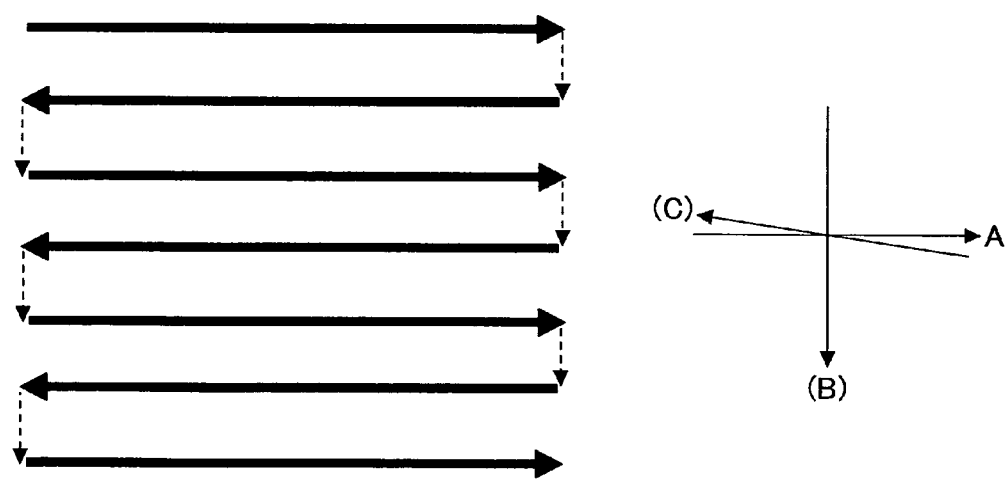
FIG. 22B is a diagram illustrating another example of the laser beam scanning method for recording or erasing an image carried out in the Comparative Example.

In Comparative Example 2, the image recording was conducted in the same manner as the Example 1 based on a laser beam scanning method illustrated in FIG. 22B (i.e., 7 A-directional marking lines, no B-directional marking line, and no C-directional marking line) instead of the laser beam scanning method illustrated in FIG. 21A, where a pitch width was set at 0.20 mm between adjacent A-directional marking lines, and a length of the A-directional marking line was set at 20 mm.

Comparative Example 3

Figure 22C:
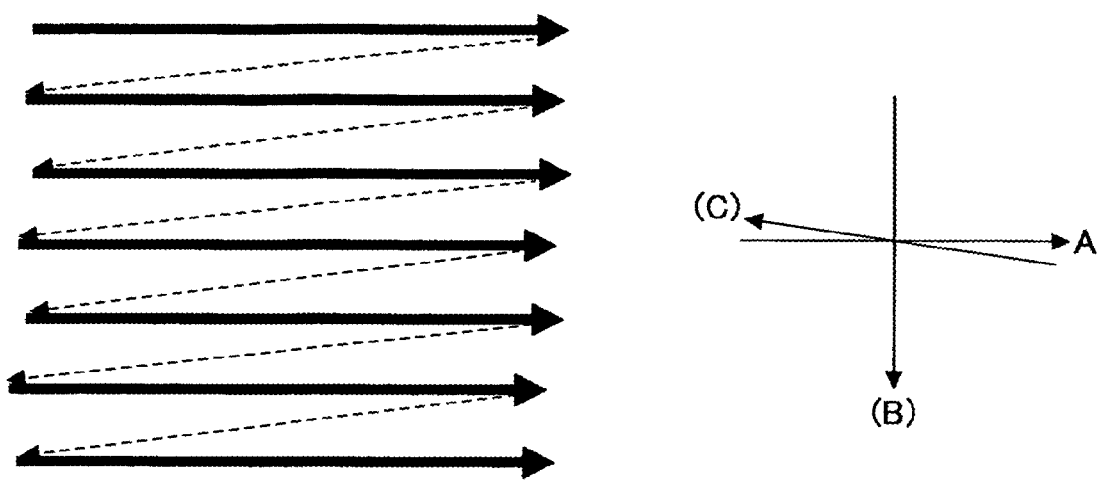
FIG. 22C is a diagram illustrating still another example of the laser beam scanning method for recording or erasing an image carried out in the Comparative Example.

In Comparative Example 3, the image recording was conducted in the same manner as the Example 1 based on a laser beam scanning method illustrated in FIG. 22C (i.e., 7 A-directional marking lines, no B-directional marking line, and no C-directional marking line) instead of the laser beam scanning method illustrated in FIG. 21A, where a pitch width was set at 0.20 mm between adjacent A-directional marking lines, and a length of the A-directional marking line was set at 20 mm.

Image Erasure

Example 9

In Example 9, a working distance was adjusted at 181 mm (a beam diameter: 3.0 mm) and a scanning speed was adjusted at 1,000 mm/s in an LD marker device, and the solidly filled image recorded in a solidly filled marking area of the thermoreversible recording medium obtained in Manufacturing Example 1 was erased based on the laser beam scanning method illustrated in FIG. 21A (i.e., 14 A-directional marking lines, 27 B-directional marking lines, and 14 C-directional marking lines in this case). In Example 9, the image erasure was conducted such that a pitch width was set at 0.60 mm between an A-directional marking line and a C-directional marking line adjacent to the A-directional marking line, a slanted amount of the C-directional marking line to the A-directional marking line was set at 0.24 mm, and a length of the A-directional marking line was set at 40 mm.

Example 10

In Example 10, the image erasure was conducted based on a laser beam scanning method illustrated in FIG. 21B (i.e., 14 A-directional marking lines, 14 C-directional marking lines, and no B-directional marking line) instead of the laser beam scanning method illustrated in FIG. 21A. In Example 10, the solidly filled image was erased in the same manner as the Example 9 where a pitch width was set at 0.60 mm between an A-directional marking line and a C-directional marking line adjacent to the A-directional marking line, a slanted amount of the C-directional marking line to the A-directional marking line was set at 0.24 mm, and a length of the A-directional marking line was set at 40 mm.

Example 11

In Example 11, the image erasure was conducted in the same manner as the Example 10, except that a slanted amount of the C-directional line to the A-directional line was changed from 0.24 mm (Example 10) to 0.13 mm (Example 11).

Example 12

In Example 12, the image erasure was conducted in the same manner as the Example 10, except that a slanted amount of the C-directional line to the A-directional line was changed from 0.24 mm (Example 10) to 0.46 mm (Example 12).

Example 13

In Example 13, the image erasure was conducted in the same manner as the Example 10, except that a slanted amount of the C-directional line to the A-directional line was changed from 0.24 mm (Example 10) to 0.08 mm (Example 13).

Example 14

In Example 14, the image erasure was conducted in the same manner as the Example 10, except that a slanted amount of the C-directional line to the A-directional line was changed from 0.24 mm (Example 10) to 0.54 mm (Example 14).

Comparative Example 4

In Comparative Example 4, the image erasure was conducted based on the laser beam scanning method illustrated in FIG. 22A (i.e., 28 A-directional marking lines, 27 B-directional marking lines, and no C directional marking line) instead of the laser beam scanning method illustrated in FIG. 21A. The solidly filled image was erased in the same manner as the Example 9, where a pitch width was set at 0.60 mm between adjacent A-directional marking lines, and a length of the A directional line was set at 40 mm.

Comparative Example 5

In Comparative Example 5, the image erasure was conducted based on the laser beam scanning method illustrated in FIG. 22B (i.e., 28 A-directional marking lines, no B-directional marking line, and no C directional marking line) instead of the laser beam scanning method illustrated in FIG. 21A. The solidly filled image was erased in the same manner as the Example 9, except that a pitch width was set at 0.60 mm between adjacent A-directional marking lines, and a length of the A directional line was set at 40 mm.

Comparative Example 6

In Comparative Example 6, the image erasure was conducted based on the laser beam scanning method illustrated in FIG. 22C (i.e., 28 A-directional marking lines, no B-directional marking line, and no C directional marking line) instead of the laser beam scanning method illustrated in FIG. 21A. The solidly filled image was erased in the same manner as the Example 9, except that a pitch width was set at 0.60 mm between adjacent A-directional marking lines, and a length of the A directional line was set at 40 mm.

—Evaluation of Image Printing and Repeated Durability—

Table 1 illustrates printing time and irradiation power of the laser beam in printing the solidly filled image when image density is saturated in Examples 1 through 8, and in Comparative Examples 1 through 3.

Further, after the images were recorded in Examples 1 through 8 and in Comparative Examples 1 through 3, the recorded images were erased based on the image erasure method of Comparative Example 6 by applying a laser beam with an erasure mean power, and the image processing including the image recording and the image erasure was thus repeatedly carried out. Table 1 also includes an evaluation result of repeated durability having the number of times the solidly filled image density in the image recording process was 1.3 or less, or the number of times the unerased image density in the image erasing process exceeded 0.02.

Note that the solidly filled image density and the unerased image density were measured based on a grayscale (Kodak Co., Ltd.) read by a scanner (Canoscan 4400 manufactured by Canon Inc.), and a correlation between the respective grayscale values and the respective image densities measured by a reflection densitometer (RD-914 manufactured by Machbeth Corp.) were computed. Accordingly, the respective grayscale values of the solidly filled images and the unerased images were converted into the respective image densities of the solidly filled images and the unerased images.

TABLE 1

| | | IMAGE PRINTING | | | REPEATED DURABILITY (times) |
|---|---|---|---|---|---|
| | MARK METHOD | PRINT TIME (ms) | LASER POWER (W) | SLANTED AMOUNT/ PITCH WIDTH | |
| Example 1 | FIG. 21A | 30 | 20.0 | 0.450 | 500 |
| Example 2 | FIG. 21B | 30 | 20.9 | 0.450 | 2450 |
| Example 3 | FIG. 21B | 30 | 20.0 | 0.225 | 590 |
| Example 4 | FIG. 21B | 30 | 21.3 | 0.775 | 620 |
| Example 5 | FIG. 21B | 30 | 23.0 | 0.100 | 160 |
| Example 6 | FIG. 21B | 30 | 23.5 | 0.900 | 200 |
| Example 7 | FIG. 21B | 30 | 19.1 | 0.450 | 3250 |
| Example 8 | FIG. 21B | 30 | 21.8 | 0.450 | 20 |
| Comparative Example 1 | FIG. 22A | 30 | 23.4 | — | 10 |
| Comparative Example 2 | FIG. 22B | 30 | 23.9 | — | 120 |
| Comparative Example 3 | FIG. 22C | 41 | 25.2 | — | 1350 |

—Image Erasing Properties—

The solidly filled image formed in the solidly filled image printing area recorded in Example 2 was erased by sequentially changing from low irradiation power (W) to high irradiation power of the applied laser beam under image erasure conditions in Examples 9 to 14 and in Comparative Examples 4 through 6, and image erasure time, an erasure mean power, and an erasure width were obtained. The results are illustrated in Table 2.

Note that the erasure mean power indicates irradiation power of the laser beam applied to the thermoreversible recording medium where a base density of the thermoreversible recording medium was +0.02 or less based on the base density of the thermoreversible recording medium obtained before the solidly filled image was formed. The erasure mean power was obtained by computing a mean between the maximum value and minimum value of the irradiation power of the laser beam. Moreover, the erasure width was computed by (maximum value−minimum value)/(maximum value+minimum value). Note that the base density of the thermoreversible recording medium was measured in the same manner as those of the solidly filled image density and the unerased image density.

TABLE 2

| | | IMAGE ERASURE | | | |
|---|---|---|---|---|---|
| | ERASE METHOD | ERASE TIME (s) | ERASE MEAN POWER (W) | ERASED WIDTH | SLANTED AMOUNT/ PITCH WIDTH |
| Example 9 | FIG. 21A | 1.21 | 26.0 | 0.18 | 0.400 |
| Example 10 | FIG. 21B | 1.21 | 26.5 | 0.22 | 0.400 |
| Example 11 | FIG. 21B | 1.21 | 26.9 | 0.16 | 0.217 |
| Example 12 | FIG. 21B | 1.21 | 26.7 | 0.17 | 0.767 |
| Example 13 | FIG. 21B | 1.21 | 27.3 | 0.07 | 0.133 |
| Example 14 | FIG. 21B | 1.21 | 27.1 | 0.08 | 0.900 |
| Comparative Example 4 | FIG. 22A | 1.21 | 27.0 | 0.00 | — |
| Comparative Example 5 | FIG. 22B | 1.21 | 27.4 | 0.04 | — |
| Comparative Example 6 | FIG. 22C | 1.63 | 29.2 | 0.21 | — |

The marking control device, the laser application device, the marking control method, the marking control program, and a computer-readable recording medium embodying the marking control program according to preferred embodiments are described. However, they are not limited to those specifically disclosed embodiments and various modifications and alteration may be made within the scope of the inventions described in the claims.

The marking control method according to the embodiments is capable of providing excellent printing quality in recording or erasing an image, excellent repeated durability in forming the image, image-processing in a short time, and excellent applicability to a solidly filled image, barcode/QR code printing, and boldface character printing. Accordingly, the marking control method according to the embodiments may be suitably used as a marking control method for marking recording media utilized in a physical distribution system and delivery system.

The disclosed embodiments may provide the marking control device, the laser application device, the marking control method, the marking control program, and the computer-readable recording medium embodying such a marking control program capable of reducing a marking time in marking an image while maintaining high quality of the marked image.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese Priority Applications No. 2009-240527 filed on Oct. 19, 2009, No. 2009-247295 filed on Oct. 28, 2009, and No. 2010-201388 filed on Sep. 8, 2010, with the Japanese Patent Office, the entire contents of which are hereby incorporated by reference.

The invention claimed is:

1. A marking control device for controlling a marking device that marks a target image on a thermoreversible recording medium by applying a laser beam thereto, the marking control device comprising:
a marking position determination unit configured to divide the target image into a first marking line and a second marking line that are adjacent to each other, and determine a marking position of each of the adjacent first and second marking lines;
a marking line order determination unit configured to determine a marking order of the adjacent first and second marking lines for marking the target image such that the second marking line is marked by reversing a scanning direction of the second marking line relative to a scanning direction of the first marking line;
an adjusting unit configured to adjust, when the first marking line is initially scanned and the second marking line is scanned adjacent and subsequent to the first marking line by substantially reversing the scanning direction from a location near a first ending point of the first marking line, a first distance between the first ending point of the first marking line and a second starting point of the second marking line to be longer than a second distance between a first starting point of the first marking line and a second ending point of the second marking line so that the first marking line and the second marking line are not parallel lines but are close enough together so as to fill the target image; and
a marking instruction generator unit configured to generate a set of marking instructions including the respective marking positions of the first and second marking lines and the marking order of the first and second marking lines.

2. The marking control device as claimed in claim 1, wherein the adjusting unit divides an interval between the first starting point and the first ending point of the first marking line into plural unit line components and an interval between the second starting point and the second ending point of the second marking line into plural unit line components, and adjusts the laser output power of the laser beam applied to the second starting point side of a unit line component of the second marking line to be lower than the laser output power of the laser beam applied to the second ending point side of another unit line component of the second marking line subsequent to the unit line component thereof.

3. The marking control device as claimed in claim 1, wherein the adjusting unit adjusts the laser output power of the laser beam applied to the second starting point side of the second marking line to be lower than the laser output power of the laser beam applied to the second ending point side thereof and gradually lowers a marking speed to mark the second marking line from the second starting point of the second marking line to the second ending point thereof.

4. The marking control device as claimed in claim 1, wherein the adjusting unit adjusts the laser output power of the laser beam applied to the second starting point side of the second marking line to be lower than the laser output power of the laser beam applied to the second ending point side thereof by gradually increasing the laser output power of the laser beam applied to the second marking line from the second starting point of the second marking line to the second ending point thereof.

5. The marking control device as claimed in claim 1, wherein the adjusting unit adjusts the first distance between the first ending point of the first marking line and the second starting point of the second marking line to be longer than the second distance between the first starting point of the first marking line and the second ending point of the second marking line by marking the first marking line from the first starting point to the first ending point and by marking the second marking line adjacent to the first marking line from the second starting point to the second ending point such that the second ending point of the second marking line is located in a line slanted toward the first starting point of the first marking line based on a line in parallel with the first marking line.

6. The marking control device as claimed in claim 5, wherein the adjusting unit adjusts a third marking line to be marked from a third starting point to a third ending point such that the third ending point of the third marking line is located in a line slanted toward the second starting point of the second marking line based on a line in parallel with the second marking line.

7. The marking control device as claimed in claim 6, wherein the adjusting unit adjusts the third marking line to be marked in parallel with the first marking line.

8. The marking control device as claimed in claim 5, wherein the adjusting unit adjusts a laser beam not to be applied to an interval between the first ending point of the first marking line and the second starting point of the second marking line located adjacent to the first marking line.

9. The marking control device as claimed in claim 5, wherein the adjusting unit adjusts a laser beam applied to the second starting point of the second marking line to be located in a line perpendicular to the first marking line marked from the first end point of the first marking line.

10. The marking control device as claimed in claim 5, wherein the adjusting unit adjusts irradiation energy of a laser beam that marks the first marking line to be higher than irradiation energy of a laser beam that marks the second marking line.

11. The marking control device as claimed in claim 5, further comprising:
a laser light source used in image processing,
wherein the laser light source is at least one of a YAG laser light, a fiber laser light, and a semiconductor laser light.

12. The marking control device as claimed in claim 5, wherein a wavelength of the laser beam for marking any of the marking lines is in a range of 700 to 1,500 nm.

13. The marking control device as claimed in claim 5, wherein the thermoreversible recording medium on which the target image is formed includes:
a supporting member;
a first thermoreversible recording layer;
a photothermal conversion layer configured to absorb light having a specific wavelength and convert the absorbed light into heat; and
a second thermoreversible recording layer, the first thermoreversible recording layer and the photothermal conversion layer and the second thermoreversible recording layer being arranged in this order on the supporting member, and
wherein the first and second thermoreversible recording layers reversibly change respective colors thereof based on respective temperatures of the first and second thermoreversible recording layers.

14. The marking control device as claimed in claim 13, wherein the first thermoreversible recording layer and the second thermoreversible recording layer include leuco dyes and reversible developers.

15. The marking control device as claimed in claim 13, wherein a photothermal conversion material used for forming the photothermal conversion layer includes an absorption peak in a near-infrared region.

16. The marking control device as claimed in claim 15, wherein the photothermal conversion material used for forming the photothermal conversion layer includes a phthalocyanine compound.

17. A laser application device comprising:
a laser oscillator configured to generate a laser beam;
a direction control mirror configured to control a direction of the generated laser beam;
a direction control motor configured to drive the direction control mirror; and
the marking control device as claimed in claim 1 configured to control an output power of the laser oscillator, and the driving of the direction control motor based on the set of the marking instructions.

18. The marking control device as claimed in claim 1, wherein a ratio of an amount of slant of the second marking line toward the first marking line to a pitch width is in a range of 0.2 to 0.8.

19. A marking control method for controlling a marking device that marks a target image on a thermoreversible recording medium by applying a laser beam thereto, the marking control method comprising:
dividing the target image into a first marking line and a second marking line that are adjacent to each other, and determining a marking position of each of the adjacent first and second marking lines;
determining a marking order of the adjacent first and second marking lines for marking the target image such that the second marking line is marked by reversing a scanning direction of the second marking line relative to a scanning direction of the first marking line;
adjusting, when the first marking line is initially scanned and the second marking line is scanned adjacent and subsequent to the first marking line by substantially reversing the scanning direction from a location near a first ending point of the first marking line, a first distance between the first ending point of the first marking line and a second starting point of the second marking line to be longer than a second distance between a first starting point of the first marking line and a second ending point of the second marking line so that the first marking line and the second marking line are not parallel lines but are close enough together so as to fill the target image; and
generating a set of marking instructions including the respective marking positions of the first and second marking lines and the marking order of the first and second marking lines.

20. The marking control method as claimed in claim 19, wherein a ratio of an amount of slant of the second marking line toward the first marking line to a pitch width is 0.1 or more.

21. The marking control method as claimed in claim 1, wherein a ratio of an amount of slant of the second marking line toward the first marking line to a pitch width is in a range of 0.2 to 0.8.

22. The marking control device as claimed in claim 1, wherein a ratio of an amount of slant of the second marking line toward the first marking line to a pitch width is 0.1 or more.

* * * * *